US008686962B2

(12) United States Patent
Christie

(10) Patent No.: US 8,686,962 B2
(45) Date of Patent: Apr. 1, 2014

(54) GESTURES FOR CONTROLLING, MANIPULATING, AND EDITING OF MEDIA FILES USING TOUCH SENSITIVE DEVICES

(75) Inventor: Greg Christie, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 220 days.

(21) Appl. No.: 13/155,310

(22) Filed: Jun. 7, 2011

(65) Prior Publication Data

US 2011/0239155 A1   Sep. 29, 2011

Related U.S. Application Data

(62) Division of application No. 11/818,342, filed on Jun. 13, 2007, now Pat. No. 7,956,847.

(60) Provisional application No. 60/878,754, filed on Jan. 5, 2007.

(51) Int. Cl.
| G06F 3/041 | (2006.01) |
| G06F 3/033 | (2013.01) |
| G06F 3/14 | (2006.01) |
| G06F 3/0488 | (2013.01) |

(52) U.S. Cl.
CPC .................................. *G06F 3/0488* (2013.01)
USPC ........................... 345/173; 715/863; 715/864

(58) Field of Classification Search
USPC ........................... 345/173; 715/784, 863, 864
See application file for complete search history.

(56) References Cited

U.S. PATENT DOCUMENTS

| 5,252,951 A | 10/1993 | Tannenbaum et al. |
| 5,388,197 A | 2/1995 | Rayner |
| 5,488,204 A | 1/1996 | Mead et al. |
| 5,590,219 A | 12/1996 | Gourdol |
| 5,760,767 A | 6/1998 | Shore et al. |
| 5,825,352 A * | 10/1998 | Bisset et al. .................. 345/173 |
| 5,880,411 A | 3/1999 | Gillespie et al. |
| 5,900,875 A | 5/1999 | Haitani et al. |
| 5,969,716 A | 10/1999 | Davis et al. |
| 6,020,881 A | 2/2000 | Naughton et al. |
| 6,072,475 A | 6/2000 | van Ketwich |
| 6,188,391 B1 | 2/2001 | Seely et al. |

(Continued)

FOREIGN PATENT DOCUMENTS

| CN | 1695105 A | 11/2005 |
| EP | 1 517 228 A2 | 3/2005 |
| WO | WO 02/19081 | 3/2002 |
| WO | WO 2006/020305 A2 | 2/2006 |

OTHER PUBLICATIONS

Rekimoto, J. "SmartSkin: An Infrastructure for Freehand Manipulation on Interactive Surfaces," CHI 2002, Apr. 20-25, 2002, 8 pages.

(Continued)

*Primary Examiner* — Ariel Balaoing
(74) *Attorney, Agent, or Firm* — Morgan, Lewis & Bockius LLP

(57) ABSTRACT

Embodiments of the invention are directed to a system, method, and software for implementing gestures with touch sensitive devices (such as a touch sensitive display) for managing and editing media files on a computing device or system. Specifically, gestural inputs of a human hand over a touch/proximity sensitive device can be used to control, edit, and manipulate files, such as media files including without limitation graphical files, photo files and video files.

16 Claims, 45 Drawing Sheets

(56) References Cited

U.S. PATENT DOCUMENTS

| | | | |
|---|---|---|---|
| 6,215,491 | B1 | 4/2001 | Gould |
| 6,323,846 | B1 | 11/2001 | Westerman et al. |
| 6,486,896 | B1 | 11/2002 | Ubillos |
| 6,690,387 | B2 | 2/2004 | Zimmerman et al. |
| 6,714,221 | B1 | 3/2004 | Christie et al. |
| 7,030,861 | B1 * | 4/2006 | Westerman et al. ........ 345/173 |
| 7,552,388 | B2 | 6/2009 | Yoshimine |
| 7,614,008 | B2 | 11/2009 | Ording |
| 7,760,187 | B2 | 7/2010 | Kennedy |
| 2002/0036618 | A1 | 3/2002 | Wakai et al. |
| 2002/0080151 | A1 | 6/2002 | Venolia |
| 2003/0122787 | A1 | 7/2003 | Zimmerman et al. |
| 2005/0057524 | A1 | 3/2005 | Hill et al. |
| 2005/0088409 | A1 | 4/2005 | Van Berkel |
| 2005/0134578 | A1 | 6/2005 | Chambers et al. |
| 2006/0001650 | A1 | 1/2006 | Robbins et al. |
| 2006/0022955 | A1 | 2/2006 | Kennedy |
| 2006/0026521 | A1 * | 2/2006 | Hotelling et al. ............ 715/702 |
| 2006/0026536 | A1 | 2/2006 | Hotelling et al. |
| 2006/0033724 | A1 | 2/2006 | Chaudhri et al. |
| 2006/0053387 | A1 | 3/2006 | Ording |
| 2006/0097991 | A1 | 5/2006 | Hotelling et al. |
| 2006/0197753 | A1 | 9/2006 | Hotelling |
| 2006/0238517 | A1 | 10/2006 | King et al. |
| 2006/0274046 | A1 * | 12/2006 | Hillis et al. ................... 345/173 |
| 2007/0052689 | A1 * | 3/2007 | Tak ............... 345/173 |
| 2007/0152984 | A1 | 7/2007 | Ording et al. |
| 2007/0252821 | A1 * | 11/2007 | Hollemans et al. ........... 345/173 |
| 2009/0100383 | A1 * | 4/2009 | Sunday et al. ................ 715/863 |

OTHER PUBLICATIONS

Chinese Search Report dated Jan. 17, 2011, received in Chinese Patent Application No. ZL2007201942960, which corresponds to U.S. Appl. No. 11/818,342.

Chinese Search Report received in Chinese Patent Application No. ZL200820002206.8, which corresponds to U.S. Appl. No. 11/818,342.

Extended European Search Report dated Sep. 22, 2010, received in European Application No. 10161504.5, which corresponds to U.S. Appl. No. 11/818,342, 5 pages (Christie).

Office Action dated Jul. 19, 2010 received in U.S. Appl. No. 11/818,342, 16 pages (Christie).

Final Office Action dated Nov. 24, 2010, received in U.S. Appl. No. 11/818,342, 9 pages (Christie).

Notice of Allowance dated Mar. 10, 2011, received in U.S. Appl. No. 11/818,342, 9 pages (Christie).

Examiner's Report dated Mar. 17, 2010, received in Australian Patent Application No. 2007341930, which corresponds to U.S. Appl. No. 11/818,342, 3 pages (Christie).

Examiner's Report dated Apr. 21, 2011, received in Australian Patent Application No. 2007341930, which corresponds to U.S. Appl. No. 11/818,342.

Office Action dated Nov. 23, 2011, received in Chinese Patent Application No. 200780051755.2, which correponds to U.S. Appl. No. 11/818,342 (Christie).

Office Action dated Dec. 17, 2009, received in European Patent Application No. 07 019 528.4, which corresponds to U.S. Appl. No. 11/818,342, 3 pages (Christie).

* cited by examiner

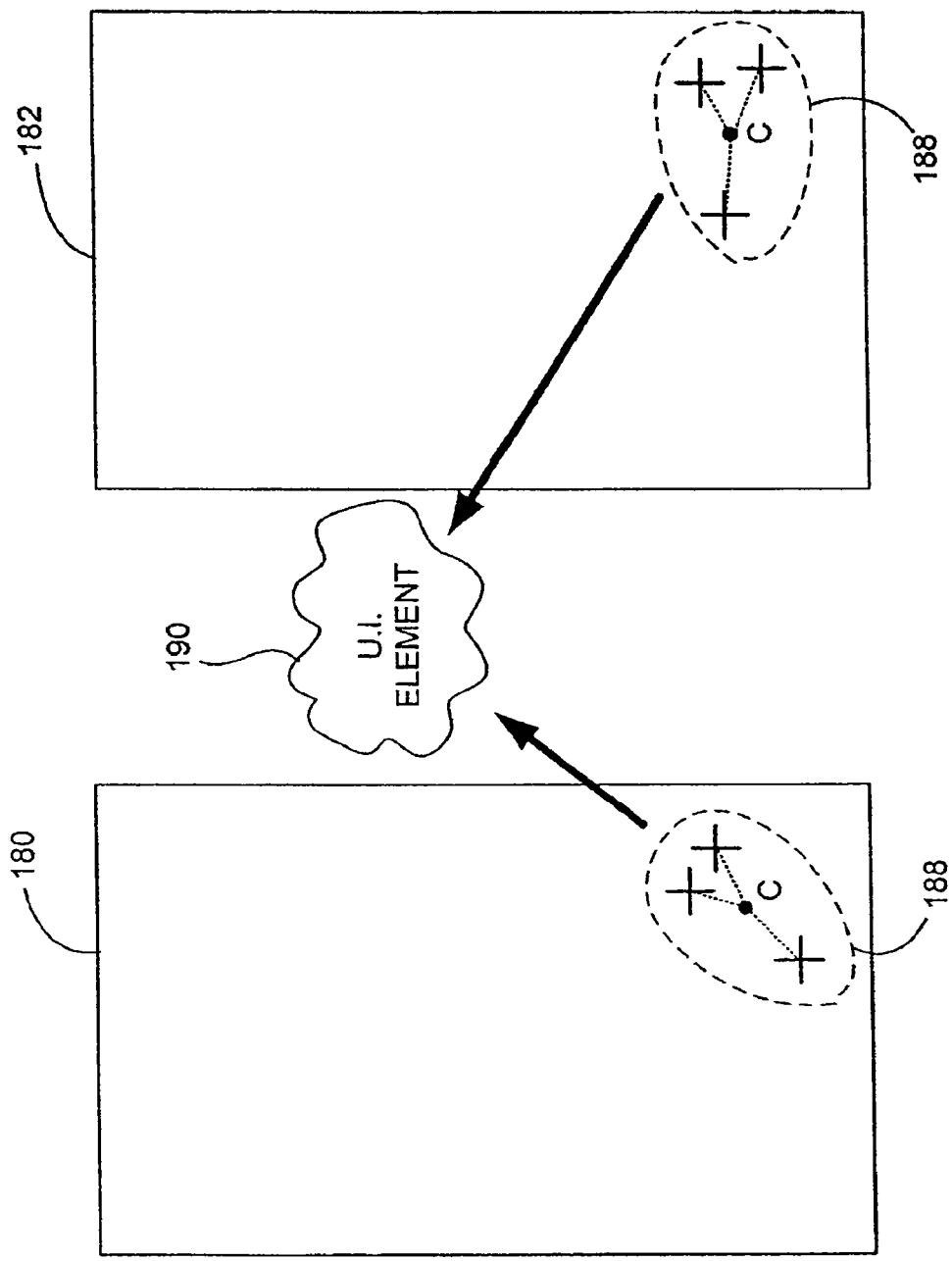

GESTURES FOR CONTROLLING, MANIPULATING, AND EDITING OF MEDIA FILES USING TOUCH SENSITIVE DEVICES

RELATED APPLICATIONS

The application is a divisional of U.S. application Ser. No. 11/818,342, filed Jun. 13, 2007, now U.S. Pat. No. 7,956,847, which claims the benefit under 35 USC 119(e) of U.S. Provisional Application Ser. No. 60/878,754, filed Jan. 5, 2007, both of which are incorporated by reference herein in their entirety.

FIELD OF THE INVENTION

This relates to a system and method of managing, manipulating, and editing media objects, such as graphical objects on a display, by using hand gestures on a touch sensitive device.

BACKGROUND OF THE INVENTION

There exist today many styles of input devices for performing operations in a computer system. The operations generally correspond to moving a cursor and making selections on a display screen. The operations can also include paging, scrolling, panning, zooming, etc. By way of example, the input devices can include buttons, switches, keyboards, mice, trackballs, touch pads, joy sticks, touch screens and the like. Each of these devices has advantages and disadvantages that are taken into account when designing a computer system.

Buttons and switches are generally mechanical in nature and provide limited control with regards to the movement of the cursor and making selections. For example, they are generally dedicated to moving the cursor in a specific direction (e.g., arrow keys) or to making specific selections (e.g., enter, delete, number, etc.).

In using a mouse instrument, the movement of the input pointer on a display generally corresponds to the relative movements of the mouse as the user moves the mouse along a surface. In using a trackball instrument, the movement of the input pointer on the display generally corresponds to the relative movements of a trackball as the user moves the ball within a housing. Mouse and trackball instruments typically also include one or more buttons for making selections. A mouse instrument can also include scroll wheels that allow a user to scroll the displayed content by rolling the wheel forward or backward.

With touch pad instrument, such as touch pads on a personal laptop computer, the movement of the input pointer on a display generally corresponds to the relative movements of the user's finger (or stylus) as the finger is moved along a surface of the touch pad. Touch screens, on the other hand, can be a type of display screen that typically include a touch-sensitive transparent panel (or "skin") that overlays the display screen. When using a touch screen, a user typically makes a selection on the display screen by pointing directly to objects (such as GUI objects) displayed on the screen (usually with a stylus or finger).

To provide additional functionality, hand gestures have been implemented with some of these input devices. By way of example, in touch pads, selections may be made when one or more taps can be detected on the surface of the touch pad. In some cases, any portion of the touch pad may be tapped, and in other cases a dedicated portion of the touch pad may be tapped. In addition to selections, scrolling may be initiated by using finger motion at the edge of the touch pad.

U.S. Pat. Nos. 5,612,719 and 5,590,219, assigned to Apple Inc. describe some other uses of gesturing. U.S. Pat. No. 5,612,719 discloses an onscreen button that is responsive to at least two different button gestures made on the screen on or near the button. U.S. Pat. No. 5,590,219 discloses a method for recognizing an ellipse-type gesture input on a display screen of a computer system.

In recent times, more advanced gestures have been implemented. For example, scrolling may be initiated by placing four fingers on the touch pad so that the scrolling gesture is recognized and thereafter moving these fingers on the touch pad to perform scrolling events. The methods for implementing these advanced gestures, however, can be limited and in many instances counter intuitive. In certain application, especially applications involving managing or editing media files using a computer system, hand gestures using touch screens can allow a user to more efficiently and accurately effect intended operations.

Based on the above, there is a need for improvements in the way gestures can be performed on touch sensitive devices, especially with respect to managing and editing media files.

SUMMARY OF THE INVENTION

This relates to a system, method, and software for implementing gestures with touch sensitive devices (such as a touch sensitive display) for managing and editing media files on a computer system. Specifically, gestural inputs of a human hand over a touch/proximity sensitive device may be used to control, edit, and manipulate files, such as media files including without limitation photo files and video files.

In accordance with one embodiment, gestural inputs over a touch sensitive computer desktop application display used to effect the conventional mouse/trackball actions, such as target, select, right click action, scrolling, etc.

In accordance with another embodiment, gestural inputs over a touch sensitive display may be used to effect editing commands for editing image files, such as photo files. The gestural inputs can be recognized via a user interface ("UI") element, such as a slide bar. The gestural inputs via a UI element can be varied by changing the number of touchdown points on the UI element.

In accordance with another embodiment, gestural inputs invoke the activation of an UI element, after which gestural interactions with the invoked UI element can effect further functions.

BRIEF DESCRIPTION OF THE DRAWINGS

FIGS. 8A-8G illustrate a rotate gesture, in accordance with one embodiment of this invention.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which this invention can be practiced. It is to be understood that other embodiments can be utilized and structural changes can be made without departing from the scope of the preferred embodiments of the invention.

Figure 1:
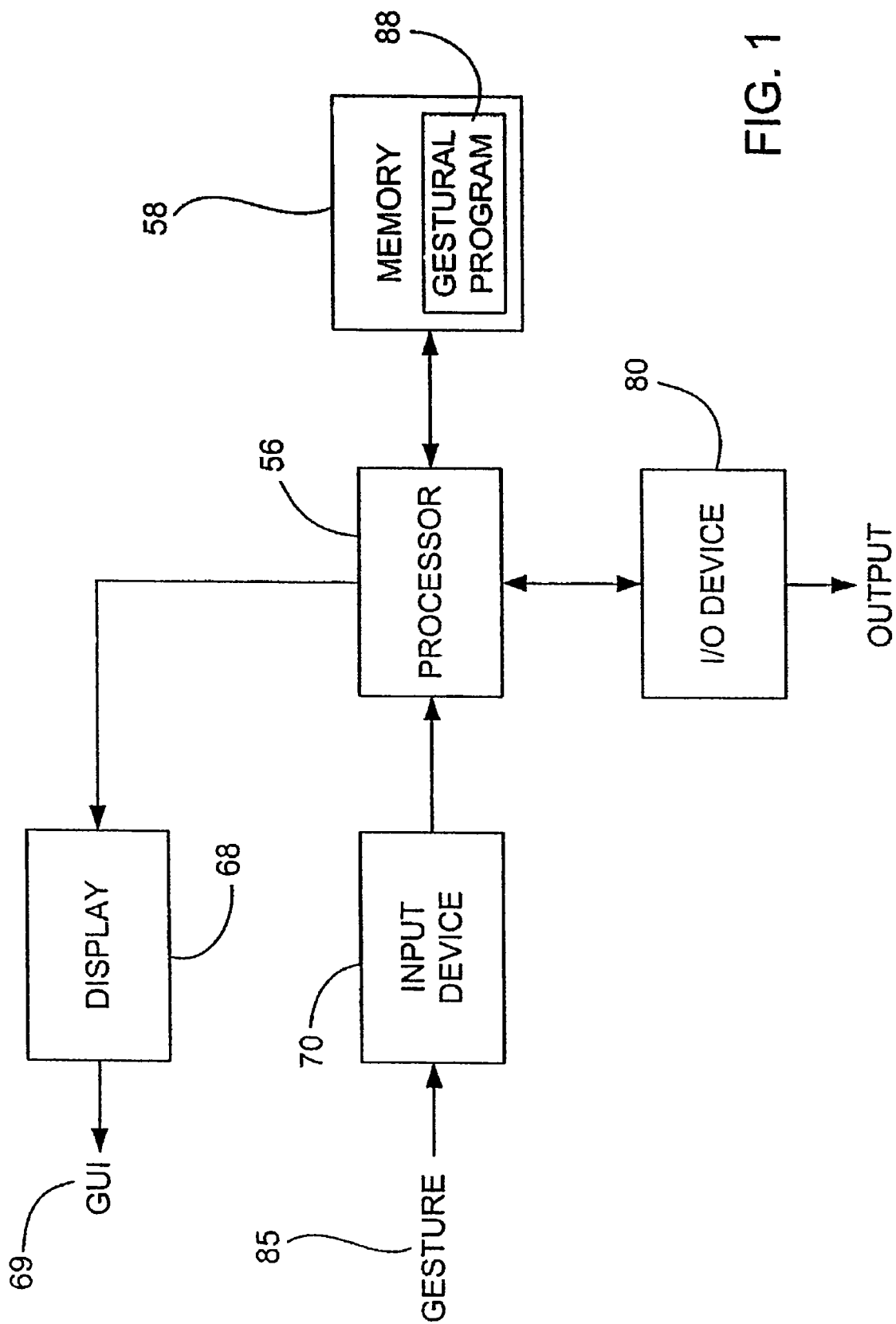
FIG. 1 is a block diagram of a computer system according to an exemplary embodiment of this invention.

FIG. 1 is a block diagram of an exemplary computer system 50, in accordance with one embodiment of the invention. The computer system 50 can correspond to a personal computer system, such as a desktops, laptops, tablets or handheld computer. The computer system can also correspond to a computing device, such as a cell phone, PDA, dedicated media player, consumer electronic device, and the like.

The exemplary computer system 50 shown in FIG. 1 can include a processor 56 configured to execute instructions and to carry out operations associated with the computer system 50. For example, using instructions retrieved for example from memory, the processor 56 can control the reception and manipulation of input and output data between components of the computing system 50. The processor 56 can be implemented on a single-chip, multiple chips or multiple electrical components. For example, various architectures can be used for the processor 56, including dedicated or embedded processor, single purpose processor, controller, ASIC, and so forth.

In most cases, the processor 56 together with an operating system operates to execute computer code and produce and use data. Operating systems are generally well known and will not be described in greater detail. By way of example, the operating system can correspond to OS/2, DOS, Unix, Linux, Palm OS, and the like. The operating system can also be a special purpose operating system, such as ones that can be used for limited purpose appliance-type computing devices. The operating system, other computer code and data can reside within a memory block 58 that can be operatively coupled to the processor 56. Memory block 58 generally provides a place to store computer code and data that can be used by the computer system 50. By way of example, the memory block 58 can include Read-Only Memory (ROM), Random-Access Memory (RAM), hard disk drive and/or the like. The information could also reside on a removable storage medium and loaded or installed onto the computer system 50 when needed. Removable storage mediums include, for example, CD-ROM, PC-CARD, memory card, floppy disk, magnetic tape, and a network component.

The computer system 50 can also include a display device 68 that can be operatively coupled to the processor 56. The display device 68 can be a liquid crystal display (LCD) (e.g., active matrix, passive matrix and the like). Alternatively, the display device 68 can be a monitor such as a monochrome display, color graphics adapter (CGA) display, enhanced graphics adapter (EGA) display, variable-graphics-array (VGA) display, super VGA display, cathode ray tube (CRT), and the like. The display device can also correspond to a plasma display or a display implemented with electronic inks.

The display device 68 can be generally configured to display a graphical user interface (GUI) 69 that provides an easy to use interface between a user of the computer system and the operating system or application running thereon. Generally speaking, the GUI 69 represents, programs, files and operational options with graphical images, objects, or vector representations. The graphical images can include windows, fields, dialog boxes, menus, icons, buttons, cursors, scroll bars, etc. Such images may be arranged in predefined layouts, or can be created dynamically to serve the specific actions being taken by a user. During operation, the user can select and/or activate various graphical images in order to initiate functions and tasks associated therewith. By way of example, a user may select a button that opens, closes, minimizes, or maximizes a window, or an icon that launches a particular program. The GUI 69 can additionally or alternatively display information, such as non interactive text and graphics, for the user on the display device 68.

The computer system 50 can also include an input device 70 that can be operatively coupled to the processor 56. The input device 70 can be configured to transfer data from the outside world into the computer system 50. The input device 70 may for example be used to perform tracking and to make selections with respect to the GUI 69 on the display 68. The input device 70 may also be used to issue commands in the computer system 50. The input device 70 can include a touch sensing device configured to receive input from a user's touch and to send this information to the processor 56. By way of example, the touch-sensing device can correspond to a touchpad or a touch screen. In many cases, the touch-sensing device recognizes touches, as well as the position and magnitude of touches on a touch sensitive surface. The touch sensing device detects and reports the touches to the processor 56 and the processor 56 interprets the touches in accordance with its programming. For example, the processor 56 can initiate a task in accordance with a particular touch. A dedicated processor can be used to process touches locally and reduce demand for the main processor of the computer system.

The touch sensing device can be based on sensing technologies including but not limited to capacitive sensing, resistive sensing, surface acoustic wave sensing, pressure sensing, optical sensing, and/or the like. Furthermore, the touch sensing means can be based on single point sensing or multipoint sensing. Single point sensing is capable of only distinguishing a single touch, while multipoint sensing can be capable of distinguishing multiple touches that occur at the same time.

As discussed above, the input device 70 can be a touch screen that is positioned over or in front of the display 68, integrated with the display device 68, or can be a separate component, such as a touch pad.

The computer system 50 also preferably includes capabilities for coupling to one or more I/O devices 80. By way of example, the I/O devices 80 can correspond to keyboards, printers, scanners, cameras, microphones, speakers, and/or the like. The I/O devices 80 can be integrated with the computer system 50 or they can be separate components (e.g., peripheral devices). In some cases, the I/O devices 80 can be connected to the computer system 50 through wired connections (e.g., cables/ports). In other cases, the I/O devices 80 can be connected to the computer system 80 through wireless connections. By way of example, the data link can correspond to PS/2, USB, IR, Firewire, RF, Bluetooth or the like.

In accordance with one embodiment of the invention, the computer system 50 is designed to recognize gestures 85 applied to the input device 70 and to control aspects of the computer system 50 based on the gestures 85. In some cases, a gesture can be defined as a stylized interaction with an input device that can be mapped to one or more specific computing operations. The gestures 85 can be made through various hand, and more particularly finger motions. Alternatively or additionally, the gestures can be made with a stylus. In all of these cases, the input device 70 receives the gestures 85 and the processor 56 executes instructions to carry out operations associated with the gestures 85. In addition, the memory block 58 can include a gesture operational program 88, which can be part of the operating system or a separate application. The gestural operation program 88 generally can include a set of instructions that recognizes the occurrence of gestures 85 and informs one or more software agents of the gestures 85 and/or what action(s) to take in response to the gestures 85. Additional details regarding the various gestures that can be used as input commands is discussed further below.

In accordance with a preferred embodiment, upon a user performing one or more gestures, the input device 70 relays gesture information to the processor 56. Using instructions from memory 58, and more particularly, the gestural operational program 88, the processor 56 interprets the gestures 85 and controls different components of the computer system 50, such as memory 58, a display 68 and I/O devices 80, based on the gestures 85. The gestures 85 may be identified as commands for performing actions in applications stored in the memory 58, modifying image objects shown on the display 68, modifying data stored in memory 58, and/or for performing actions in I/O devices 80.

Again, although FIG. 1 illustrates the input device 70 and the display 68 as two separate boxes for illustration purposes, the two boxes can be realized on one device.

Figure 2:
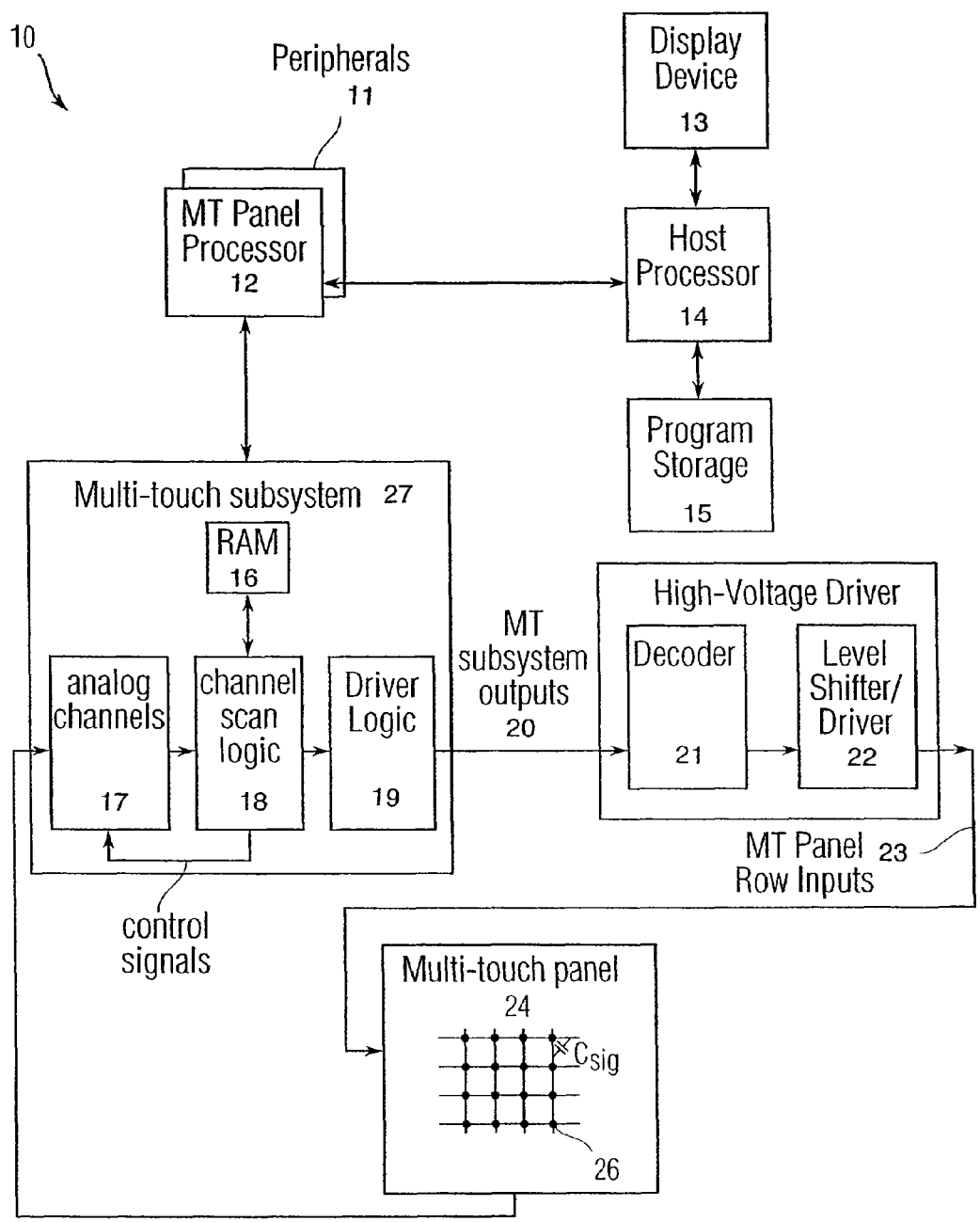
FIG. 2 illustrates another computer system according to another exemplary embodiment of this invention.

FIG. 2 illustrates an exemplary computing system 10 that uses a multi-touch panel 24 as an input device for gestures; the multi-touch panel 24 can at the same time be a display panel. The computing system 10 can include one or more multi-touch panel processors 12 dedicated to the multi-touch subsystem 27. Alternatively, the multi-touch panel processor functionality can be implemented by dedicated logic, such as a state machine. Peripherals 11 can include, but are not limited to, random access memory (RAM) or other types of memory or storage, watchdog timers and the like. Multi-touch subsystem 27 can include, but is not limited to, one or more analog channels 17, channel scan logic 18 and driver logic 19. Channel scan logic 18 can access RAM 16, autonomously read data from the analog channels and provide control for the analog channels. This control can include multiplexing columns of multi-touch panel 24 to analog channels 17. In addition, channel scan logic 18 can control the driver logic and stimulation signals being selectively applied to rows of multi-touch panel 24. In some embodiments, multi-touch subsystem 27, multi-touch panel processor 12 and peripherals 11 can be integrated into a single application specific integrated circuit (ASIC).

Driver logic 19 can provide multiple multi-touch subsystem outputs 20 and can present a proprietary interface that drives high voltage driver, which preferably includes a decoder 21 and subsequent level shifter and driver stage 22, although level-shifting functions could be performed before decoder functions. Level shifter and driver 22 can provide level shifting from a low voltage level (e.g. CMOS levels) to a higher voltage level, providing a better signal-to-noise (S/N) ratio for noise reduction purposes. Decoder 21 can decode the drive interface signals to one out of N outputs, whereas N can be the maximum number of rows in the panel. Decoder 21 can be used to reduce the number of drive lines needed between the high voltage driver and multi-touch panel 24. Each multi-touch panel row input 23 can drive one or more rows in multi-touch panel 24. It should be noted that driver 22 and decoder 21 can also be integrated into a single ASIC, be integrated into driver logic 19, or in some instances be unnecessary.

The multi-touch panel 24 can include a capacitive sensing medium having a plurality of row traces or driving lines and a plurality of column traces or sensing lines, although other sensing media can also be used. The row and column traces can be formed from a transparent conductive medium, such as Indium Tin Oxide (ITO) or Antimony Tin Oxide (ATO), although other transparent and non-transparent materials, such as copper, can also be used. In some embodiments, the row and column traces can be formed on opposite sides of a dielectric material, and can be perpendicular to each other, although in other embodiments other non-Cartesian orientations are possible. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as used herein are intended to encompass not only orthogonal grids, but the intersecting traces of other geometric configurations having first and second dimensions (e.g. the concentric and radial lines of a polar-coordinate arrangement). The rows and columns can be formed on a single side of a substrate, or can be formed on two separate substrates separated by a dielectric material. In some instances, an additional dielectric cover layer can be placed over the row or column traces to strengthen the structure and protect the entire assembly from damage.

At the "intersections" of the traces of the multi-touch panel 24, where the traces pass above and below (cross) each other (but do not make direct electrical contact with each other), the traces essentially form two electrodes (although more than two traces could intersect as well). Each intersection of row and column traces can represent a capacitive sensing node and can be viewed as picture element (pixel) 26, which can be particularly useful when multi-touch panel 24 is viewed as capturing an "image" of touch. (In other words, after multi-touch subsystem 27 has determined whether a touch event has been detected at each touch sensor in the multi-touch panel, the pattern of touch sensors in the multi-touch panel at which a touch event occurred can be viewed as an "image" of touch (e.g. a pattern of fingers touching the panel).) The capacitance between row and column electrodes appears as a stray capacitance on all columns when the given row is held at DC and as a mutual capacitance Csig when the given row is stimulated with an AC signal. The presence of a finger or other object near or on the multi-touch panel can be detected by measuring changes to Csig. The columns of multi-touch panel 124 can drive one or more analog channels 17 (also referred to herein as event detection and demodulation circuits) in multi-touch subsystem 27. In some implementations, each column can be coupled to one dedicated analog channel 17. However, in other implementations, the columns can be couplable via an analog switch to a fewer number of analog channels 17.

Computing system 10 can also include host processor 14 for receiving outputs from multi-touch panel processor 12 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, etc. Host processor 14, which can be a personal computer CPU, can also perform additional functions that may not be related to multi-touch panel processing, and can be coupled to program storage 15 and display device 13 such as an LCD display for providing a user interface (UI) to a user of the device.

It should be noted that, while FIG. 2 illustrates a dedicated MT panel processor 12, the multi-touch subsystem may be controlled directly by the host processor 14. Additionally, it should also be noted that the multi-touch panel 24 and the display device 13 can be integrated into one single touch-screen display device. Further details of multi-touch sensor detection, including proximity detection by a touch panel, are described in commonly assigned co-pending applications, including application Ser. No. 10/840,862, published as U.S. patent publication no. US2006/0097991, application Ser. No. 11/428,522, published as U.S. patent publication no. US2006/0238522, and application titled "Proximity and Multi-Touch Sensor Detection and Demodulation," filed on Jan. 3, 2007, the entirety of all of which are hereby incorporated herein by reference.

Figure 3:
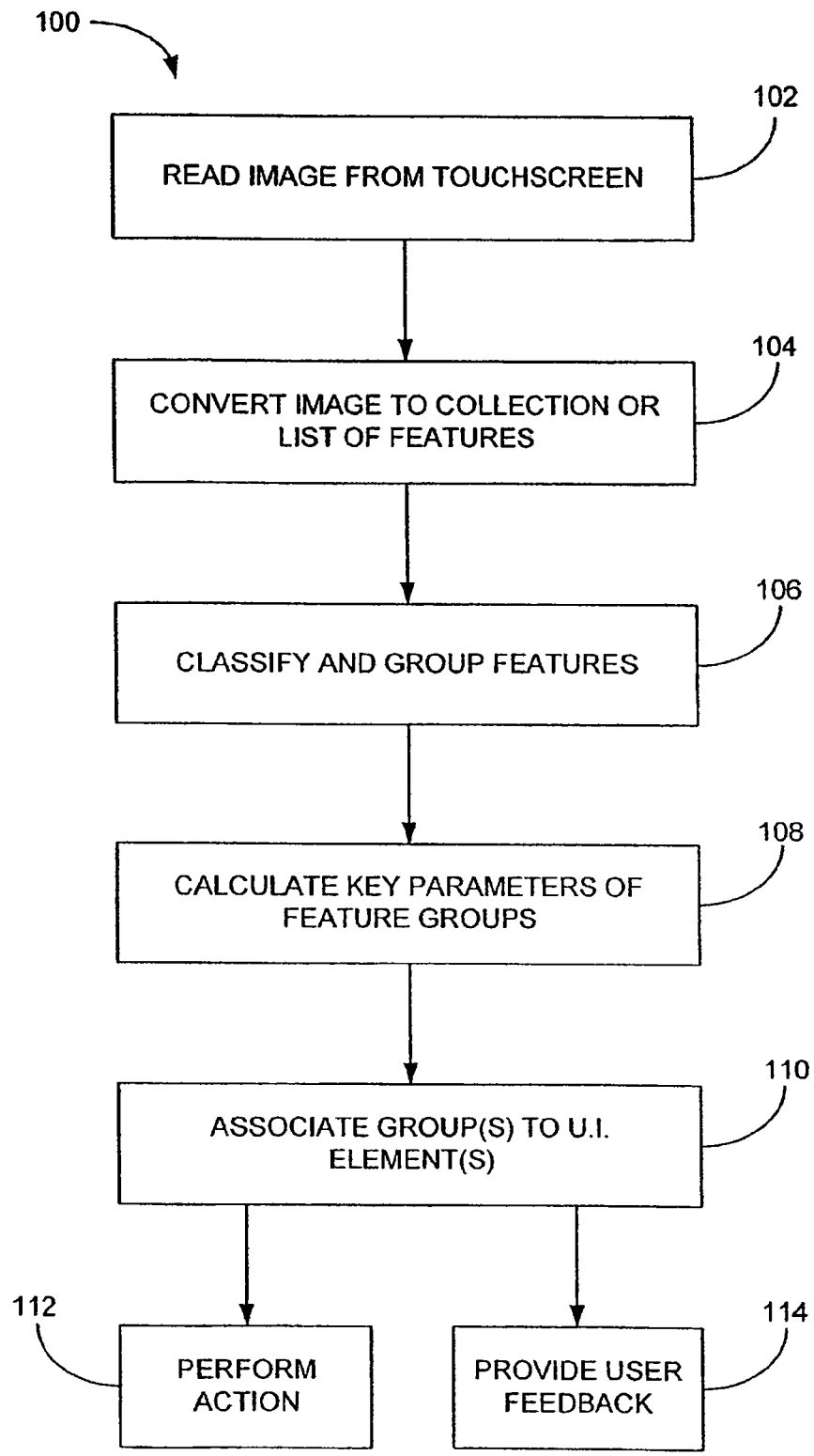
FIG. 3 is a multipoint processing method, in accordance with an exemplary embodiment of this invention.

FIG. 3 illustrates a multipoint processing method 100, in accordance with one embodiment of the invention. The multipoint processing method 100 may for example be performed in the system shown in FIG. 1 or 2. The multipoint processing method 100 generally begins at block 102 where images can be read from a multipoint input device, and more particularly a multipoint touch screen. Although the term "image" is used it should be noted that the data may come in other forms. In most cases, the image read from the touch screen provides magnitude (Z) as a function of position (x and y) for each sensing point or pixel of the touch screen. The magnitude may, for example, reflect the capacitance measured at each point.

Figure 4A:
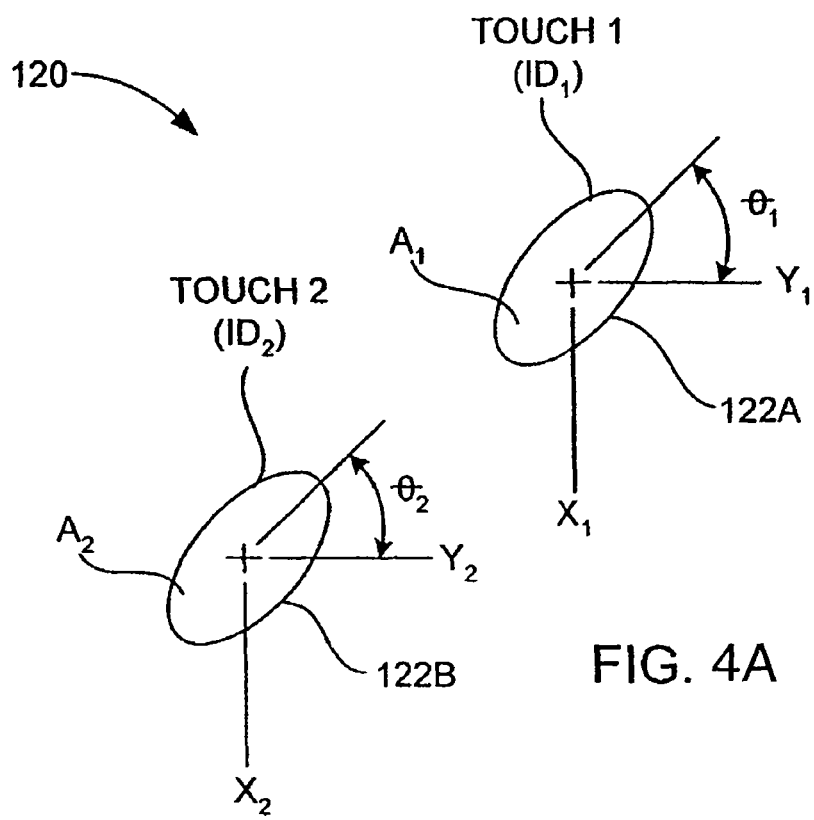
FIGS. 4A and 4B illustrate a detected touch image, in accordance with one embodiment of this invention.
Figure 4B:
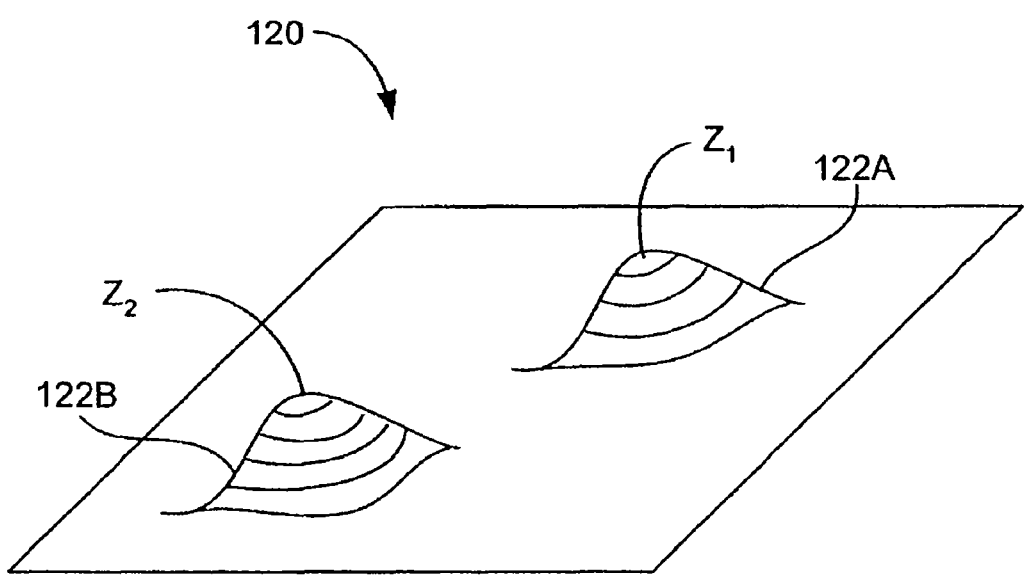

Following block 102, multipoint processing method 100 proceeds to block 104 where the image can be converted into a collection or list of features. Each feature represents a distinct input such as a touch. In most cases, each feature can include its own unique identifier (ID), x coordinate, y coordinate, Z magnitude, angle Θ, area A, and the like. By way of example, FIGS. 4A and 4B illustrate a particular image 120 in time. In image 120, there can be two features 122 based on two distinct touches. The touches may for example be formed from a pair of fingers touching the touch screen. As shown, each feature 122 can include unique identifier (ID), x coordinate, y coordinate, Z magnitude, angle .theta., and area A. More particularly, the first feature 122A can be represented by $ID_1, X_1, Y_1, Z_1, \Theta_1, A_1$ and the second feature 122B can be represented by $ID_2, X_2, Y_2, Z_2, \Theta_2, A_2$. This data may be outputted for example using a multi-touch protocol.

The conversion from data or images to features may be accomplished using methods described in copending U.S. patent application Ser. No. 10/840,862, published as U.S. patent publication no. US2006/007991, which is hereby again incorporated herein by reference. As disclosed therein, the raw data is typically received in a digitized form, and can include values for each node of the touch screen. The values can be between 0 and 256 where 0 equates to no touch pressure and 256 equate to full touch pressure. Thereafter, the raw data can be filtered to reduce noise. Once filtered, gradient data, which indicates the topology of each group of connected points, can be generated. Thereafter, the boundaries for touch regions can be calculated based on the gradient data (i.e., a determination can be made as to which points can be grouped together to form each touch region). By way of example, a watershed algorithm may be used. Once the boundaries are determined, the data for each of the touch regions can be calculated (e.g., X, Y, Z, θ, A).

Following block 104, multipoint processing method 100 proceeds to block 106 where feature classification and groupings can be performed. During classification, the identity of each of the features can be determined. For example, the features may be classified as a particular finger, thumb, palm or other object. Once classified, the features may be grouped. The manner in which the groups are formed can widely vary. In most cases, the features can be grouped based on some criteria (e.g., they carry a similar attribute). For example, the two features shown in FIGS. 4A and 4B may be grouped together because each of these features can be located in proximity to each other or because they are from the same hand. The grouping may include some level of filtering to filter out features that are not part of the touch event. In filtering, one or more features may be rejected because they either meet some predefined criteria or because they do not meet some criteria. By way of example, one of the features may be classified as a thumb located at the edge of a tablet PC. Because the thumb is being used to hold the device rather than being used to perform a task, the feature generated therefrom is rejected, i.e., is not considered part of the touch event being processed.

Figure 5:
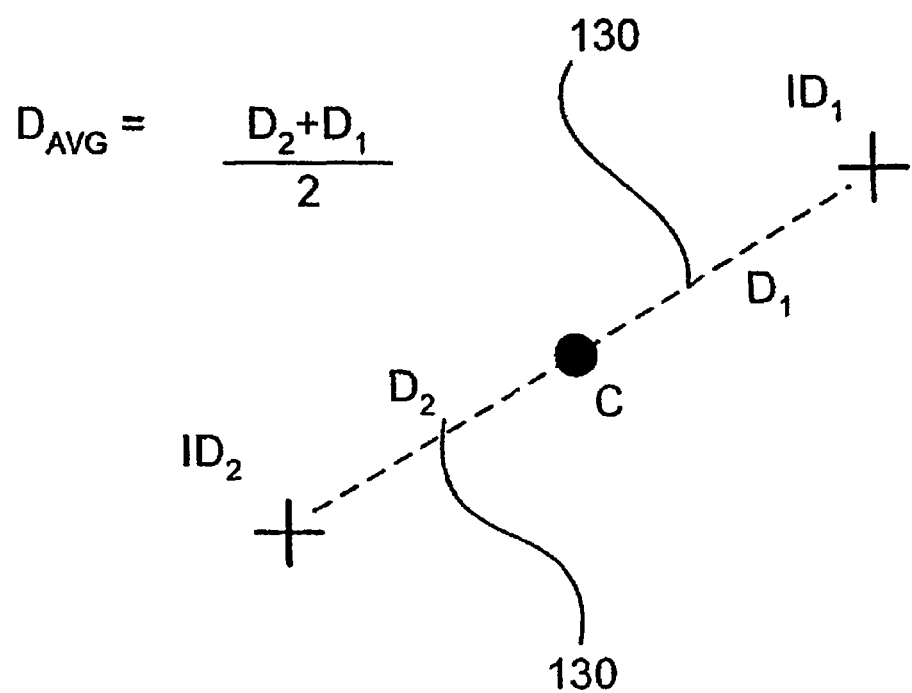
FIG. 5 illustrates a group of features, in accordance with one embodiment of this invention.

Following block 106, the multipoint processing method 100 proceeds to block 108 where key parameters for the feature groups can be calculated. The key parameters may include distance between features, x/y centroid of all features, feature rotation, total pressure of the group (e.g., pressure at centroid), and the like. As shown in FIG. 5, the calculation may include finding the centroid C, drawing a virtual line 130 to each feature from the centroid C, defining the distance D for each virtual line ($D_1$ and $D_2$), and then averaging the distances $D_1$ and $D_2$. Once the parameters are calculated, the parameter values can be reported. The parameter values are typically reported with a group identifier (GID) and number of features within each group (in this case three). In most cases, both initial and current parameter values are reported. The initial parameter values may be based on set down, i.e., when the user sets their fingers on the touch screen, and the current values may be based on any point within a stroke occurring after set down.

As should be appreciated, blocks 102-108 can be repetitively performed during a user stroke thereby generating a plurality of sequentially configured signals. The initial and current parameters can be compared in later steps to perform actions in the system.

Following block 108, the process flow proceeds to block 110 where the group is or can be associated with a user interface (UI) element. UI elements can be buttons boxes, lists, sliders, wheels, knobs, etc. Each UI element represents a component or control of the user interface. The application behind the UI element(s) can have access to the parameter data calculated in block 108. In one implementation, the application ranks the relevance of the touch data to the UI element corresponding there to. The ranking may be based on some predetermine criteria. The ranking may include producing a figure of merit, and whichever UI element has the highest figure of merit, giving it sole access to the group. There may even be some degree of historesis as well (once one of the UI elements claims control of that group, the group sticks with the UI element until another UI element has a much higher ranking) By way of example, the ranking may include determining proximity of the centroid (or features) to the image object associated with the UI element.

Following block 110, the multipoint processing method 100 proceeds to blocks 112 and 114. The blocks 112 and 114 can be performed approximately at the same time. From the user perspective, in one embodiment, the blocks 112 and 114 appear to be performed concurrently. In block 112, one or more actions can be performed based on differences between initial and current parameter values, and may also be based to a UI element to which they are associated, if any. In block 114, user feedback pertaining to the one or more action being performed can be provided. By way of example, user feedback may include display, audio, tactile feedback and/or the like.

Figure 6:
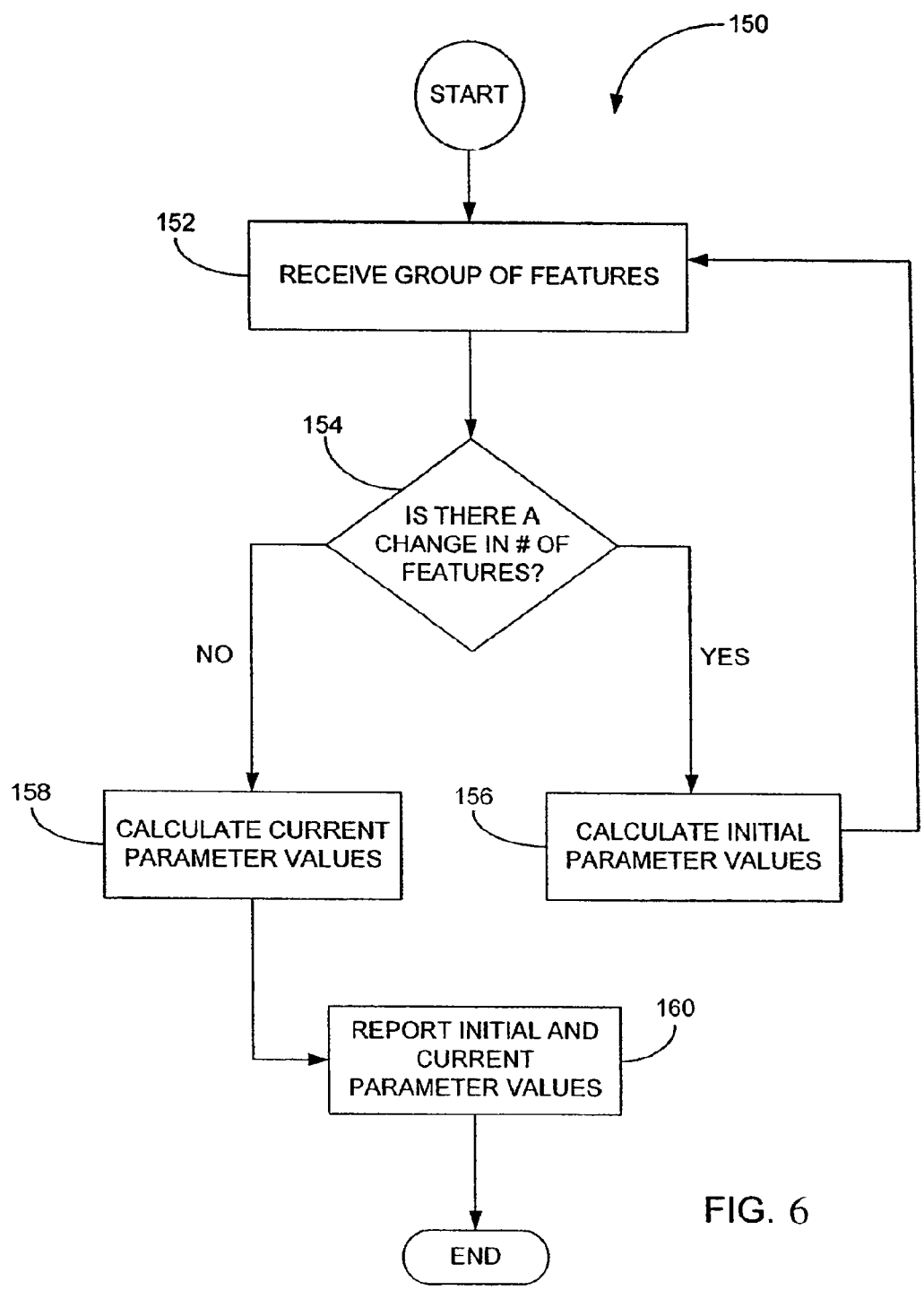
FIG. 6 is a parameter calculation method, in accordance with one embodiment of this invention.

FIG. 6 is a parameter calculation method 150, in accordance with one embodiment of the invention. The parameter calculation method 150 can, for example, correspond to block 108 shown in FIG. 3. The parameter calculation method 150 generally begins at block 152 where a group of features can be received. Following block 152, the parameter calculation method 150 proceeds to block 154 where a determination can be made as to whether or not the number of features in the group of features has changed. For example, the number of features may have changed due to the user picking up or placing an additional finger. Different fingers may be needed to perform different controls (e.g., tracking, gesturing). If the number of features has changed, the parameter calculation method 150 proceeds to block 156 where the initial parameter values can be calculated. If the number stays the same, the parameter calculation method 150 proceeds to block 158 where the current parameter values can be calculated. Thereafter, the parameter calculation method 150 proceeds to block 150 where the initial and current parameter values can be reported. By way of example, the initial parameter values may contain the average initial distance between points (or Distance (AVG) initial) and the current parameter values may contain the average current distance between points (or Distance (AVG) current). These may be compared in subsequent steps in order to control various aspects of a computer system.

The above methods and techniques can be used to implement any number of GUI interface objects and actions. For example, gestures can be created to detect and effect a user command to resize a window, scroll a display, rotate an object, zoom in or out of a displayed view, delete or insert text or other objects, etc.

Figure 7A:
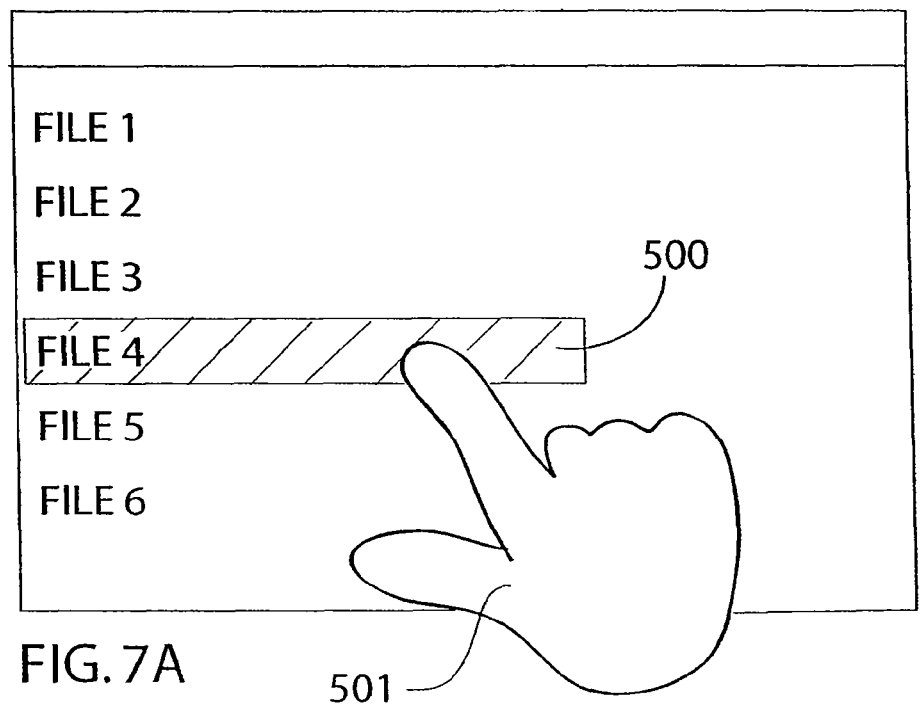
FIGS. 7A-7E and 7I-7K illustrate various gestures for performing targeting and/or selecting tasks in accordance with one embodiment of this invention.
Figure 7B:
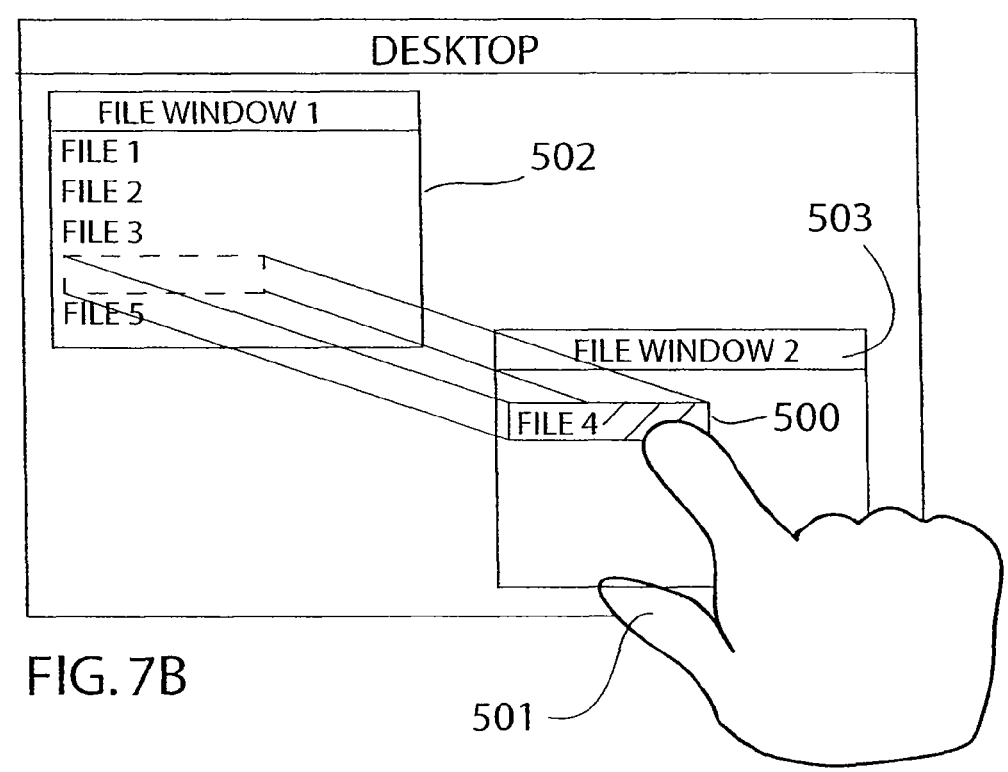
Figure 7C:
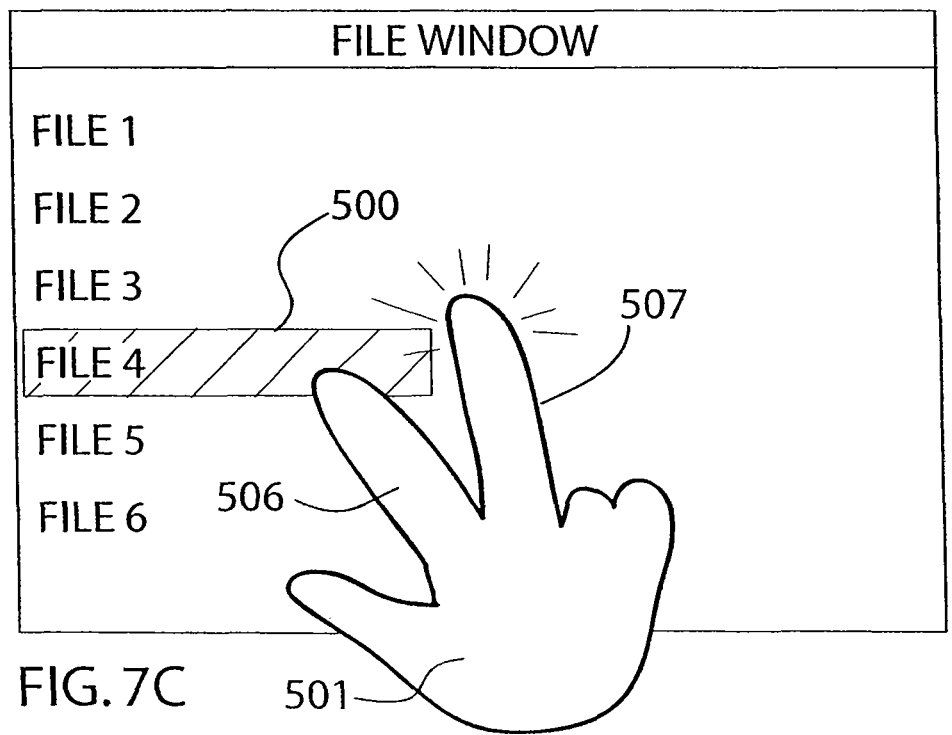
Figure 7D:
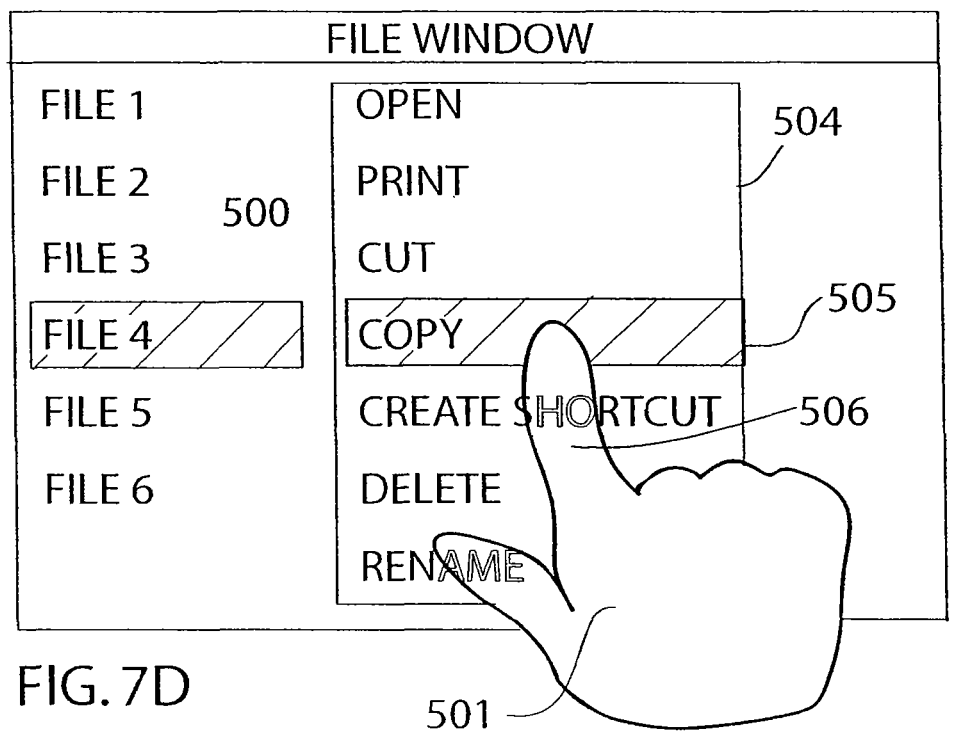
Figure 7E:
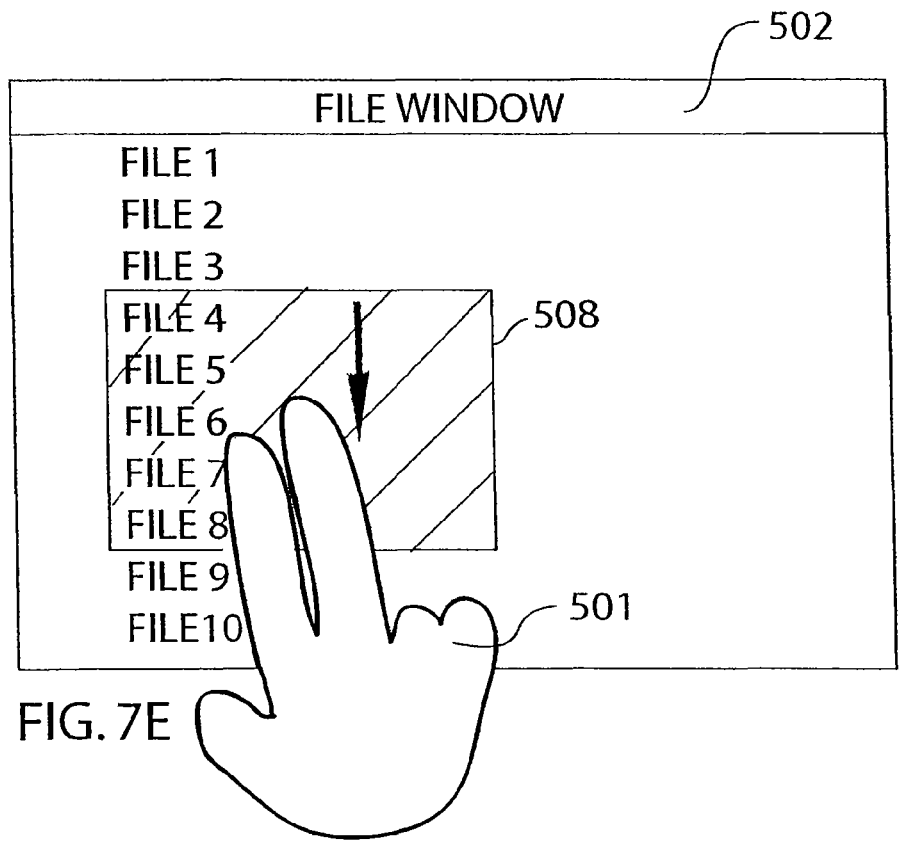

A basic category of gestures should allow a user to input the common commands that can be inputted through the use of a conventional mouse or trackball instrument. FIG. 7F shows a flow chart for processing the detection of mouse-click actions. Starting with block 710, detection can be made of either one or two touches by fingers. If the touch detected can be determined 711 to be one finger, then a determination 712 can be made of whether the touch is in a predetermined proximity of a displayed image object that is associated with a selectable file object, and if so, then a selection action is made 714. If a double tap action is detected 716 in association with a selectable object, then a double-click action can be invoked 718. A double tap action can be determined by the detection of a finger leaving the touch screen and immediately retouching the touch screen twice. In accordance with an alternative embodiment, a double-click action can also be invoked if it is detected that a finger touch on a selected object remains for more than a predetermined period of time.

Figure 7G:
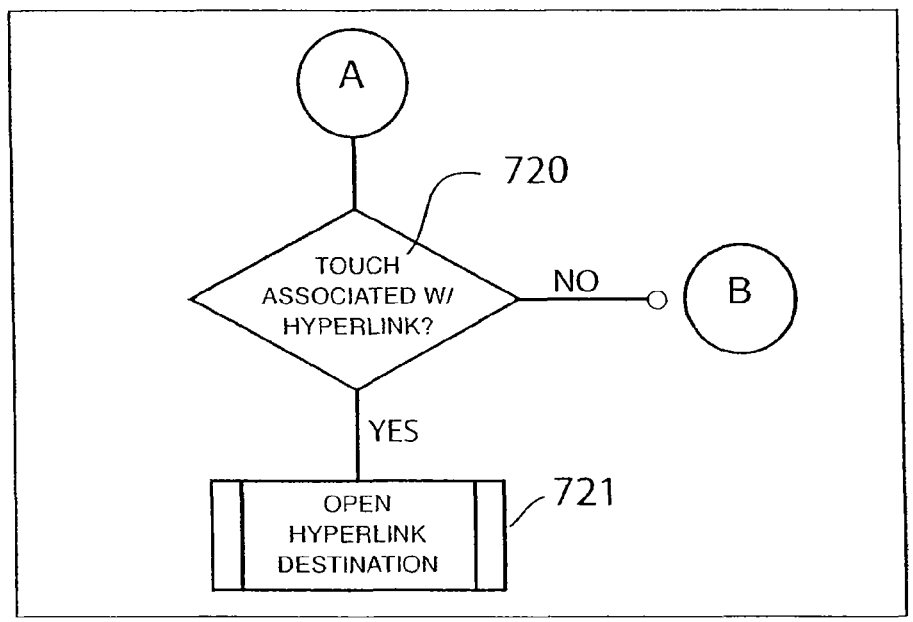
FIGS. 7F-7H show a diagram of a method for recognizing and implementing gestural inputs of FIGS. 7A-E.
Figure 7F:
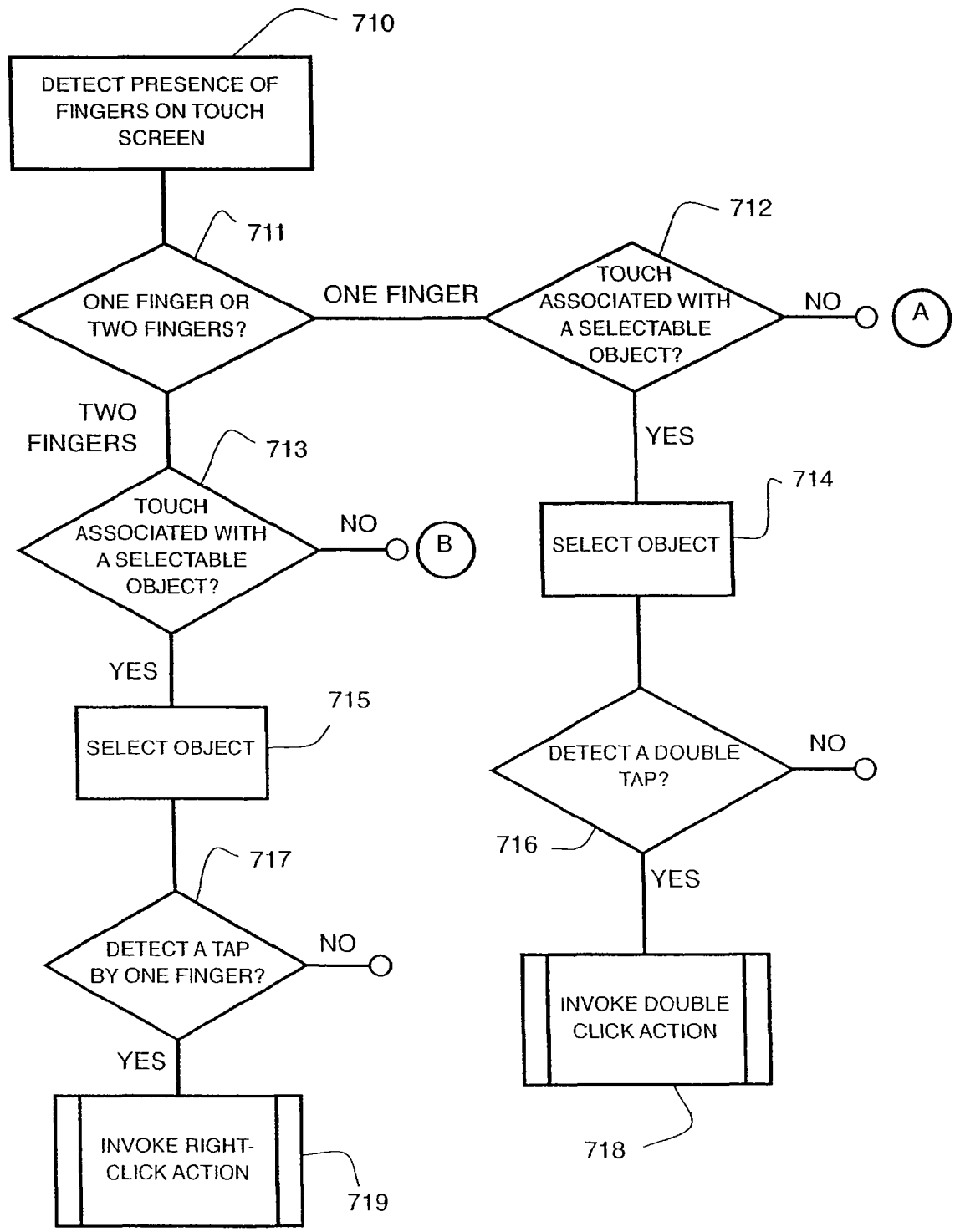

As shown in FIG. 7G, if the one finger touch detected is not associated with a selectable file object, but rather is determined 720 to be associated with a network address hyperlink, then a single-click action can be invoked whereby the hyperlink can be activated. If the hyperlink was touched within a non-browser environment, then a browser application would also be launched.

If a two finger touch is detected 711, then if at least one of the touchdown points is associated with a selectable file object 713, then a selection 715 is made of the object. If one or more tap by one of the fingers on the touch sensitive display is detected 717 while the touchdown point is maintained, then a right-click mouse action can be invoked.

Figure 7H:
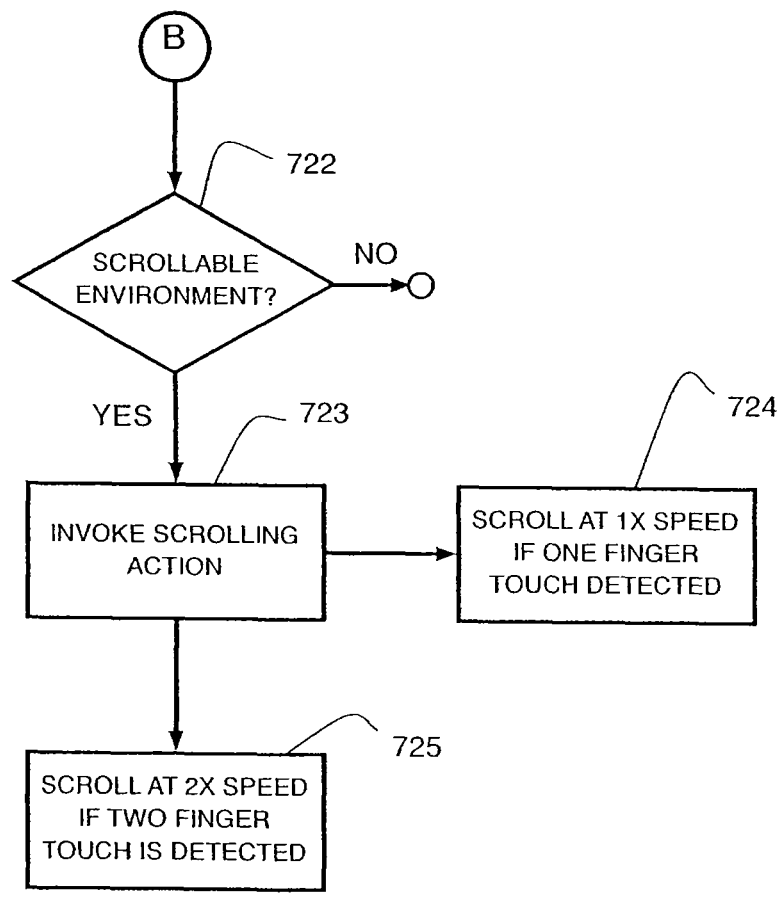
Figure 7I:
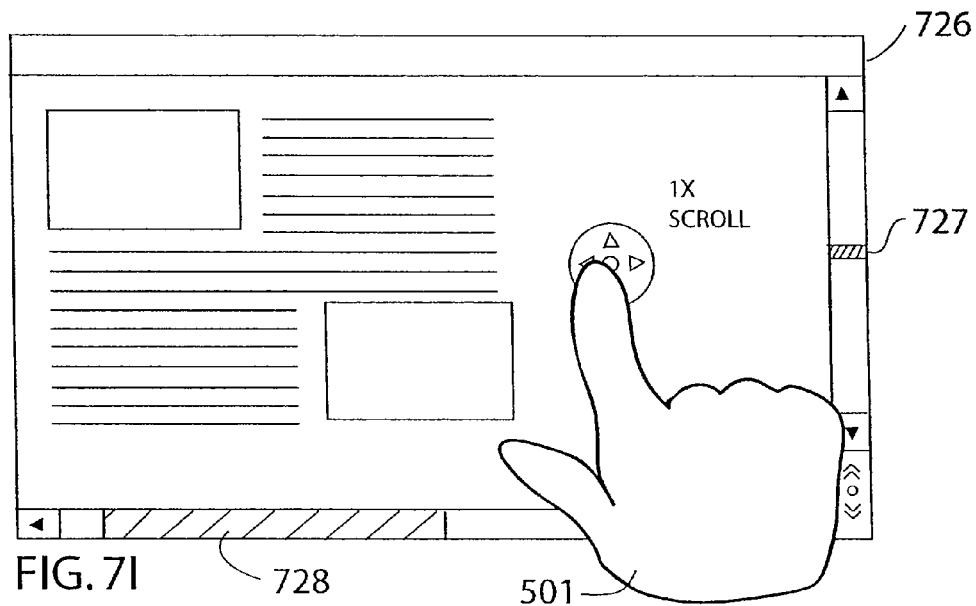

In accordance with a preferred embodiment, if a touch or touches detected are not associated with any selectable file object or hyperlinks, then as shown in FIG. 7H, a determination 722 can be made as to whether the touchdown point(s) is/can be associated with a scrollable area, such as text editing application window, a file listing window, or an Internet webpage.

Scrolling generally pertains to moving displayed data or images across a viewing area on a display screen so that a new set of data can be brought into view in the viewing area. In most cases, once the viewing area is full, each new set of data appears at the edge of the viewing area and all other sets of data move over one position. That is, the new set of data appears for each set of data that moves out of the viewing area. In essence, these functions allow a user to view consecutive sets of data currently outside of the viewing area. In most cases, the user is able to accelerate their traversal through the data sets by moving his or her finger at greater speeds.

Examples of scrolling through lists can be found in U.S. Patent Publication Nos.: 2003/0076303A1, 2003/0076301A1, 2003/0095096A1, which are herein incorporated by reference.

If the touch down point(s) is/can be within a scrollable area, then a scrolling action can be invoked 723 similar to the pressing down of a scroll wheel on a conventional mouse instrument. If the scrollable area is scrollable in only one direction (e.g., up and down), then the scrolling action invoked will be unidirectional scroll. If the scrollable area is scrollable two dimensionally, then the scrolling action invoked will be omnidirectional.

In a unidirectional scrolling action where the scrolling can be restricted to the vertical direction (i.e., the Y axis), the only the vertical vector component of the tracked touch movement will be used as input for effecting vertical scrolling. Similarly, in a unidirectional scrolling action where the scrolling is restricted to the horizontal direction (i.e., the X axis), the only the horizontal vector component of the tracked touch movement will be used as input for effecting horizontal scrolling. If the scrolling action is omnidirectional, then the scrolling action effected will track the movement of the tracked touch.

In accordance with a preferred embodiment, if the detected touch is a one finger touch, then the scrolling action can be ready to be performed 724 at a normal, or 1×, speed. If and once the touched down finger begins to move on the touch screen, then a scroll action can be performed by tracking the movement of the touchdown point on the touch screen. If the detected touch is a two finger touch, then the scrolling action can be performed 725 at a double, or 2× speed. Additional fingers may still be added to perform even faster scrolling action, where a detection of a four finger touch may be translated into "pg up" or "pg dn" commands within a multi-page document window.

In accordance with another embodiment, the displayed data continues to move even when the finger is removed from the touch screen. The continuous motion can be based at least in part on the previous motion. For example the scrolling can be continued in the same direction and speed. In some cases, the scrolling slow down over time, i.e., the speed of the traversal through the media items gets slower and slower until the scrolling eventually stops thereby leaving a static list. By way of example, each new media item brought into the viewing area may incrementally decrease the speed. Alternatively or additionally, the displayed data stops moving when the finger is placed back on the touch screen. That is, the placement of the finger back on the touch screen can implement braking, which stops or slows down the continuous acting motion.

By way of examples to illustrate the above discussed gestural actions, as shown in FIG. 7A, using a touch screen (such as the multi-touch screen 24 shown in FIG. 2), a single finger tap with a finger 501 on an image object (e.g., a file listing 500) may be translated into the equivalent of a single click of a mouse, which in this instance may indicate a selection, which is typically indicated by highlighting of the selected file or image object. A detected double tap on the image object may be translated into the equivalent of a double click of a mouse, which may invoke a launch of an application associated with the image object tapped. For instance, a double tapping of a file listing on a screen, such as a photo file, may cause the launch of a photo viewer application and the opening of that photo file.

Drag-and-drop function can be invoked by touching, within at least one finger, the image associated with the object to be dropped and graphically dragging the object to the desired drop location by maintaining the touch, such as shown in FIG. 7B, illustrating a drag and drop of a file listing 501 from folder window 502 to folder window 503.

Certain mouse functionalities may require two touches to complete. For instance, as shown in FIG. 7C, a "right click" gesture can be invoked by two fingers, with one finger as the touchdown finger 506 and a second finger 507 tapping the screen at least once to indicate a right click action. FIG. 7D illustrates that, after a right click action can be performed, an action window 504 can be invoked, after which the first finger can move over to the invoked window 504 to select and tap an action item 505 with a single finger 506. In accordance with one embodiment of this invention, a right click action can be effected only if the tapping detected is located in close proximity of the detected touchdown, and only if the tapping detected is located to the left of the touchdown finger (right of the touchdown finger from the user's point of view).

Other file selection functions that normally require a combination of mouse and keyboard action can be performed using only touch action. For instance, in the Microsoft Windows environment, to select multiple files within file window 502, a user typically needs to hold down the shift button while dragging the mouse icon over the sequential files to be selected. Without holding down the shift button, the dragging of the mouse icon may be interpreted as a drag and drop action. As shown in FIG. 7E, in accordance with an embodiment of the invention, a detection of two closely associated touch drag of file listings may be read as a multi-selection action for selecting a group of files 508. In order to avoid misinterpreting the two-touch action as another command, such as a rotating action, the two-touch multi-selection function is preferably invoked only if the two touches detected are in relative close proximity to each other.

Figure 7J:
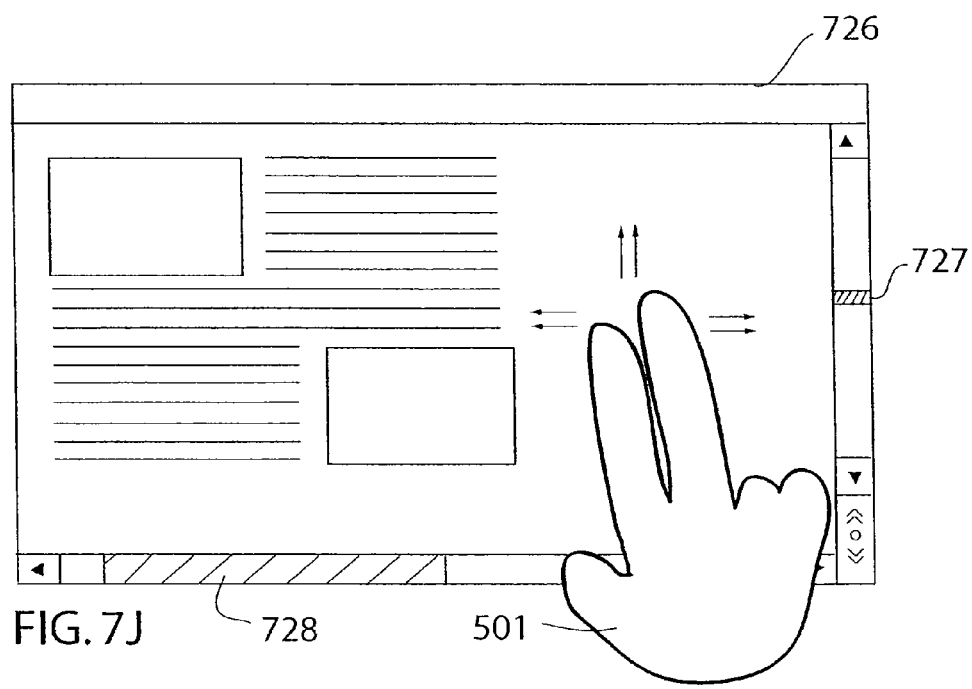

Referring to the scrolling actions described in FIG. 7H, and as shown in FIGS. 71 and 7J, a one or two finger touchdown within a scrollable window may cause the displayed content of the window to scroll at different speeds. Specifically, once a scrolling action is invoked 723, the scrolling takes place a 1× speed 724 if it is determined that only one finger (or one touchdown point) is detected on the touch sensitive display, and at 2× speed if two fingers (or two touchdown points) are detected. In accordance with a preferred embodiment, during the scroll action, scroll bars 727 and 728 move in correspondence to the direction of the scrolls.

Finally, using a multi-touch display that is capable of proximity detection, such as the panels described in the aforementioned and incorporated by reference commonly assigned co-pending application Ser. No. 10/840,862 (published on as U.S. patent publication no. US2006/0097991) and application titled "Proximity and Multi-Touch Sensor Detection and Demodulation," filed on Jan. 3, 2007, gestures of a finger can also be used to invoke hovering action that can be the equivalent of hovering a mouse icon over an image object.

Figure 7K:
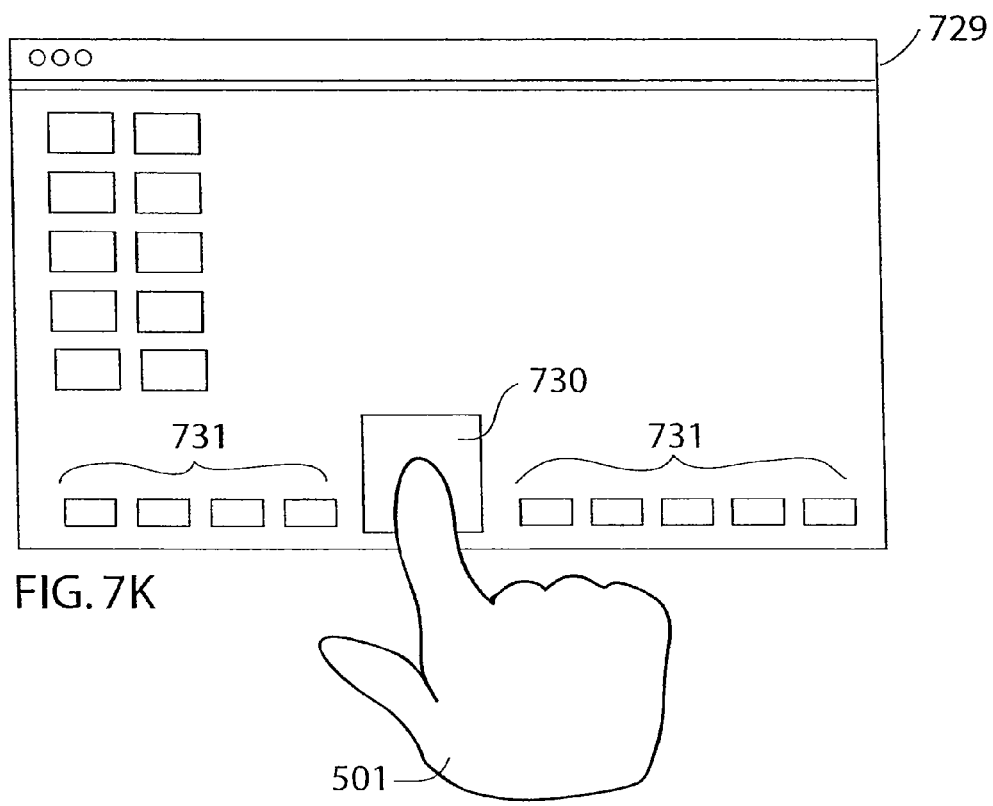

By way of an example, referring to FIG. 7K, the detection of proximity of a user's finger 501 over application icons 731 within a desktop 729 can be interpreted as a hovering action, which invokes the rolling popup of the hovered application icon 730. If the user touches the popped up icon, then a double-click action can be invoked whereby the application can be launched. Similar concepts can be applied to application specific situations, such as when photo files are displayed in a thumbnail format within a photo management software, and a detection of proximity of a finger over a thumbnail invokes a hover action whereby the size of the hovered photo thumbnail can be enlarged (but not selected).

Gestures can also be used to invoke and manipulate virtual control interfaces, such as volume knobs, switches, sliders, keyboards, and other virtual interfaces that can be created to facilitate human interaction with a computing system or a consumer electronic item. By way of an example using a gesture to invoke a virtual control interface, and referring to FIGS. 8A-8H, a rotate gesture for controlling a virtual volume knob 170 on a GUI interface 172 of a display 174 of a tablet PC 175 will be described. In order to actuate the knob 170, the user places their fingers 176 on a multipoint touch screen 178. The virtual control knob may already be displayed, or the particular number, orientation or profile of the fingers at set down, or the movement of the fingers immediately thereafter, or some combination of these and other characteristics of the user's interaction may invoke the virtual control knob to be displayed. In either case, the computing system associates a finger group to the virtual control knob and makes a determination that the user intends to use the virtual volume knob.

This association may also be based in part on the mode or current state of the computing device at the time of the input. For example, the same gesture can be interpreted alternatively as a volume knob gesture if a song is currently playing on the computing device, or as a rotate command if an object editing application is being executed. Other user feedback can be provided, including for example audible or tactile feedback.

Figure 8A:
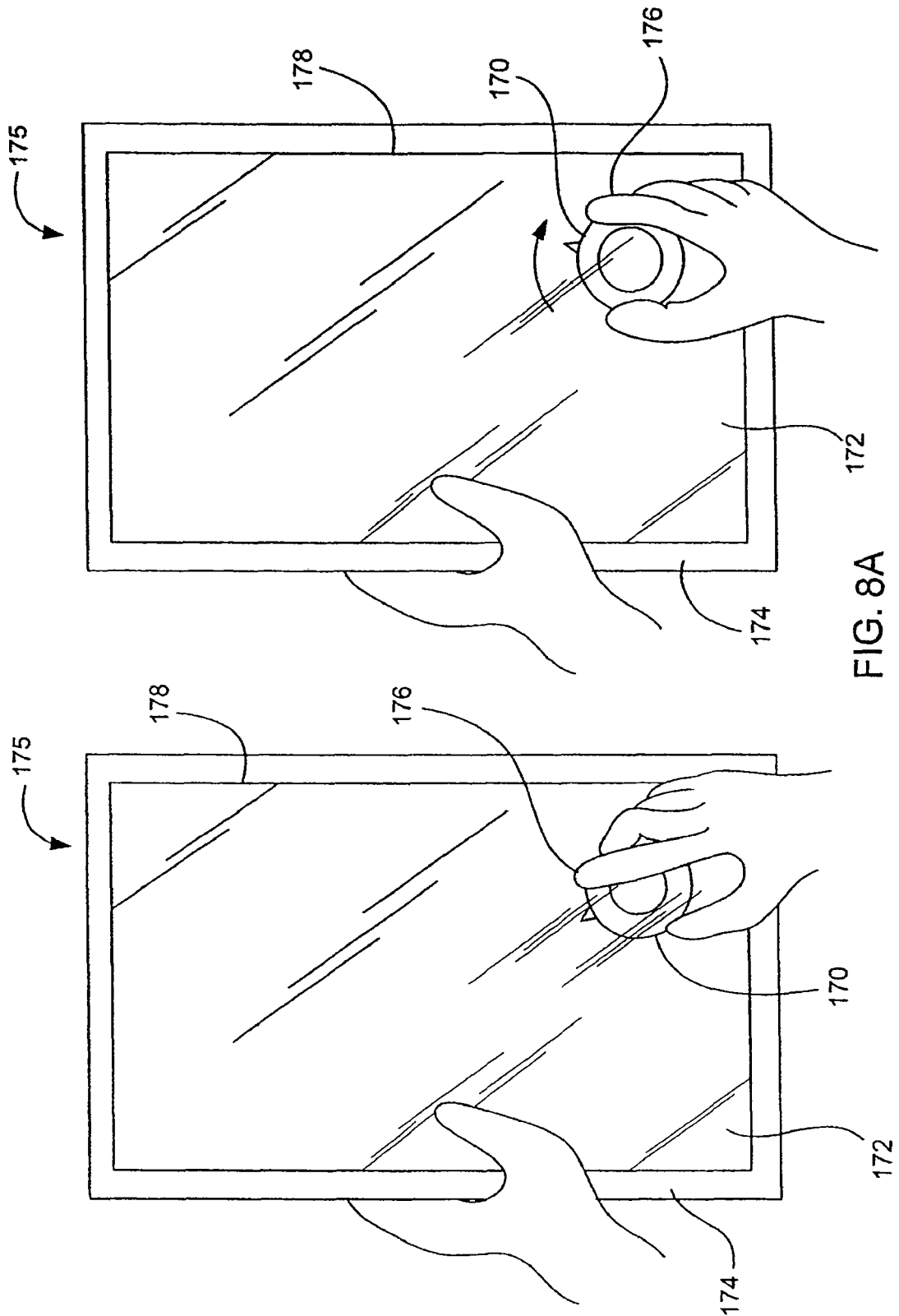

Once the knob 170 is displayed as shown in FIG. 8A, the user's fingers 176 can be positioned around the knob 170 similar to if it were an actual knob or dial, and thereafter can be rotated around the knob 170 in order to simulate turning the knob 170. Again, audible feedback in the form of a clicking sound or tactile feedback in the form of vibration, for example, can be provided as the knob 170 can be "rotated." The user may also use his or her other hand to hold the tablet PC 175.

Figure 8B:
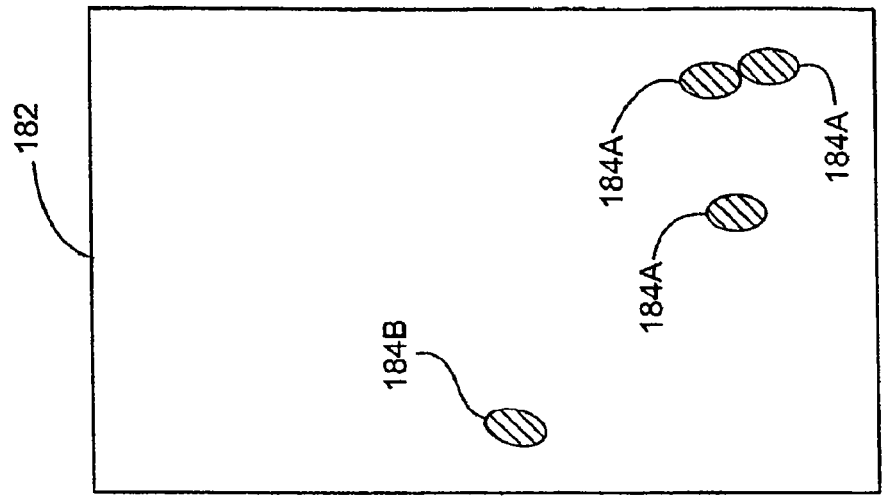
Figure 8B:
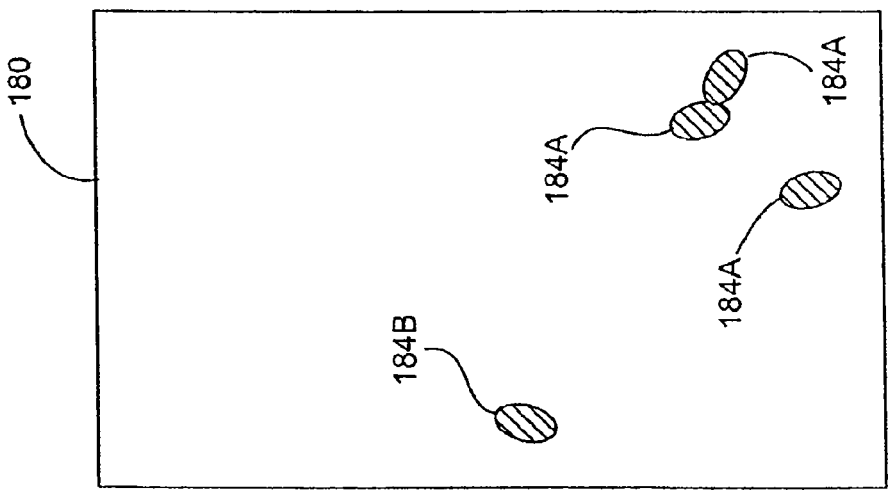

As shown in FIG. 8B, the multipoint touch screen 178 detects at least a pair of images. In particular, a first image 180 is created at set down, and at least one other image 182 can be created when the fingers 176 are rotated. Although only two images are shown, in most cases there would be many more images that incrementally occur between these two images. Each image represents a profile of the fingers in contact with the touch screen at a particular instant in time. These images can also be referred to as touch images. It will be understood that the term "image" does not mean that the profile is displayed on the screen 178 (but rather imaged by the touch sensing device). It should also be noted that although the term "image" is used, the data can be in other forms representative of the touch plane at various times.

Figure 8C:
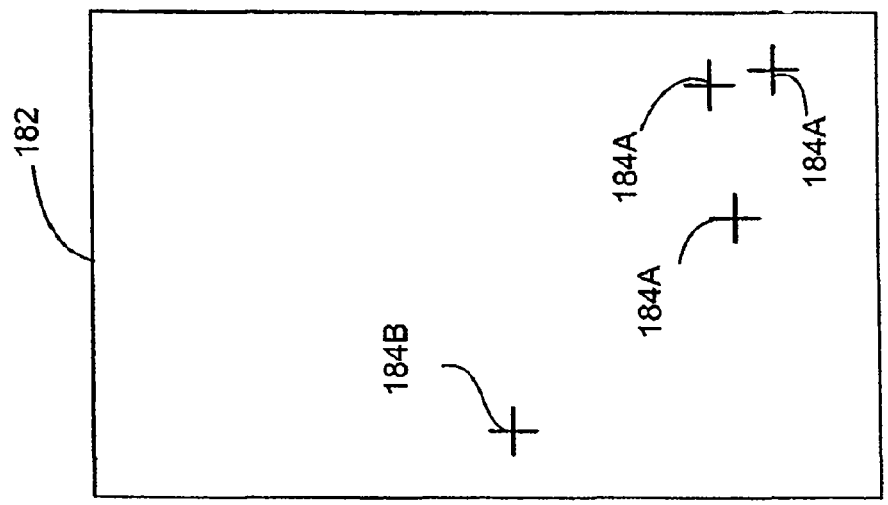
Figure 8C:
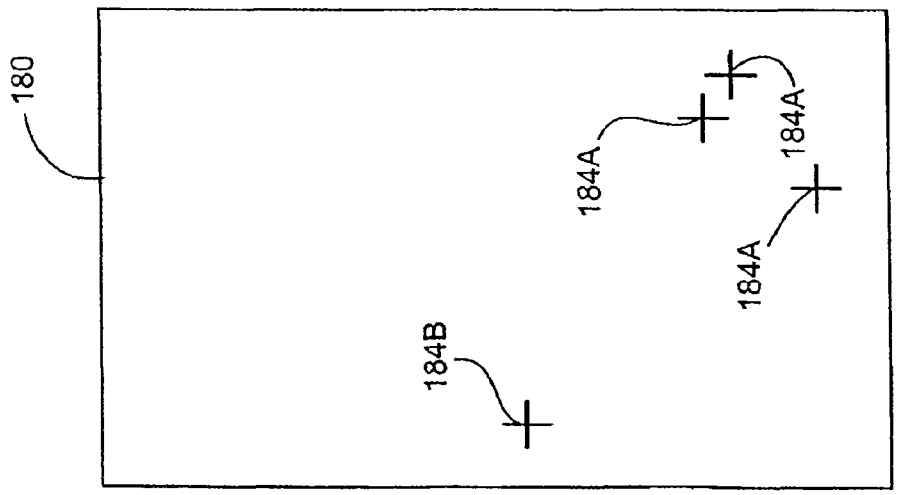

As shown in FIG. 8C, each of the images 180 and 182 can be converted to a collection of features 184. Each feature 184 can be associated with a particular touch as for example from the tips each of the fingers 176 surrounding the knob 170 as well as the thumb of the other hand 177 used to hold the tablet PC 175.

Figure 8D:
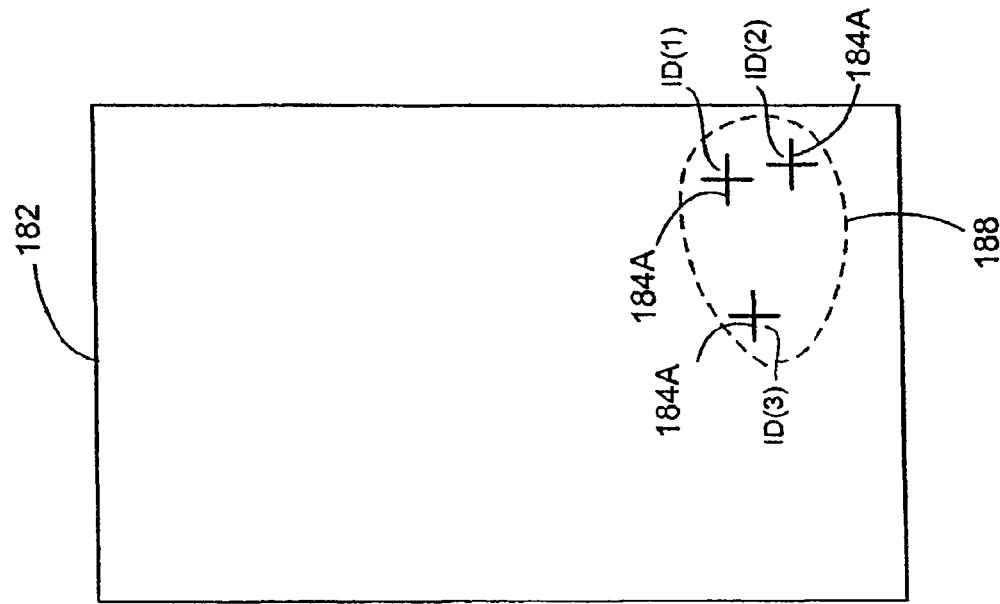
Figure 8D:
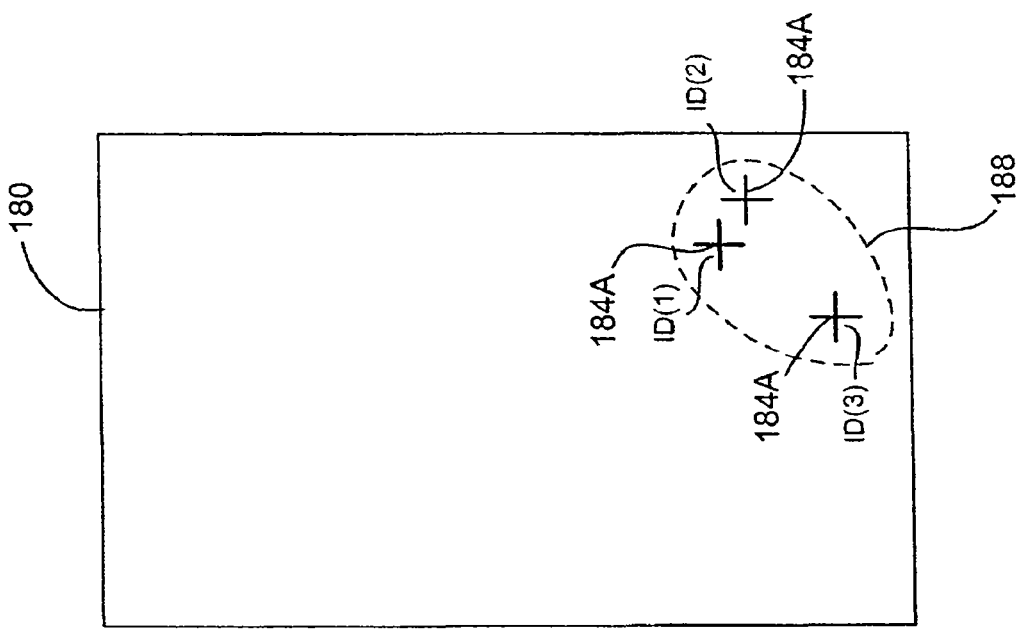

As shown in FIG. 8D, the features 184 are classified, i.e., each finger/thumb is identified, and grouped for each of the images 180 and 182. In this particular case, the features 184A associated with the knob 170 can be grouped together to form group 188 and the feature 184B associated with the thumb can be filtered out. In alternative arrangements, the thumb feature 184B may be treated as a separate feature by itself (or in another group), for example, to alter the input or operational mode of the system or to implement another gesture, for example, a slider gesture associated with an equalizer slider displayed on the screen in the area of the thumb (or other finger).

As shown in FIG. 8E, the key parameters of the feature group 188 can be calculated for each image 180 and 182. The key parameters associated with the first image 180 represent the initial state and the key parameters of the second image 182 represent the current state.

Also as shown in FIG. 8E, the knob 170 is the UI element associated with the feature group 188 because of its proximity to the knob 170. Thereafter, as shown in FIG. 8F, the key parameter values of the feature group 188 from each image 180 and 182 can be compared to determine the rotation vector, i.e., the group of features rotated five (5) degrees clockwise from the initial to current state. In FIG. 8F, the initial feature group (image 180) is shown in dashed lines while the current feature group (image 182) is shown in solid lines.

Figure 8G:
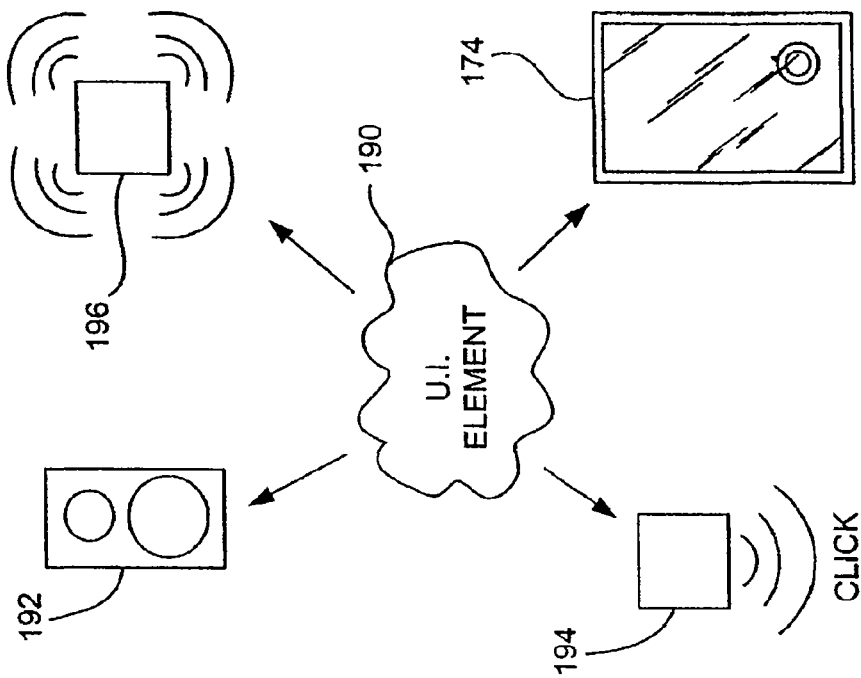
Figure 8F:
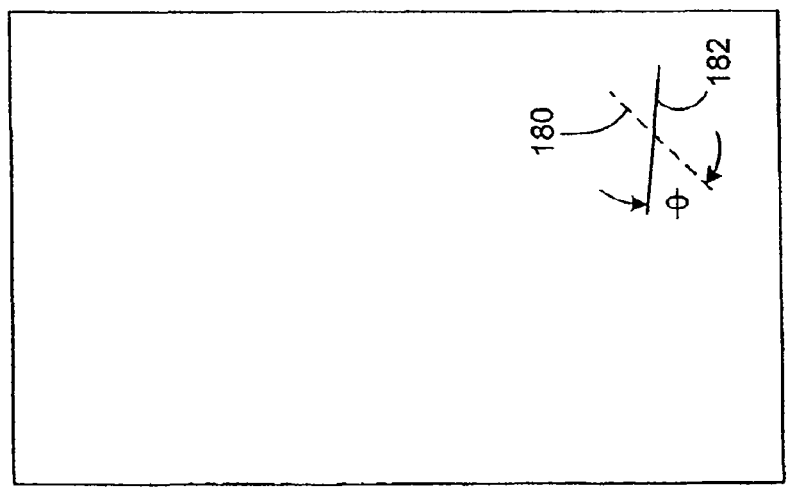

As shown in FIG. 8G, based on the rotation vector the speaker 192 of the tablet PC 175 increases (or decreases) its output in accordance with the amount of rotation of the fingers 176, i.e., increase the volume by 5% based on rotation of 5 degrees. The display 174 of the tablet PC can also adjust the rotation of the knob 170 in accordance with the amount of rotation of the fingers 176, i.e., the position of the knob 170 rotates five (5) degrees. In most cases, the rotation of the knob occurs simultaneously with the rotation of the fingers, i.e., for every degree of finger rotation the knob rotates a degree. In essence, the virtual control knob follows the gesture occurring on the screen. Still further, an audio unit 194 of the tablet PC can provide a clicking sound for each unit of rotation, e.g., provide five clicks based on rotation of five degrees. Still yet further, a haptics unit 196 of the tablet PC 175 can provide a certain amount of vibration or other tactile feedback for each click thereby simulating an actual knob.

It should be noted that additional gestures can be performed simultaneously with the virtual control knob gesture. For example, more than one virtual control knob can be controlled at the same time using both hands, i.e., one hand for each virtual control knob. Alternatively or additionally, one or more slider bars can be controlled at the same time as the virtual control knob, i.e., one hand operates the virtual control knob, while at least one finger and alternatively more than one finger of the opposite hand operates at least one slider and alternatively more than one slider bar, e.g., slider bar for each finger.

It should also be noted that although the embodiment is described using a virtual control knob, in another embodiment, the UI element can be a virtual scroll wheel. As an example, the virtual scroll wheel can mimic an actual scroll wheel such as those described in U.S. patent publication nos. US2003/0076303A1, US2003/0076301A1, and US2003/0095096A1, all of which are herein incorporated by reference.

Figure 9:
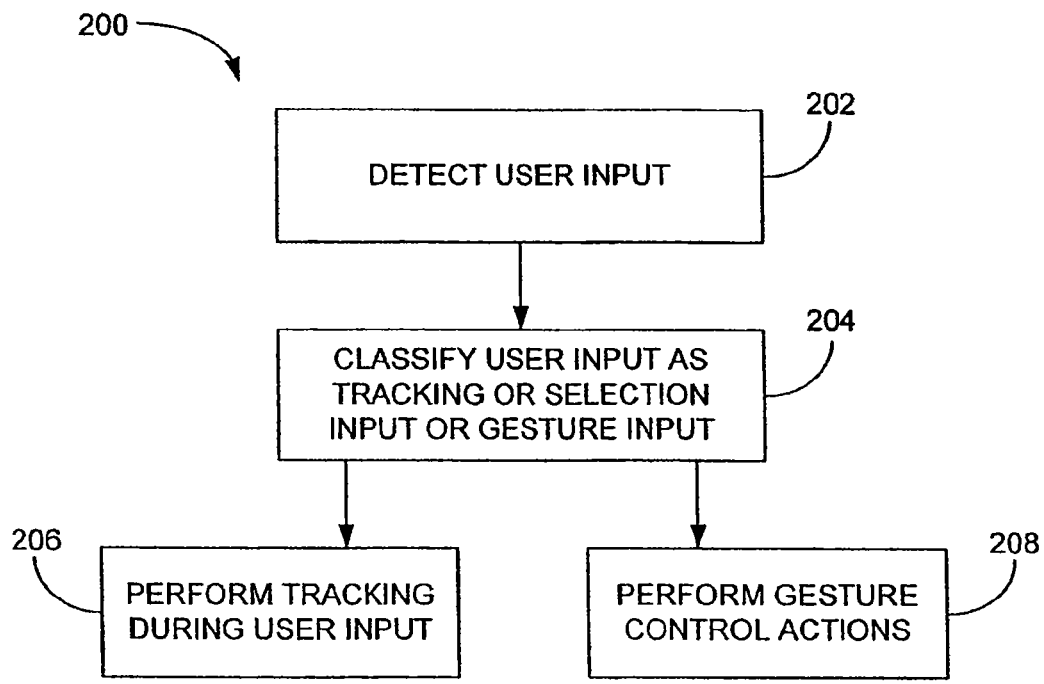
FIG. 9 is a diagram of a touch-based method, in accordance with one embodiment of this invention.

FIG. 9 is a diagram of a touch-based method 200 in accordance with one embodiment of the invention. The method generally begins at block 202 where a user input that occurs over a multipoint sensing device can be detected. The user input can include one or more touch inputs, with each touch input having a unique identifier. Following block 202, the touch-based method 200 proceeds to block 204 where the user input can be classified as a tracking or selection input when the user input can include a single unique identifier (one touch input), or can be classified as a gesture input when the user input can include at least two unique identifiers (more than one touch input). If the user input can be classified as a tracking input, the touch-based method 200 proceeds to block 206 where tracking can be performed corresponding to the user input.

If the user input is classified as a gesture input, the touch-based method 200 proceeds to block 208 where one or more gesture control actions can be performed corresponding the user input. The gesture control actions can be based at least in part on changes that occur with or between the at least two unique identifiers.

Figure 10:
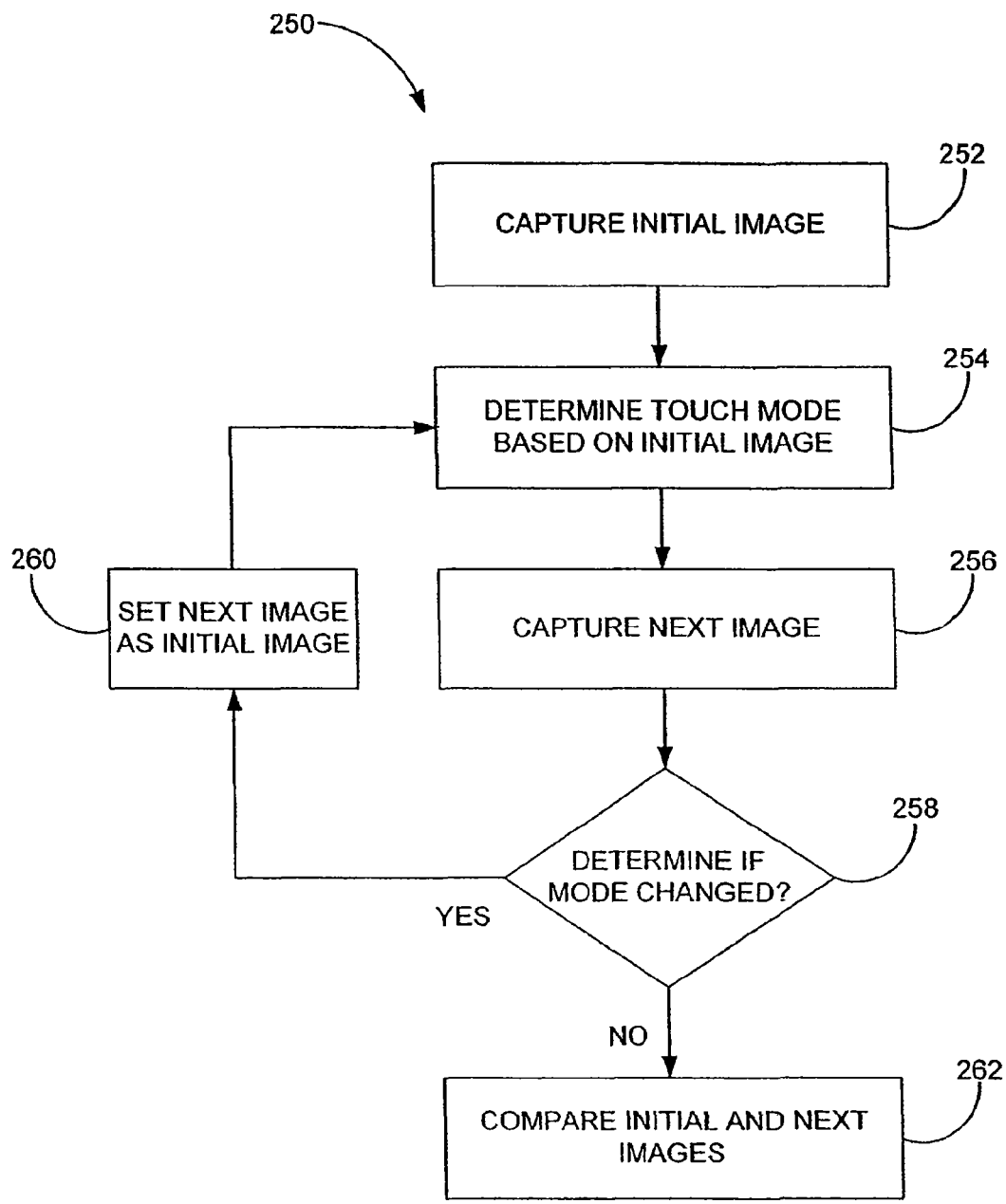
FIG. 10 is a diagram of a touch-based method, in accordance with one embodiment of this invention.

FIG. 10 is a diagram of a touch-based method 250 in accordance with one embodiment of the invention. The touch-based method 250 generally begins at block 252 where an initial image can be captured during an input stroke on a touch sensitive surface. Following block 252, the touch-based method 250 proceeds to block 254 where the touch mode can be determined based on the initial image. For example, if the initial image includes a single unique identifier then the touch mode may correspond to a tracking or selection mode. On the other hand, if the image includes more than one unique identifier, then the touch mode may correspond to a gesture mode.

Following block 254, the touch-based method 250 proceeds to block 256 where a next image can be captured during the input stroke on the touch sensitive surface. Images can be typically captured sequentially during the stroke and thus the there may be a plurality of images associated with the stroke.

Following block 256, touch-based method 250 proceeds to block 258 where a determination can be made as to whether the touch mode changed between capture of the initial image and capture of the next image. If the touch mode changed, the touch-based method 250 proceeds to block 260 where the next image can be set as the initial image and thereafter the touch mode is again determined at block 254 based on the new initial image. If the touch mode stayed the same, the touch-based method 250 proceeds to block 262 where the initial and next images can be compared and one or more control signals can be generated based on the comparison.

Figure 11:
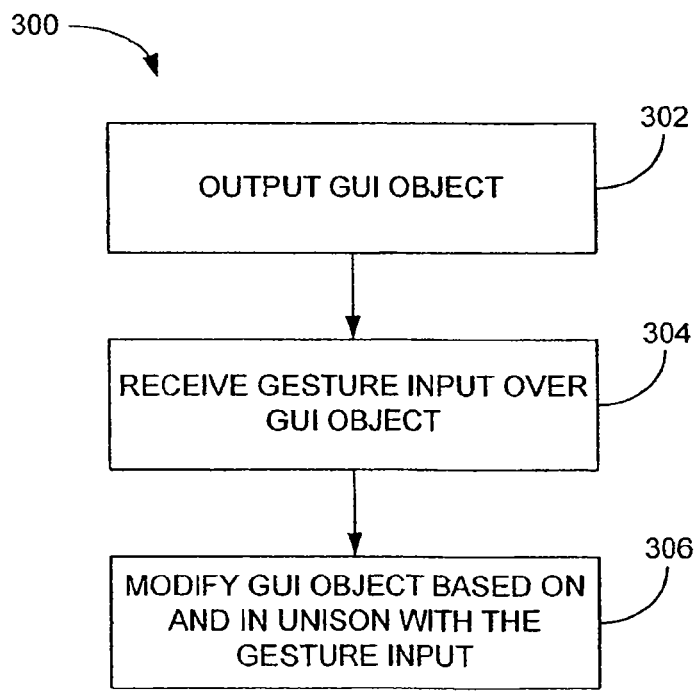
FIG. 11 is a diagram of a touch-based method, in accordance with one embodiment of this invention.

FIG. 11 is a diagram of a touch-based method 300 in accordance with one embodiment of the invention. The touch-based method 300 begins at block 302 where an image object, which can be a GUI object, can be output. For example, a processor may instruct a display to display a particular image object. Following block 302, the touch-based method 300 proceeds to block 304 where a gesture input is received over the image object. For instance, a user may set or move their fingers in a gestural way on the surface of the touch screen and while over the displayed image object. The gestural input may include one or more single gestures that occur consecutively or multiple gestures that occur simultaneously. Each of the gestures generally has a particular sequence, motion, or orientation associated therewith. For example, a gesture may include spreading fingers apart or closing fingers together, rotating the fingers, translating the fingers, and/or the like.

Following block 304 the touch-based method 300 proceeds to block 306 where the Image object can be modified based on and in unison with the gesture input. By modified, it is meant that the image object changes according to the particular gesture or gestures being performed. By in unison, it is meant that the changes occur approximately while the gesture or gestures are being performed. In most cases, there is a one to one relationship between the gesture(s) and the changes occurring at the image object and they occur substantially simultaneously. In essence, the image object follows the motion of the fingers. For example, spreading of the fingers may simultaneously enlarge the object, closing of the fingers may simultaneously reduce the image object, rotating the fingers may simultaneously rotate the object, translating the fingers may allow simultaneous panning or scrolling of the image object.

In one embodiment, block 306 can include determining which image object is associated with the gesture being performed, and thereafter locking the displayed object to the fingers disposed over it such that the image object changes in accordance with the gestural input. By locking or associating the fingers to the image object, the image object can continuously adjust itself in accordance to what the fingers are doing on the touch screen. Often the determination and locking occurs at set down, i.e., when the finger is positioned on the touch screen.

Figure 12:
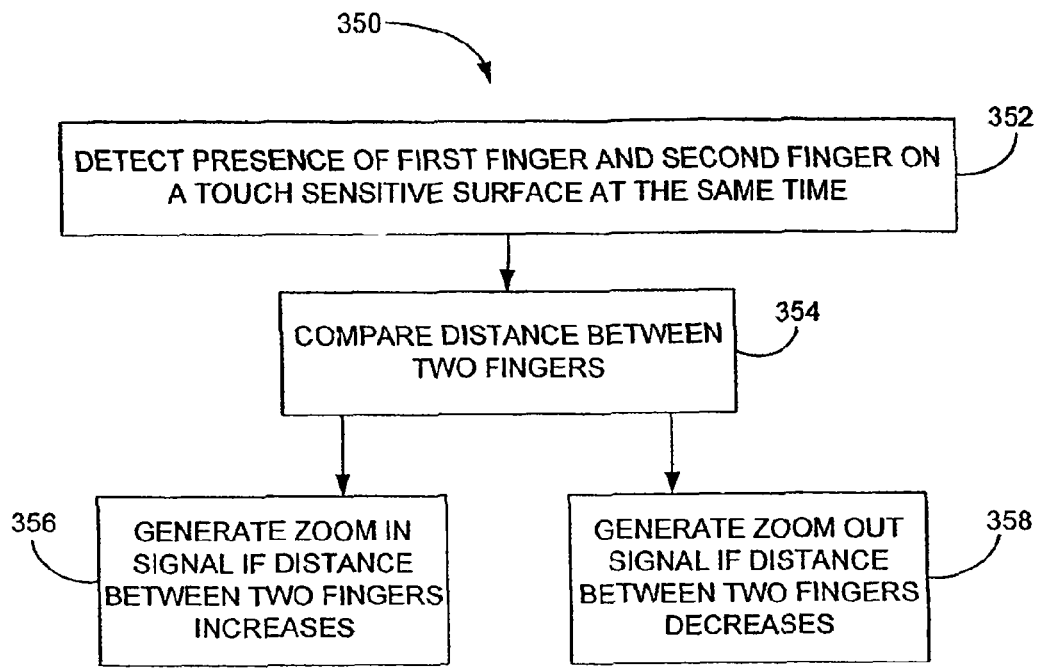
FIG. 12 is a diagram of a zoom gesture method, in accordance with one embodiment of this invention.

FIG. 12 is a diagram of a zoom gesture method 350, in accordance with one embodiment of the invention. The zoom gesture can be performed on a multipoint touch screen such as the multi-touch panel 24 shown in FIG. 2. The zoom gesture method 350 generally begins at block 352 where the presence of at least a first finger and a second finger are detected on a touch sensitive surface at the same time. The presence of at least two fingers can be configured to indicate that the touch is a gestural touch rather than a tracking touch based on one finger. In some cases, the presence of only two fingers indicates that the touch is a gestural touch. In other cases, any number of more than two fingers indicates that the touch is a gestural touch. In fact, the gestural touch can be configured to operate whether two, three, four or more fingers are touching, and even if the numbers change during the gesture, i.e., only need a minimum of two fingers at any time during the gesture.

Following block 352, the zoom gesture method 350 proceeds to block 354 where the distance between at least the two fingers is compared. The distance may be from finger to finger or from each finger to some other reference point as for example the centroid. If the distance between the two fingers increases (spread apart), a zoom-in signal can be generated as shown in block 356. If the distance between two fingers decreases (close together), a zoom-out signal can be generated as shown in block 358. In most cases, the set down of the fingers will associate or lock the fingers to a particular image object being displayed. For example, the touch sensitive surface can be a touch screen, and the image object can be displayed on the touch screen. This typically occurs when at least one of the fingers is positioned over the image object. As a result, when the fingers are moved apart, the zoom-in signal can be used to increase the size of the embedded features in the image object and when the fingers are pinched together, the zoom-out signal can be used to decrease the size of embedded features in the object. The zooming typically occurs within a predefined boundary such as the periphery of the display, the periphery of a window, the edge of the image object, and/or the like. The embedded features can be formed on a plurality of layers, each of which represents a different level of zoom.

In most cases, the amount of zooming varies according to the distance between the two objects. Furthermore, the zooming typically can occur substantially simultaneously with the motion of the objects. For instance, as the fingers spread apart or close together, the object zooms in or zooms out at the same time. Although this methodology is directed at zooming, it should be noted that it may also be used for enlarging or reducing. The zoom gesture method 350 may be particularly useful in graphical programs such as publishing, photo, and drawing programs. Moreover, zooming may be used to control a peripheral device such as a camera, i.e., when the finger is spread apart, the camera zooms out, and when the fingers are closed the camera zooms in.

Figure 13A:
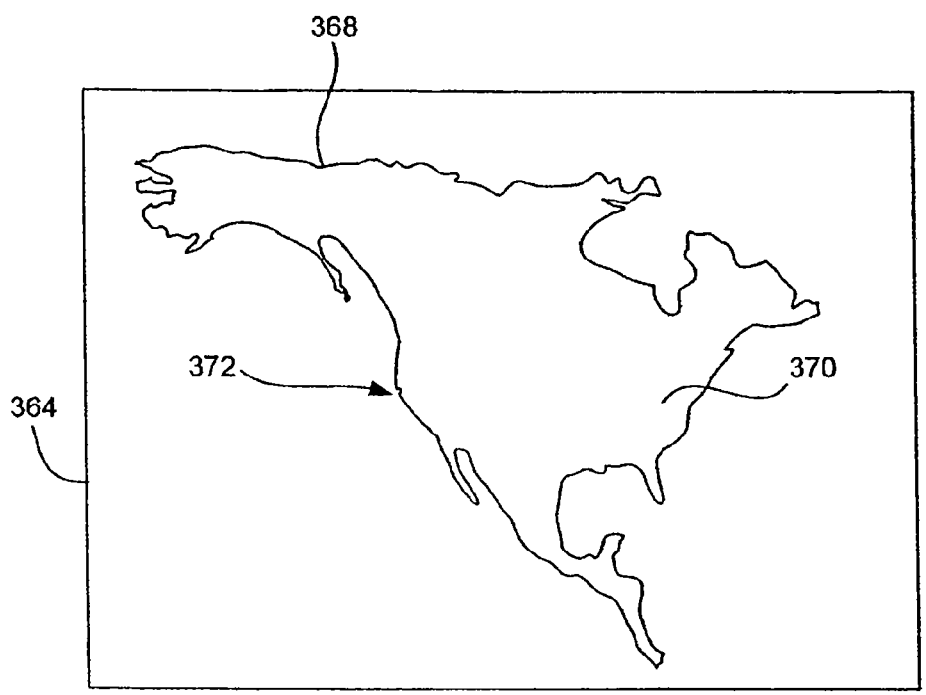
FIGS. 13A-13H illustrates a zooming sequence, in accordance with one embodiment of this invention.
Figure 13B:
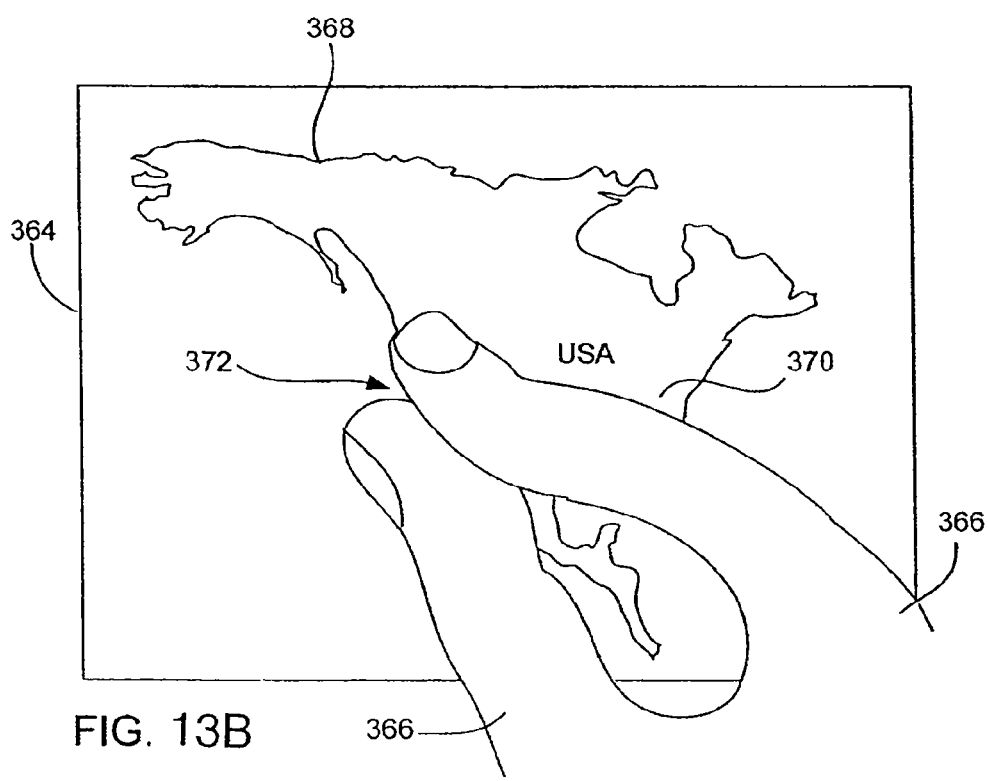
Figure 13C:
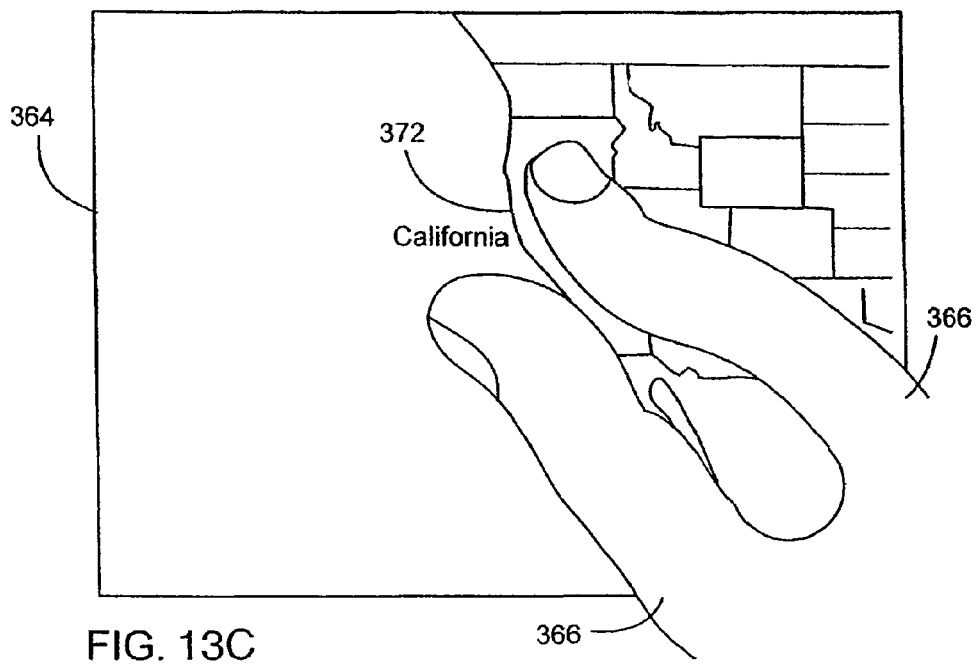
Figure 13D:
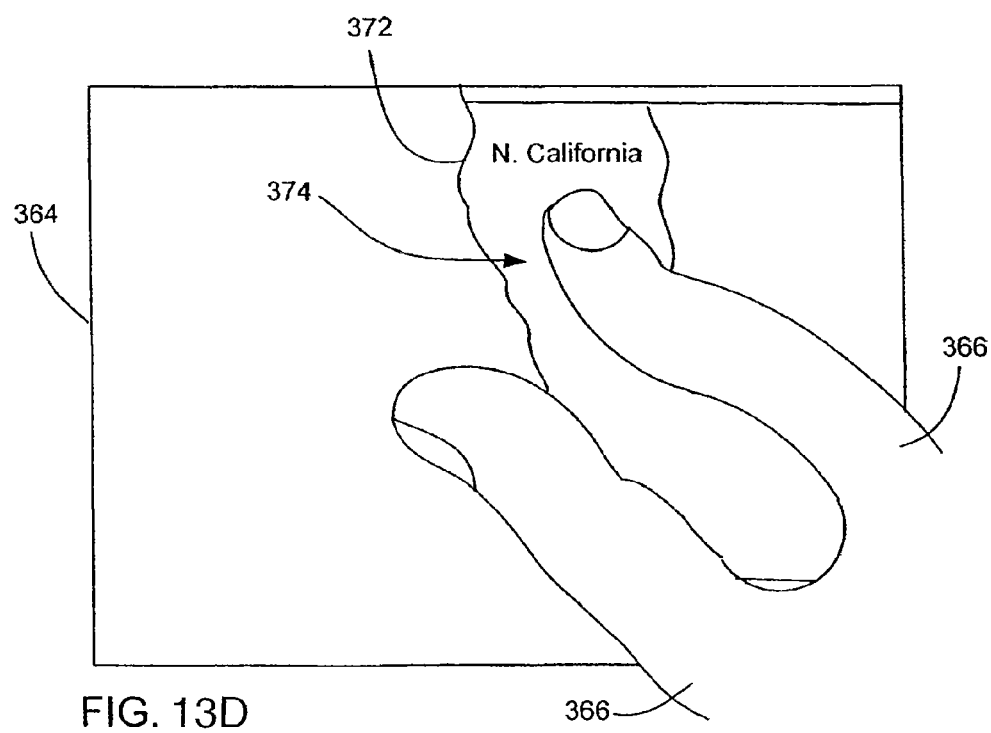
Figure 13E:
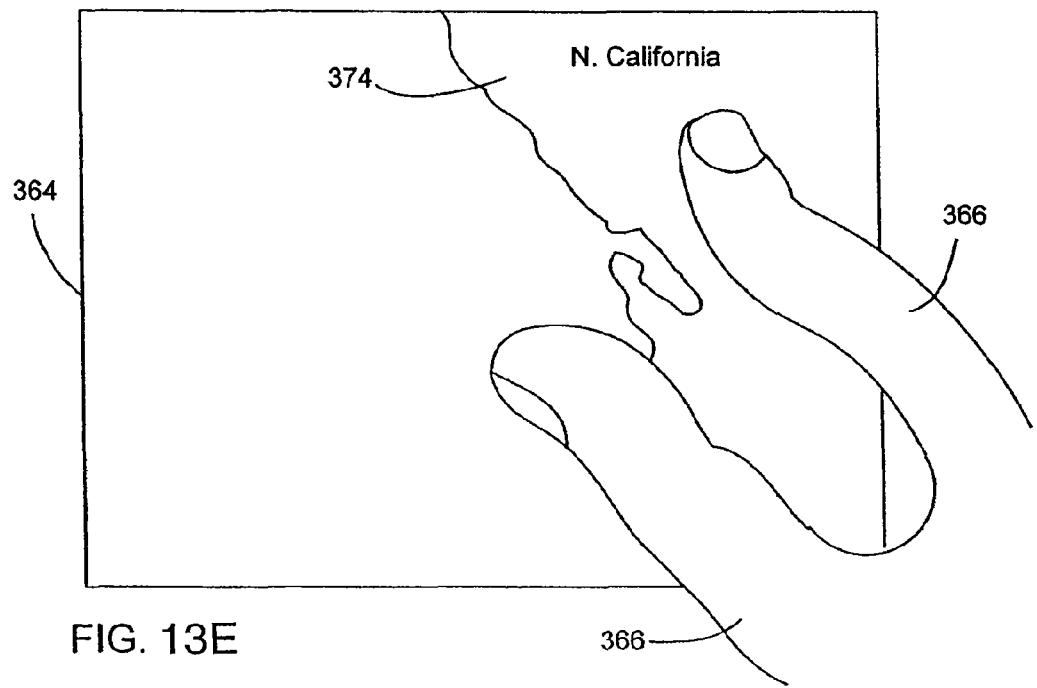
Figure 13F:
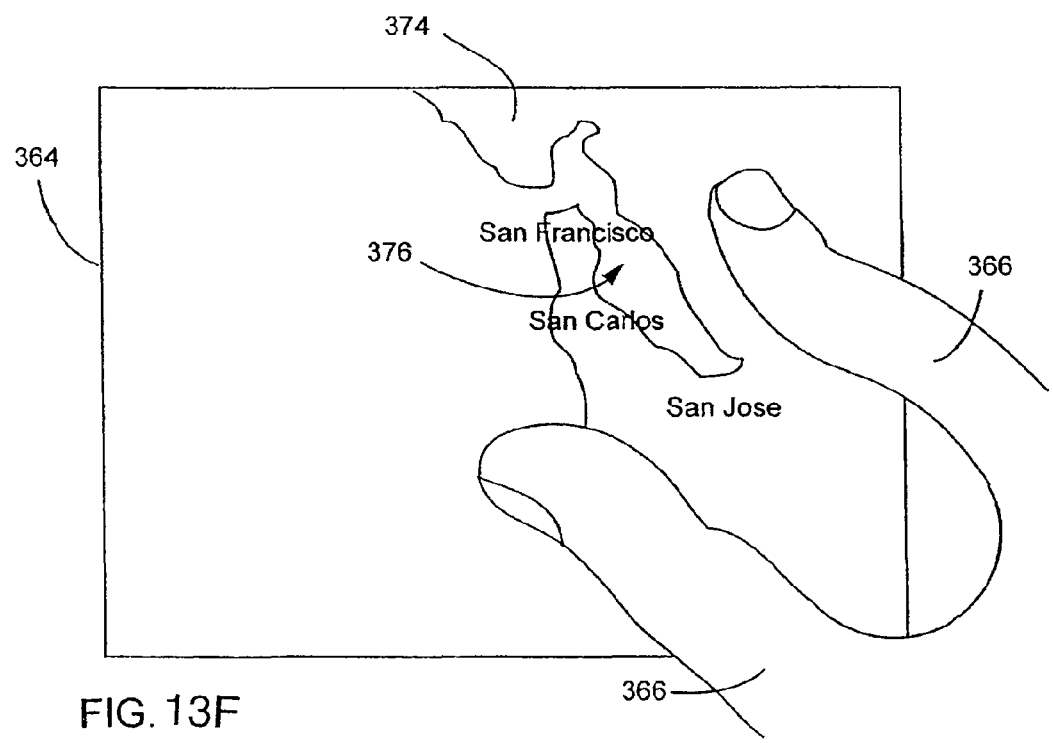
Figure 13G:
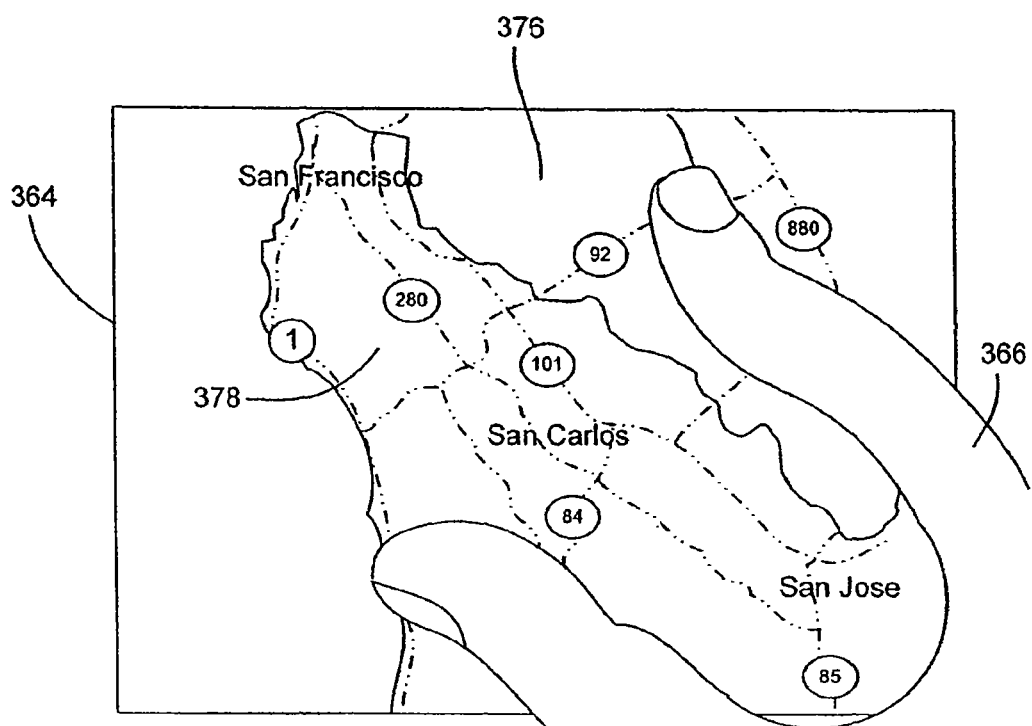
Figure 13H:
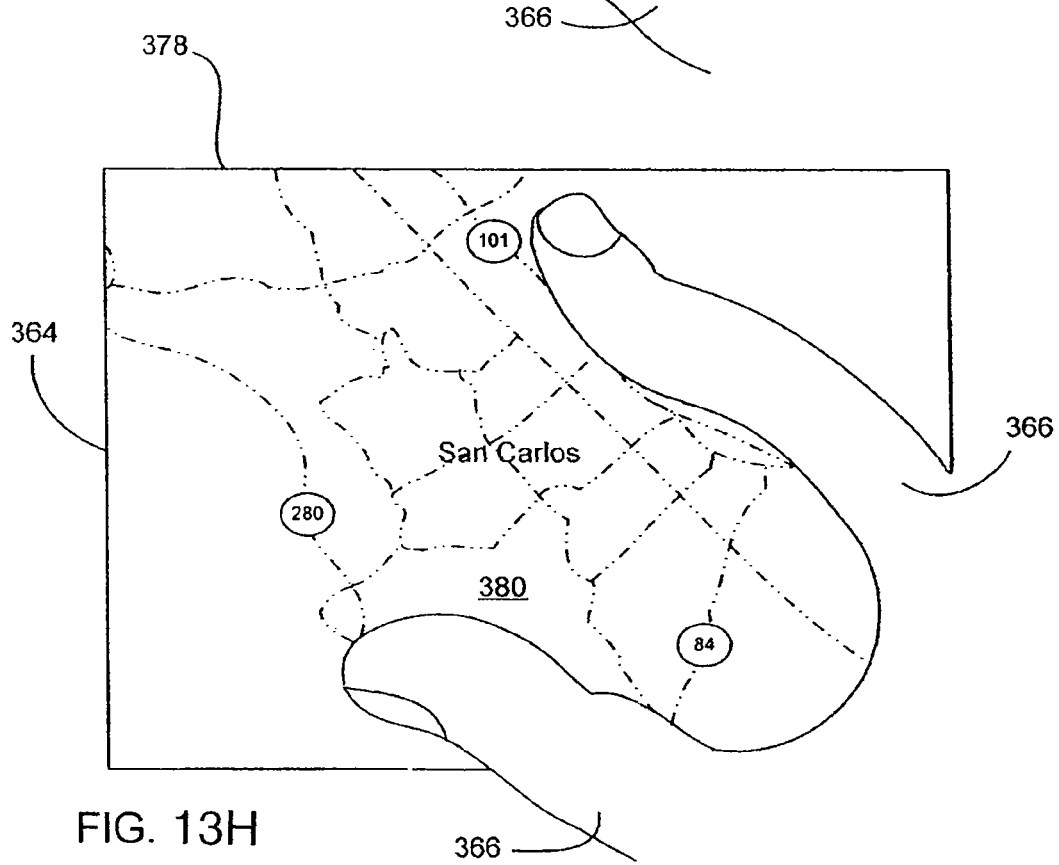

FIGS. 13A-13H illustrate a zooming sequence using the method described above. FIG. 13A illustrates a display presenting an image object 364 in the form of a map of North America with embedded levels which can be zoomed. In some cases, as shown, the image object can be positioned inside a window that forms a boundary of the image object 364. FIG. 13B illustrates a user positioning their fingers 366 over a region of North America 368, particularly the United States 370 and more particularly California 372. In order to zoom in on California 372, the user starts to spread their fingers 366 apart as shown in FIG. 13C. As the fingers 366 spread apart further (detected distance increases), the map zooms in further on Northern California 374, then to a particular region of Northern California 374, then to the Bay area 376, then to the peninsula 378 (e.g., the area between San Francisco and San Jose Area), and then to the city of San Carlos 380 located between San Francisco and San Jose as illustrated in FIGS. 13D-13H. In order to zoom out of San Carlos 380 and back to North America 368, the fingers 366 are closed back together following the sequence described above, but in reverse.

Figure 14:
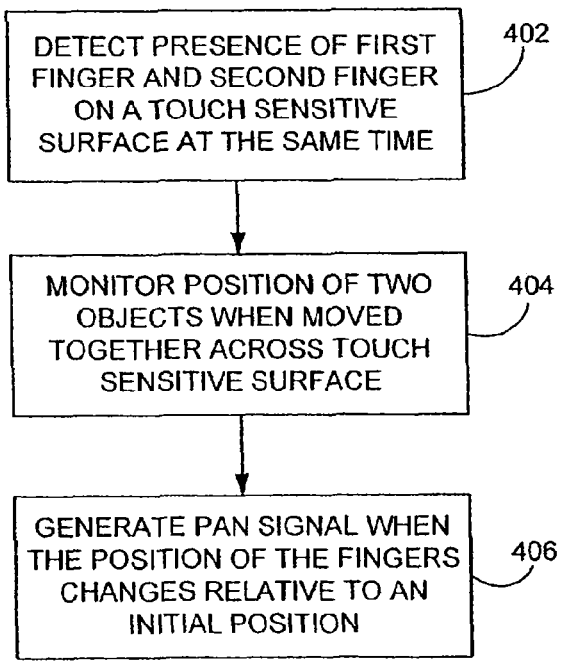
FIG. 14 is a diagram of a pan method, in accordance with one embodiment of this invention.

FIG. 14 is a diagram of a pan method 400, in accordance with one embodiment of the invention. The pan gesture may be performed on a multipoint touch screen. The pan method 400 generally begins at block 402 where the presence of at least a first object and a second object can be detected on a touch sensitive surface at the same time. The presence of at least two fingers can be configured to indicate that the touch is a gestural touch rather than a tracking touch based on one finger. In some cases, the presence of only two fingers indicates that the touch is a gestural touch. In other cases, any number of more than two fingers indicates that the touch is a gestural touch. In fact, the gestural touch can be configured to operate whether two, three, four or more fingers are touching, and even if the numbers change during the gesture, i.e., need a minimum of only two fingers.

Following block 402, the pan method 400 proceeds to block 404 where the position of the two objects when the objects are moved together across the touch screen is monitored. Following block 404, the pan method 400 proceeds to block 406 were a pan signal can be generated when the position of the two objects changes relative to an initial position. In most cases, the set down of the fingers will associate or lock the fingers to a particular image object displayed on the touch screen. Typically, when at least one of the fingers is positioned over the position on the image object. As a result, when the fingers are moved together across the touch screen, the pan signal can be used to translate the image in the direction of the fingers. In most cases, the amount of panning varies according to the distance the two objects move. Furthermore, the panning typically can occur substantially simultaneously with the motion of the objects. For instance, as the fingers move, the object moves with the fingers at the same time.

Figure 15A:
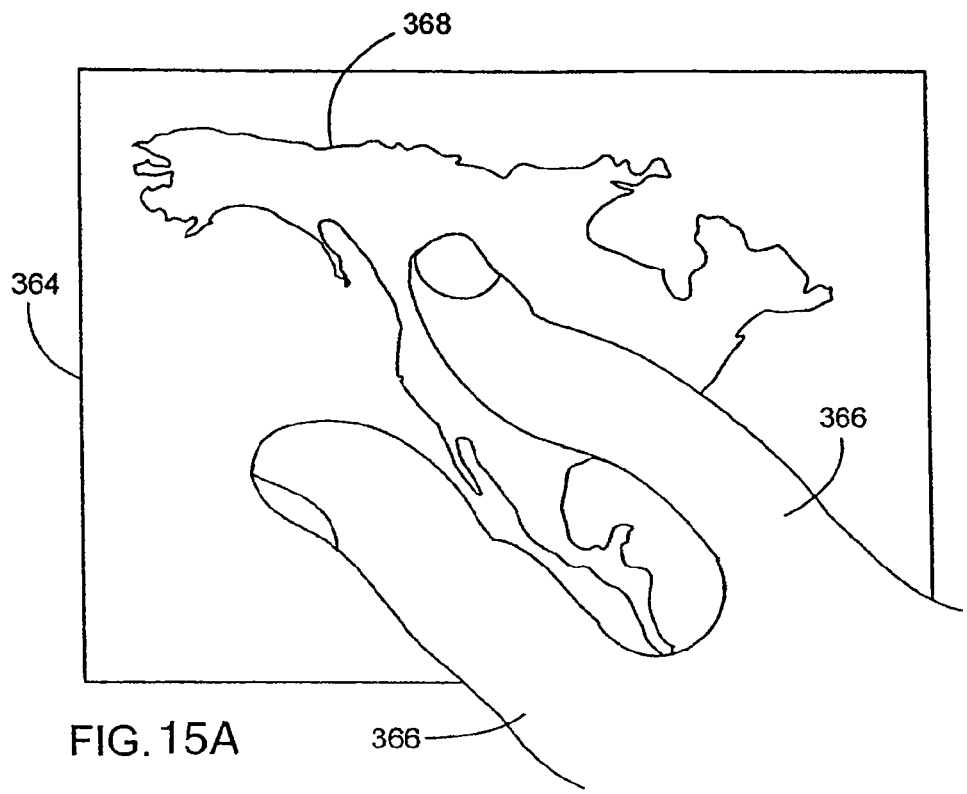
FIGS. 15A-15D illustrate a panning sequence, in accordance with one embodiment of this invention.
Figure 15:
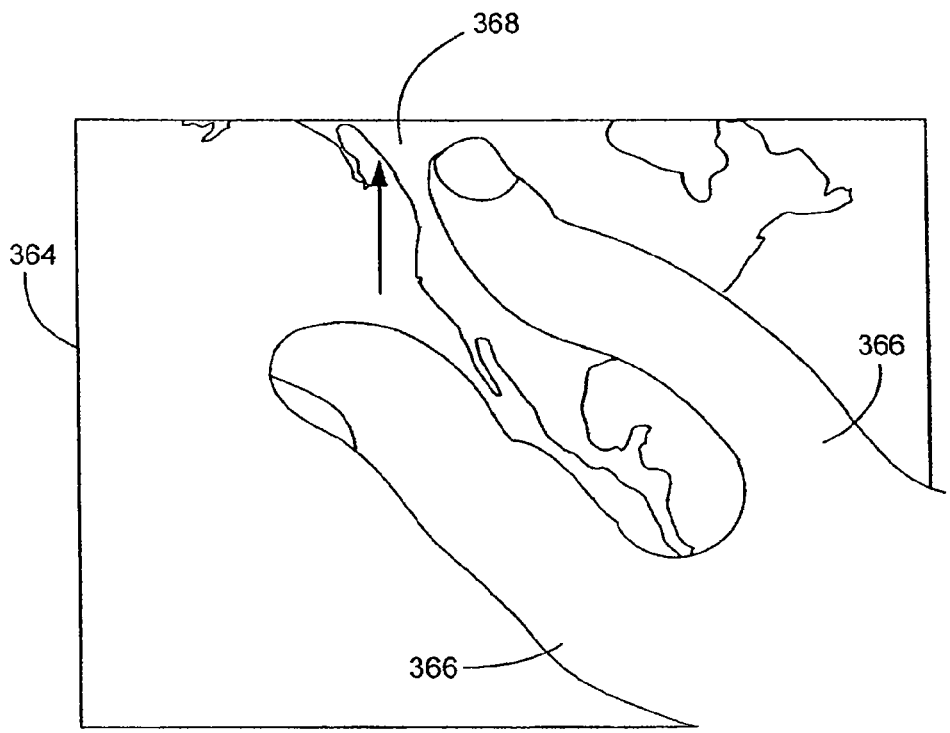
Figure 15C:
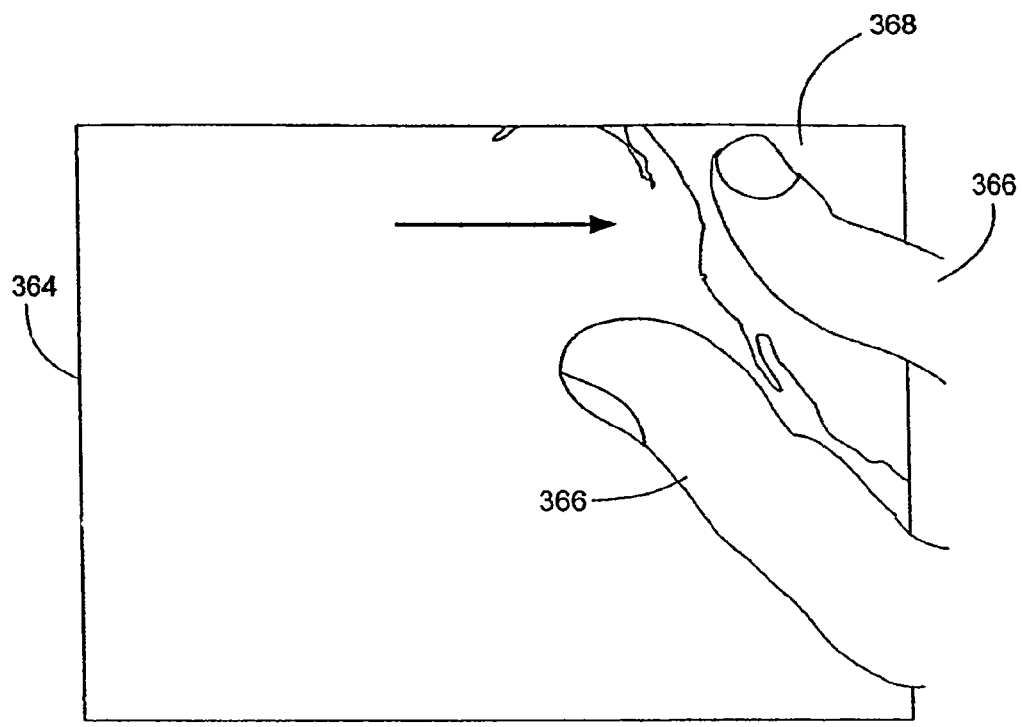
Figure 15D:
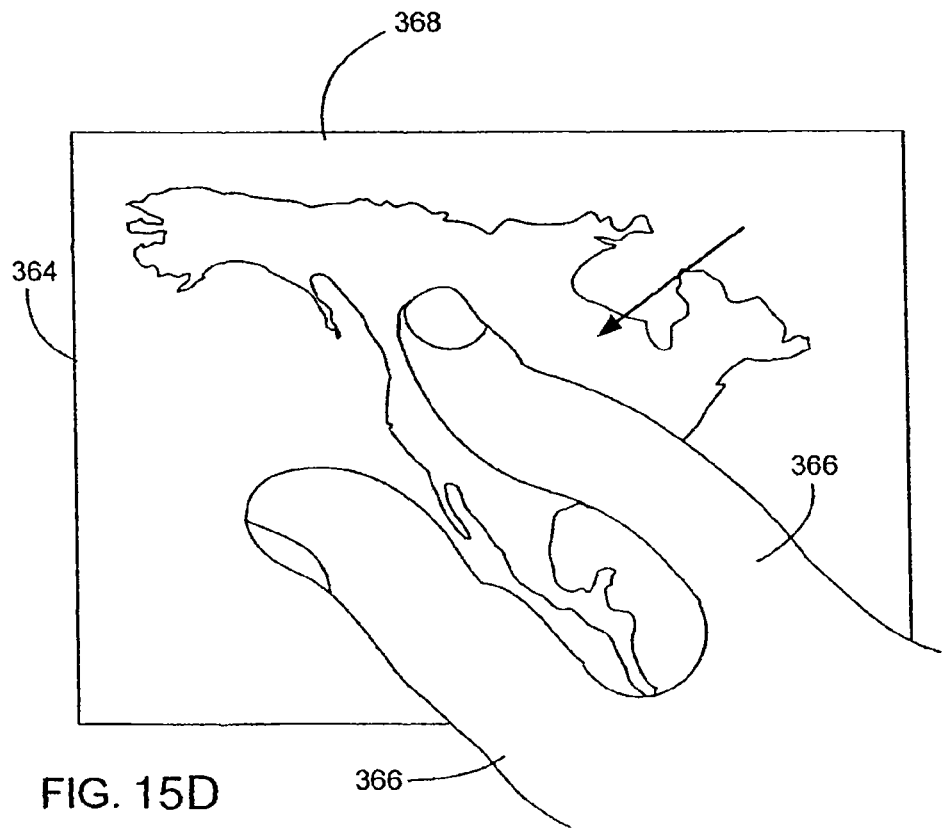

FIGS. 15A-15D illustrate a panning sequence based on the pan method 400 described above. Using the map of FIG. 13A, FIG. 15A illustrates a user positioning their fingers 366 over the map. Upon set down, the fingers 366 are locked to the map. As shown in FIG. 15B, when the fingers 366 are moved vertically up, the entire map 364 can be moved up thereby causing previously seen portions of map 364 to be placed outside the viewing area and unseen portions of the map 364 to be placed inside the viewing area. As shown in FIG. 15C, when the fingers 366 are moved horizontally sideways, the entire map 364 can be moved sideways thereby causing previously seen portions of map 364 to be placed outside the vowing area and unseen portions of the map to be placed inside the viewing area. As shown in FIG. 15D, when the fingers 366 are moved diagonally, the entire map 364 can be moved diagonally thereby causing previously seen portions of map 364 to be placed outside the viewing area and unseen portions of the map to be placed inside the viewing area. As should be appreciated, the motion of the map 364 follows the motion of the fingers 366. This process is similar to sliding a piece of paper along a table. The pressure the fingers exert on the paper locks the paper to the fingers and when the fingers are slid across the table, the piece of paper moves with them.

Figure 16:
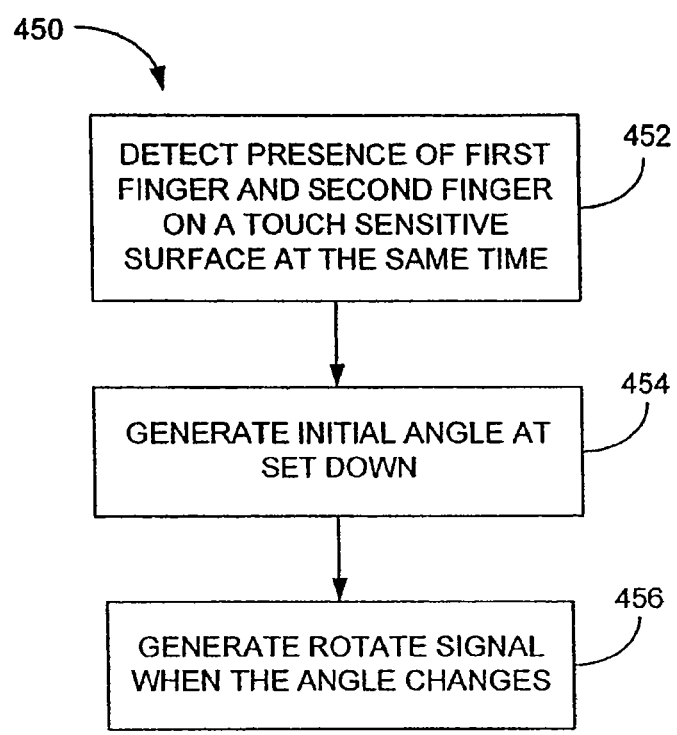
FIG. 16 is a diagram of a rotate method, in accordance with one embodiment of this invention.

FIG. 16 is a diagram of a rotate method 450, in accordance with one embodiment of the invention. The rotate gesture can be performed on a multipoint touch screen. The rotate method 450 generally begins at block 452 where the presence of a first object and a second object are detected at the same time. The presence of at least two fingers can be configured to indicate that the touch is a gestural touch rather than a tracking touch based on one finger. In some cases, the presence of only two fingers indicates that the touch is a gestural touch. In other cases, any number of more than two fingers indicates that the touch is a gestural touch. In still some other instances, the gestural touch can be configured to operate whether two, three, four or more fingers are touching, and even if the numbers change during the gesture, i.e., only need a minimum of two fingers.

Following block 452, the rotate method 450 proceeds to block 454 where the angle of each of the finger is set. The angles can be typically determined relative to a reference point. Following block 454, rotate method 450 proceeds to block 456 where a rotate signal can be generated when the angle of at least one of the objects changes relative to the reference point. In most cases, the set down of the fingers will associate or lock the fingers to a particular image object displayed on the touch screen. Typically, when at least one of the fingers is positioned over the image on the image object, the image object will be associated with or locked to the fingers. As a result, when the fingers are rotated, the rotate signal can be used to rotate the object in the direction of finger rotation (e.g., clockwise, counterclockwise). In most cases, the amount of object rotation varies according to the amount of finger rotation, i.e., if the fingers move 5 degrees then so will the object. Furthermore, the rotation typically can occur substantially simultaneously with the motion of the fingers. For instance, as the fingers rotate, the object rotates with the fingers at the same time.

Figure 17A:
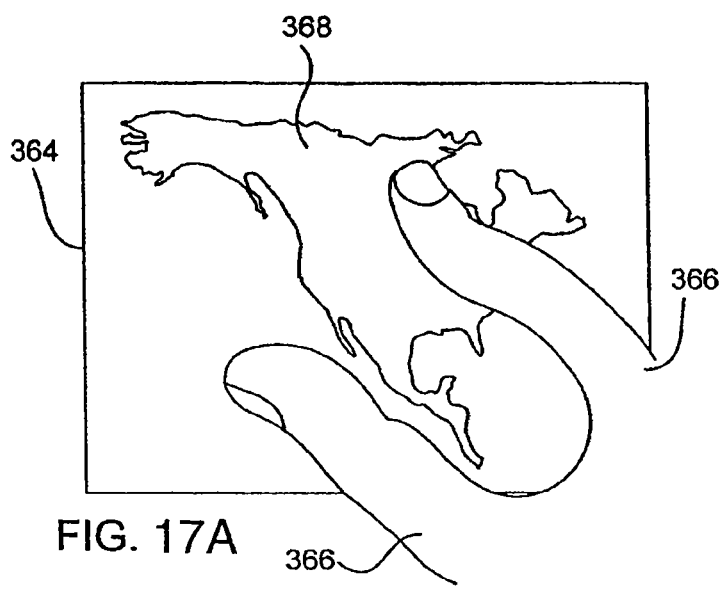
FIGS. 17A-17C illustrate a rotating sequence, in accordance with one embodiment of this invention.
Figure 17B:
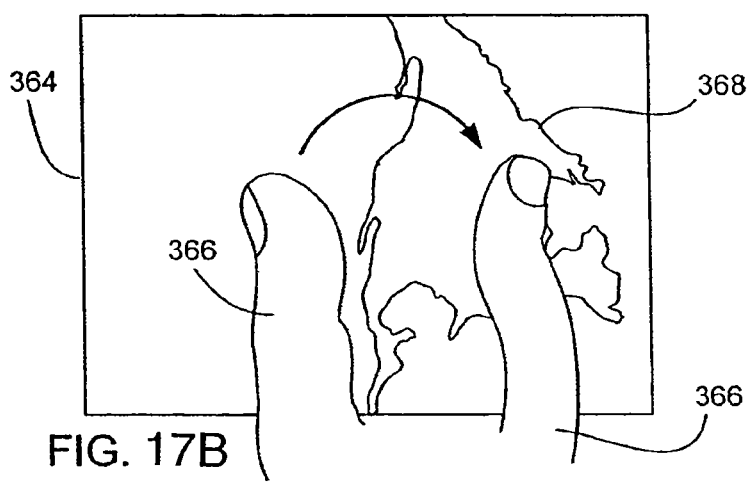
Figure 17C:
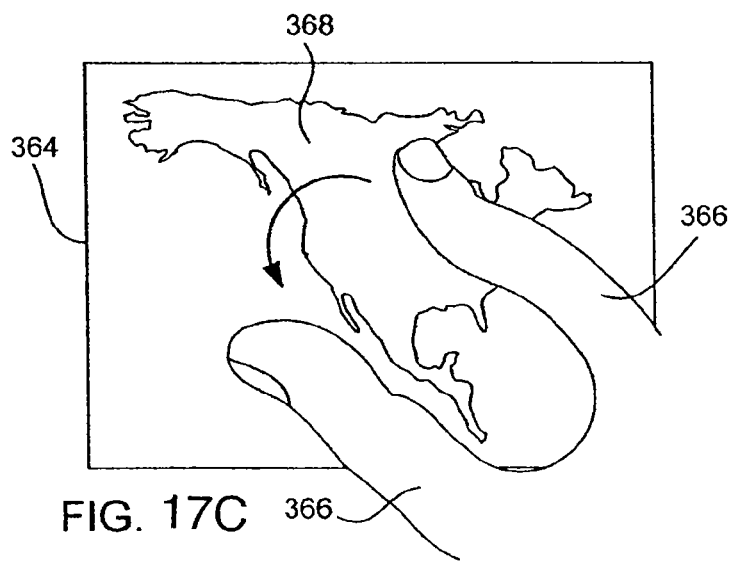

FIGS. 17A-17C illustrate a rotating sequence based on the method described above. Using the map of FIG. 13A, FIG. 17A illustrates a user positioning their fingers 366 over the map 364. Upon set down, the fingers 366 are locked to the map 364. As shown in FIG. 17B, when the fingers 366 are rotated in a clockwise direction, the entire map 364 can be rotated in the clockwise direction in accordance with the rotating fingers 366. As shown in FIG. 17C, when the fingers 366 are rotated in a counterclockwise direction, the entire map 364 can be rotated in the counterclockwise direction in accordance with the rotating fingers 366.

It should be noted that, although FIGS. 17A-17C show the use of a thumb and an index finger to invoke the rotational gesture, the use of two fingers, such as an index finger and a middle finger, can also be used to invoke the rotational gesture.

Figure 17D:
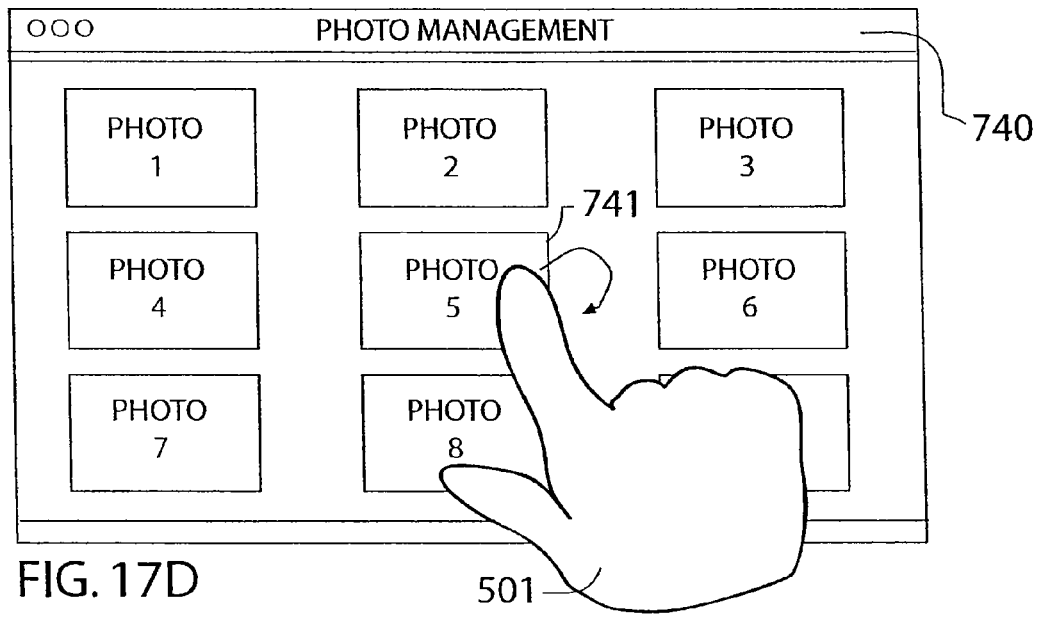
FIGS. 17D and 17E illustrate a method for rotating a selectable target in accordance with one embodiment of this invention.
Figure 17E:
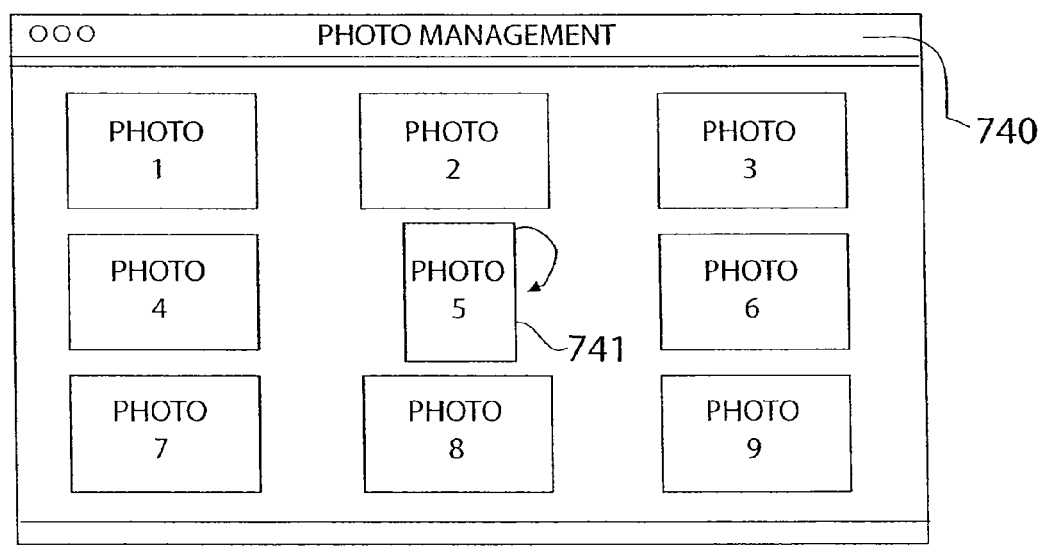

Furthermore, in certain specific applications, two fingers may not be required to invoke a rotational gesture. For instance, in accordance with a preferred embodiment and as shown in FIGS. 17D and 17E, a photo thumbnail can be rotated to a desired orientation (e.g., from a landscape orientation to a portrait orientation) with a single finger gesture. Specifically, upon a detection of touch in association with a selectable photo thumbnail icon 741, and wherein the touch input is gestural in that the touch detected forms a rotational or radial arc about a center portion of the thumbnail, then that input is interpreted to be an instruction to rotate the thumbnail in accordance with the direction of the rotation or radial arc. In accordance with a preferred embodiment, the rotation of the thumbnail icon will also cause the corresponding file object to change the orientation configuration. In accordance with another embodiment, within the application of photo management, a detection of a rotational gesture will also invoke a snap command to automatically rotate the photo thumbnail by 90 degrees towards the direction of the rotation.

Figure 18A:
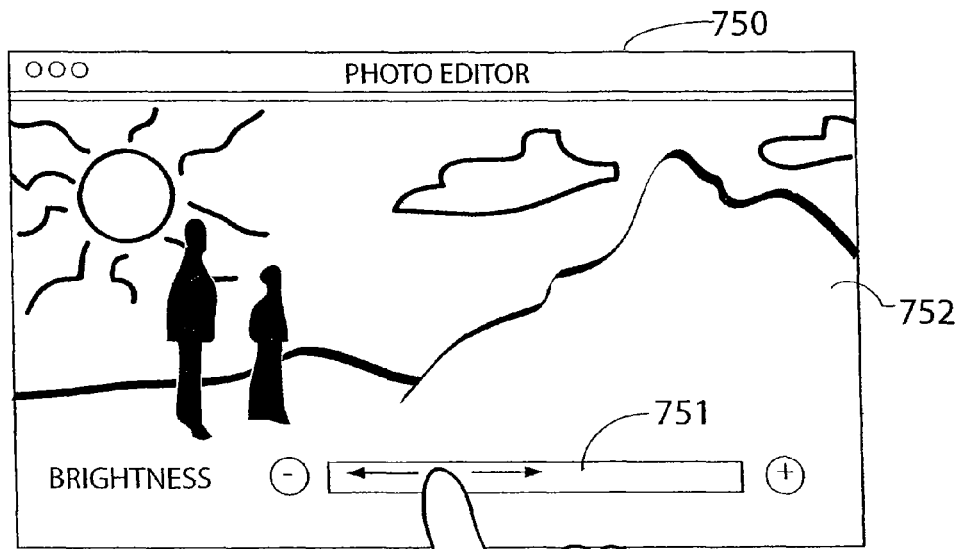
FIGS. 18A and 18B illustrate gestural inputs for editing a photo document in accordance with one embodiment of this invention.
Figure 18B:
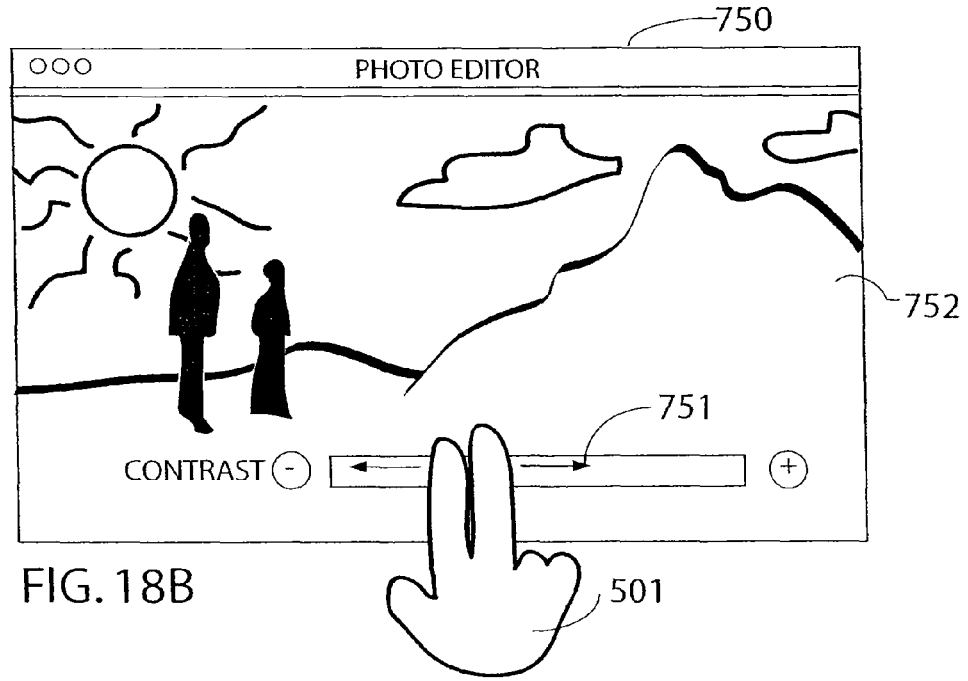

FIGS. 18A and 18B illustrate another example of using gestural input via a UI element to edit a media file, such as a photograph, in accordance with an exemplary embodiment of the invention as previously described in FIG. 10. Specifically, as shown in FIG. 18A, within a photo editor environment 750 in which a photo image file (e.g., a JPEG file) 752 can be opened for editing, a UI element 751 can be provided for editing aspects of the photo. The UI element 751 can be a level slider bar for adjusting levels of certain aspects of the photograph. In the example illustrated in FIG. 18A, the UI element 751 can be an interface for receiving a touch gesture to adjust the level of brightness of the photograph. Specifically, as the tracked finger touch moves to the left on the bar, the level of brightness is decreased, whereas the level of brightness increases if the tracked touch moves to the right on the UI element. In accordance with one embodiment, the UI element is preferably translucent so that images of the photograph behind the UI element can still be seen by the user. In another embodiment, the size of the photo displayed can be reduced on the screen to make room for a separately displayed UI element, which can be placed immediately below the displayed photo.

FIG. 18B illustrates the ability to switch the modes of gestural input via the UI element 751 by selectively using a single or multiple touchdown points. Specifically, as shown in FIG. 18B, a detection of a second touchdown point on the UI element 751 will cause the mode of operation from brightness level adjustment to contrast level adjustment. In this instance, the movement of both touchdown points to the left or to the right will cause the level of contrast of the photograph to decrease or increase, respectively. Detection of additional touchdown points (e.g., three or four fingers) can also be interpreted as instructions for switching to other modes of operation (such as zooming, hue adjustment, gamma levels, etc.). It is noted that, although FIGS. 18A and 18B illustrate brightness and contrast levels to be adjusted via the UI element 751, a user can program or customize the UI element 751 to interpret the number of touchdown points to mean other forms of modes of operation. It should also be noted that the slide bar UI element 751 can take other forms, such as a virtual scroll wheel.

Figure 18C:
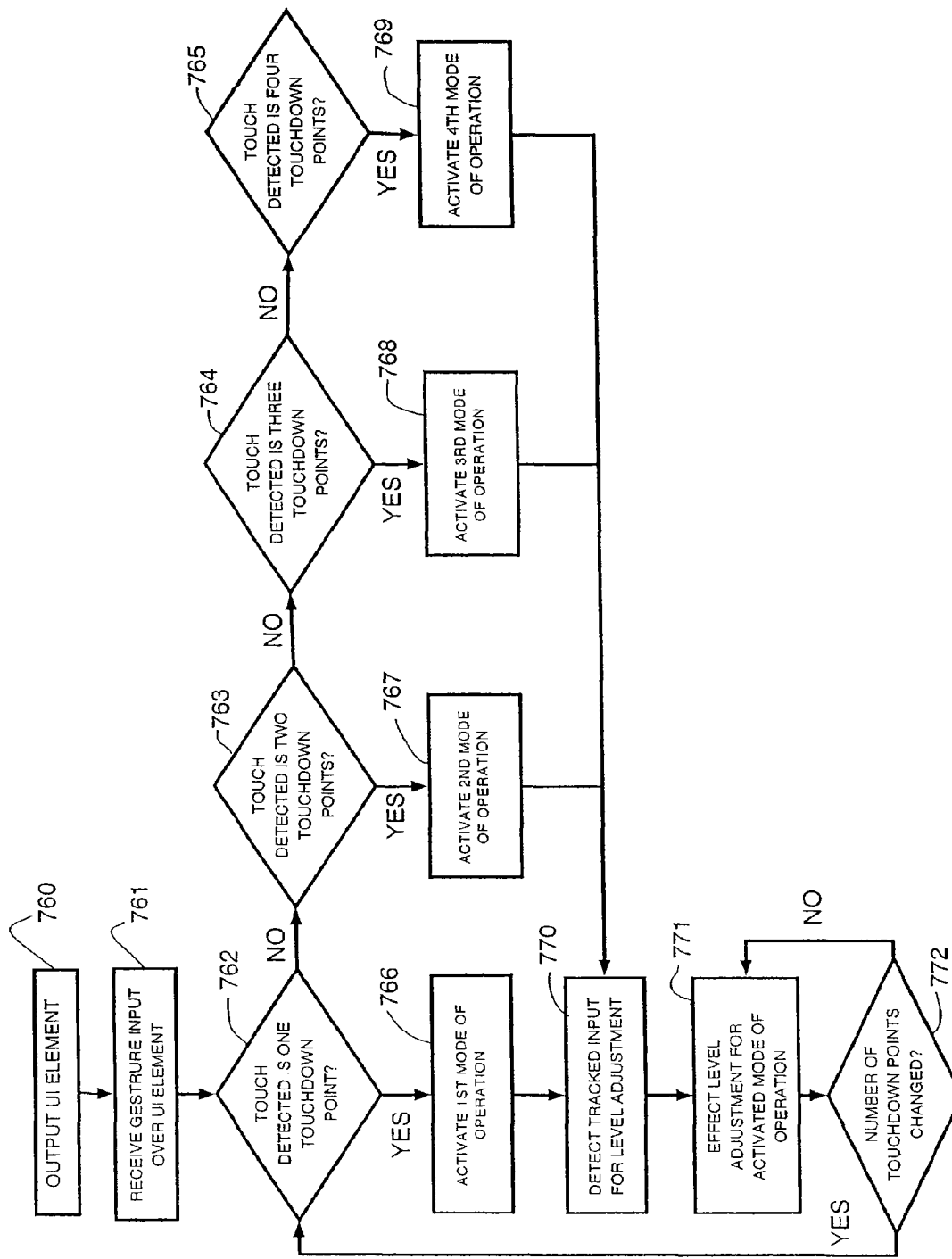
FIG. 18C is a diagram illustrating a method for recognizing and implementing the gestural inputs of FIGS. 18A and 18B.

FIG. 18C is a flow chart illustrating an algorithm association with the specific examples discussed above in FIGS. 18A and 18B. Specifically, as shown in FIG. 18C, the UI element 751 is outputted 760 on the screen. If a gesture input touch is detected 761, then further determinations 762-765 can be made as to how many touchdown points are associated with the touch. Depending on the number of touchdown points detected, corresponding modes of operation can be activated at 767-769. Once the appropriate mode of operation is activated, tracking of the touchdown point(s) is/are detected 770 to effect 771 the corresponding adjustment in accordance with the mode of operation. It should be noted that the modes of operation can switch at any point in time during the editing process in that, if the number of touchdown point(s) is/are detected 772 as changed, then the process loops back to determinations 762-764 in order to activate the new mode of operation.

Figure 18D:
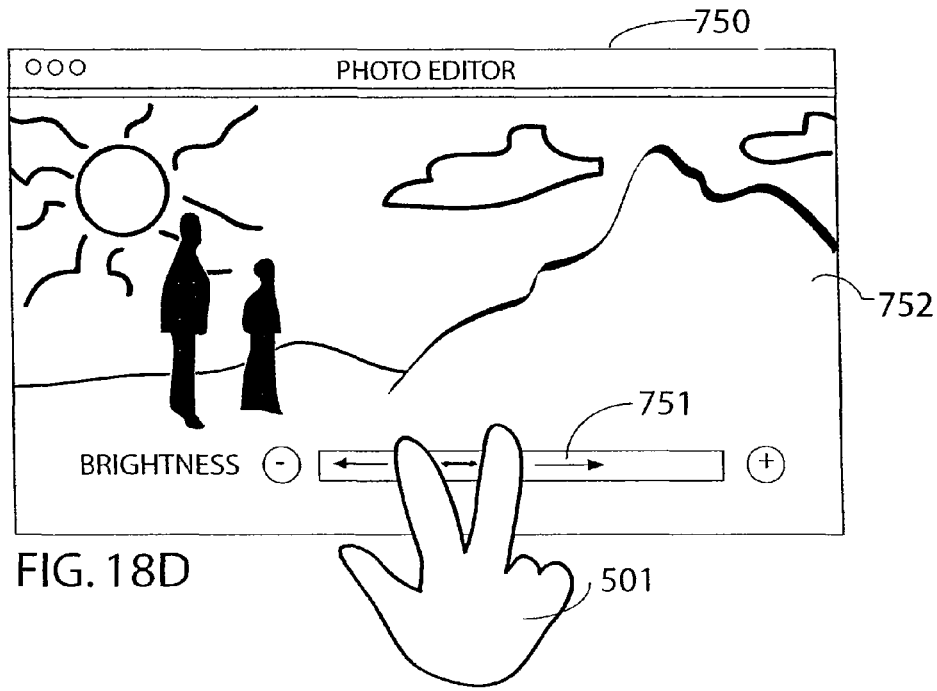
FIGS. 18D and 18E illustrate gestural inputs for zooming in and out of a photo file within a photo application according to one embodiment of this invention.
Figure 18E:
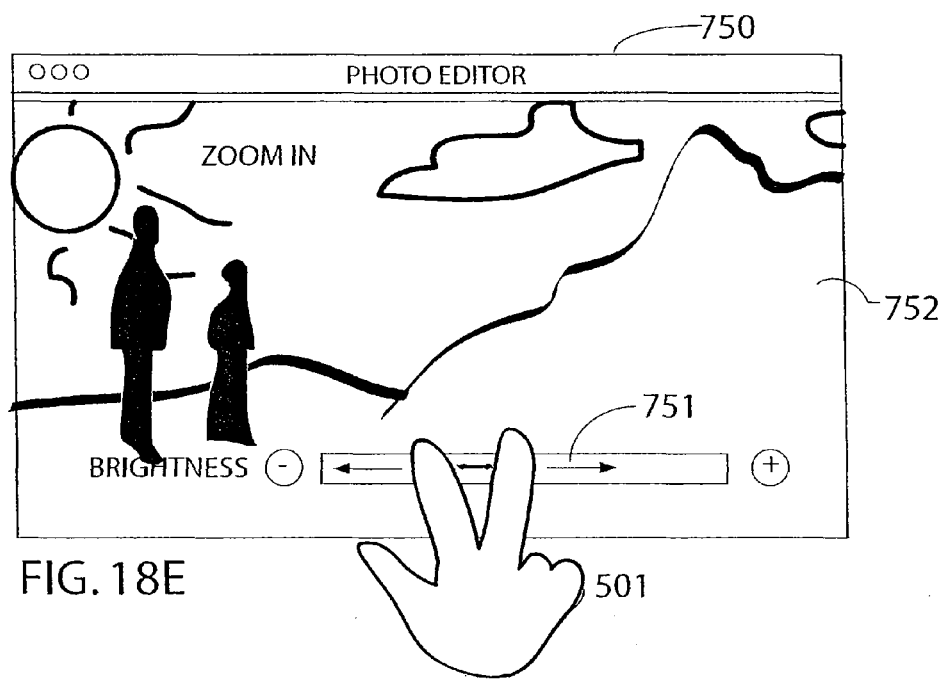

FIGS. 18D and 18E illustrate using the same UI element 751 discussed above to invoke additional actions by inputting other gestural instructions. Specifically, while adjusting the brightness level of the photo displayed, a second finger can be used to effect a zoom in or zoom out action. The zoom in and zoom out action can be invoked by detecting a second touchdown point and a change in distance proximity between the two touchdown points. The distance change between the two touchdown points can be translated into a zoom in or zoom out action in accordance with the method shown in FIG. 12 and discussed above. It should be noted that, in accordance with one embodiment, the zoom action would not be invoked if the second touchdown point detected remains at a constant distance with the first touchdown point; in such a case the gesture would be interpreted as an input for activating the second mode of operation (e.g., changing from brightness level adjustment to contrast level adjustment, as shown in FIGS. 18A and 18B).

Figure 19A:
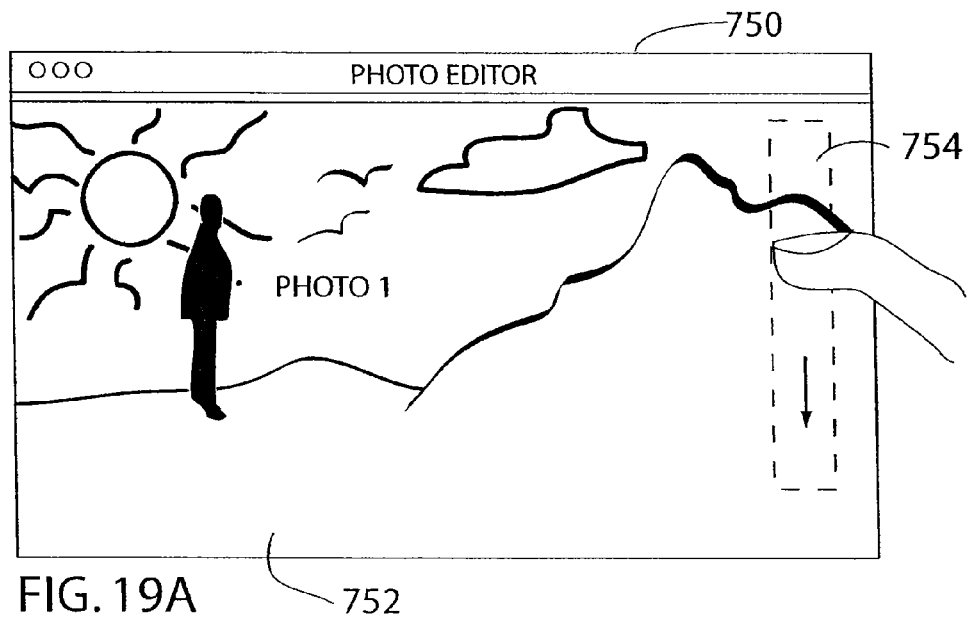
FIGS. 19A-19D illustrate gestural inputs for scrolling through playback sequential files according to one embodiment of this invention.
Figure 19B:
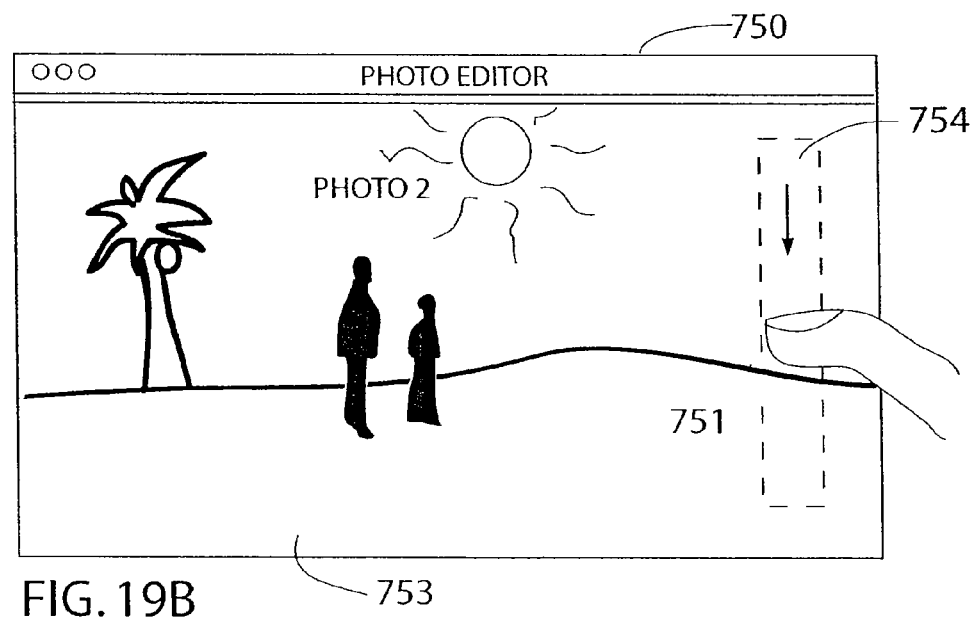

FIGS. 19A and 19B illustrate an example of using gestural input to scroll through media files, such as photo files displayed in a photo editor. Specifically, as shown in FIGS. 19A and 19B, a touch detection zone 754 may be dedicated to scrolling action whereby a gesture of an up and down movement of a finger on the displayed photo 752 of the touch screen 750 may be interpreted as a gestural input for scrolling to the next photo 753. In accordance with a preferred embodiment, it is not necessary to display a UI element to invoke the scrolling mode of operation; rather, a detection of a downward sliding action by a finger within the touch detection zone 754 (e.g., a detection of downward tracking movement of a touchdown point) may be sufficient to automatically invoke the scrolling action. In accordance with an alternative embodiment, a UI element can be displayed on the screen as a virtual vertical slide bar to indicate to the user that a scrolling action has been activated, and the area of the touch detection zone 754 for continuing the scrolling action.

In accordance with a preferred embodiment, if the downward tracking movement detected is of more than one touchdown point (e.g., a two finger sliding gesture), then the scrolling can be performed at 2× speed, similar in the fashion described above with respect to invoking scrolling action within a scrollable area.

Figure 19C:
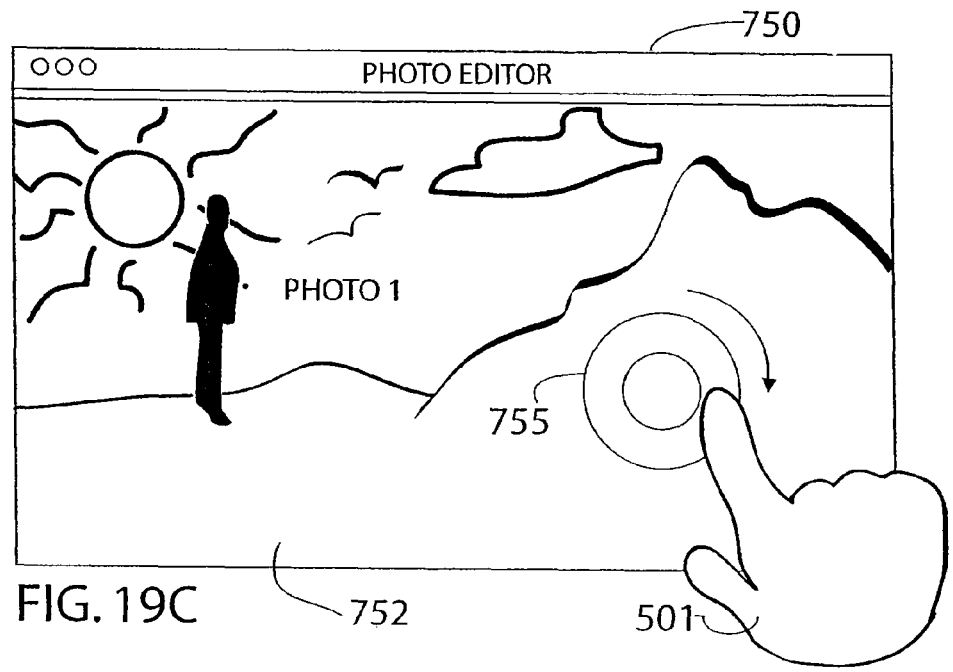
Figure 19D:
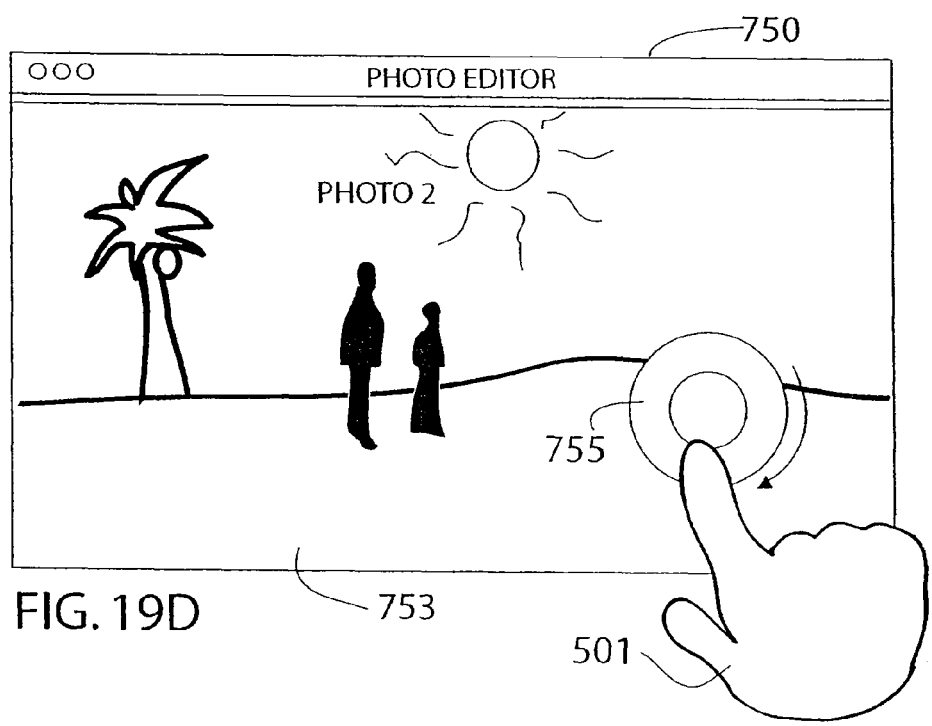

FIGS. 19C and 19D show another form of UI element, a virtual scrolling wheel 755, for receiving gestural input to scroll the display of the photos. In this embodiment, the virtual scroll wheel can be invoked by a simple gesture of performing a circular touch on the photo with one finger, or a touch down of three fingers. Once the virtual scroll wheel UI element 755 can be presented, the user can "rotate" the virtual scroll wheel to scroll through the photos. In this particular embodiment, the speed of the scrolling is not controlled by how many touchdown points are detected on the scroll wheel 755, but rather by the speed at which the touchdown point rotates about the center of the virtual scroll wheel 755.

Figure 19E:
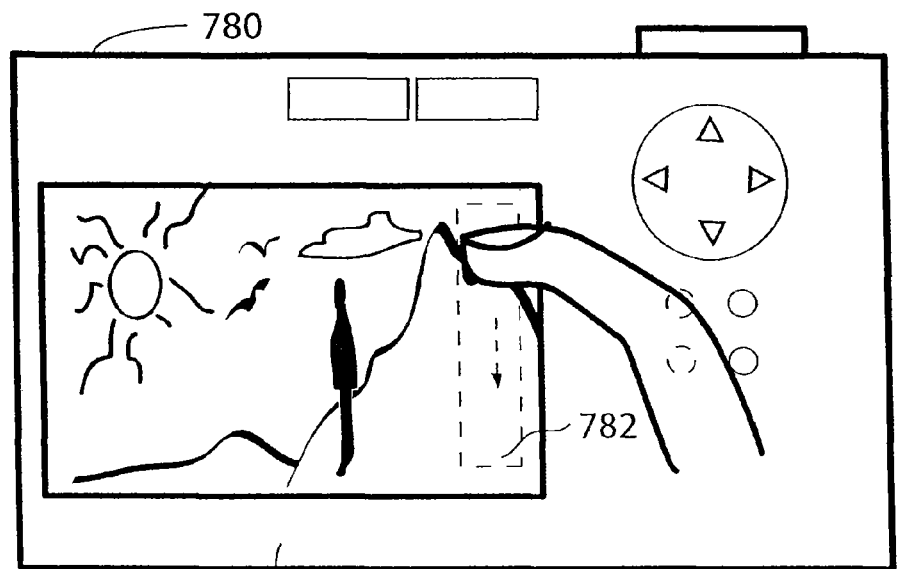
FIGS. 19E and 19F illustrate gestural inputs for scrolling through playback photo files on a digital camera display according to one embodiment of this invention.
Figure 19F:
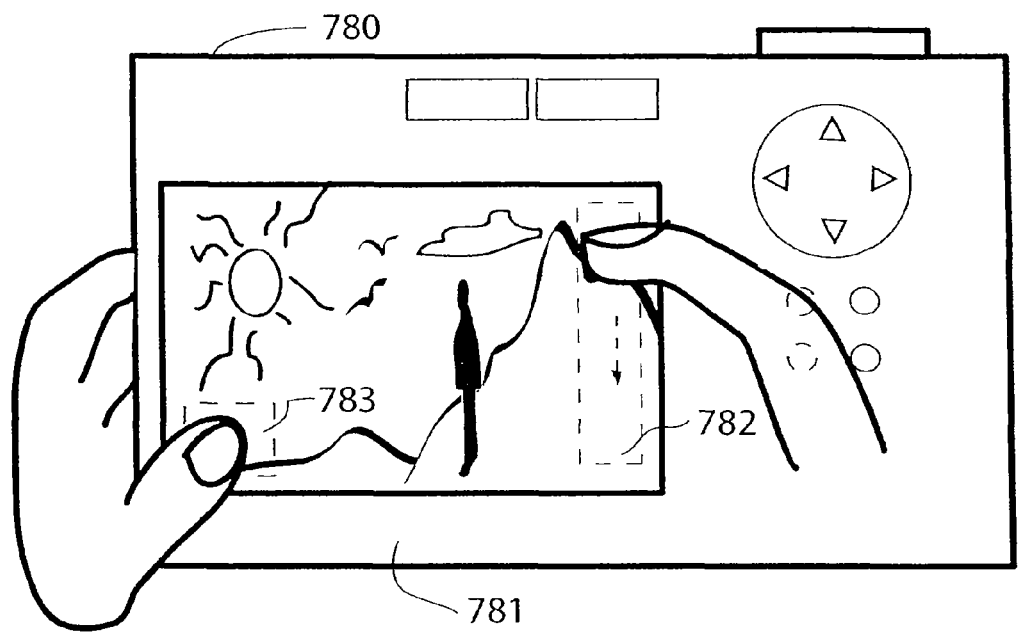

FIGS. 19E and 19F illustrate the concept of FIGS. 19A and 19B on a display screen 781 of a digital camera 780. In accordance with a preferred embodiment, the display screen 781 of the digital camera 780 can be made of a multi-touch sensitive panel, such as the multi-touch sensitive panel 2 described in FIG. 2 above.

FIG. 19E shows an embodiment where, in a playback mode of the digital camera 780, a detection of a vertically downward swipe gesture input of at least one finger in a touch detection zone 782 invokes a playback scrolling action whereby a next photo can be displayed. In accordance with another embodiment, a downward gestural input on any part of the display 781 can automatically invoke the scrolling action.

FIG. 19F shows an alternative embodiment of FIG. 19E, where a detection of two touches are required in order to invoke playback scrolling. Specifically, a combination of a touchdown point at touch down zone 783 along with a downward sliding input at or near touchdown zone 782 can invoke a scrolling action to display the next photo. It should be noted that the methods described in FIGS. 19A through 19E are not form factor specific, in that the methods can be implemented on a PC monitor, a laptop monitor, a digital camera, or any type of device having a touch screen.

Figure 19G:
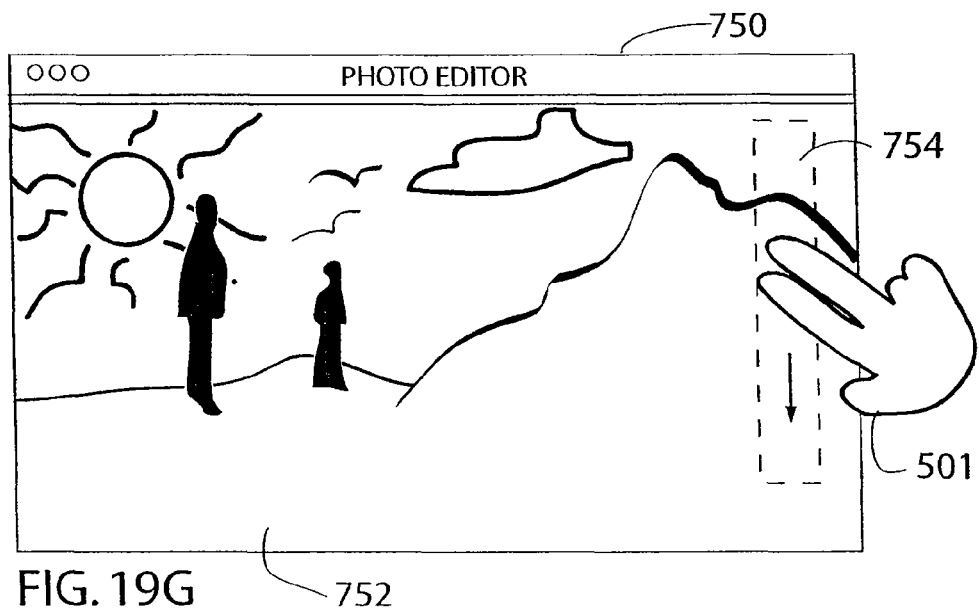
FIG. 19G illustrates gestural input for marking or deleting a photo file during playback according to one embodiment of this invention.

FIG. 19G illustrates additional gesture that can be inputted during the playback of media files such as photo files in accordance with another embodiment. Specifically, similar to the embodiments illustrated in FIGS. 18A and 18B, by distinguishing the number of touchdown points on the touch sensitive display (i.e., the number of fingers), the same movement can be interpreted differently. In this instance, a vertically downward swipe gesture by two fingers may be interpreted as a gesture for deleting the photo file, marking the photo file (for purposes such as compiling a photo album), or any other useful commands.

Figure 19H:
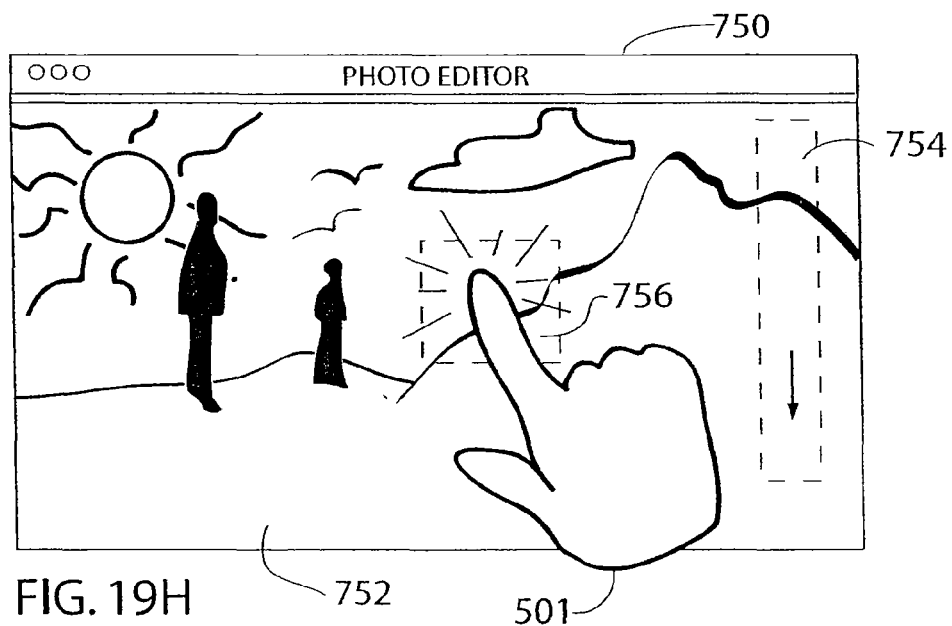
FIG. 19H illustrates an alternative gestural input for marking or deleting a photo file during playback according to another embodiment of this invention.

FIG. 19H illustrates detecting yet other additional gestures using other designated UI zones of the touch sensitive display. In this instance, a detection of a touchdown point at another designated zone 756 may be interpreted to mean a delete, marking, or other useful commands. In accordance with one embodiment, the multiple touchdown zones can be displayed as translucent overlays to the photo file.

It should be noted that, although FIG. 19 illustrates swiping gestures in the vertical downward direction, it is also contemplated that swiping in a vertical upward direction, or in a horizontal direction, may also be designated as gesture input of the same commands.

Figure 20:
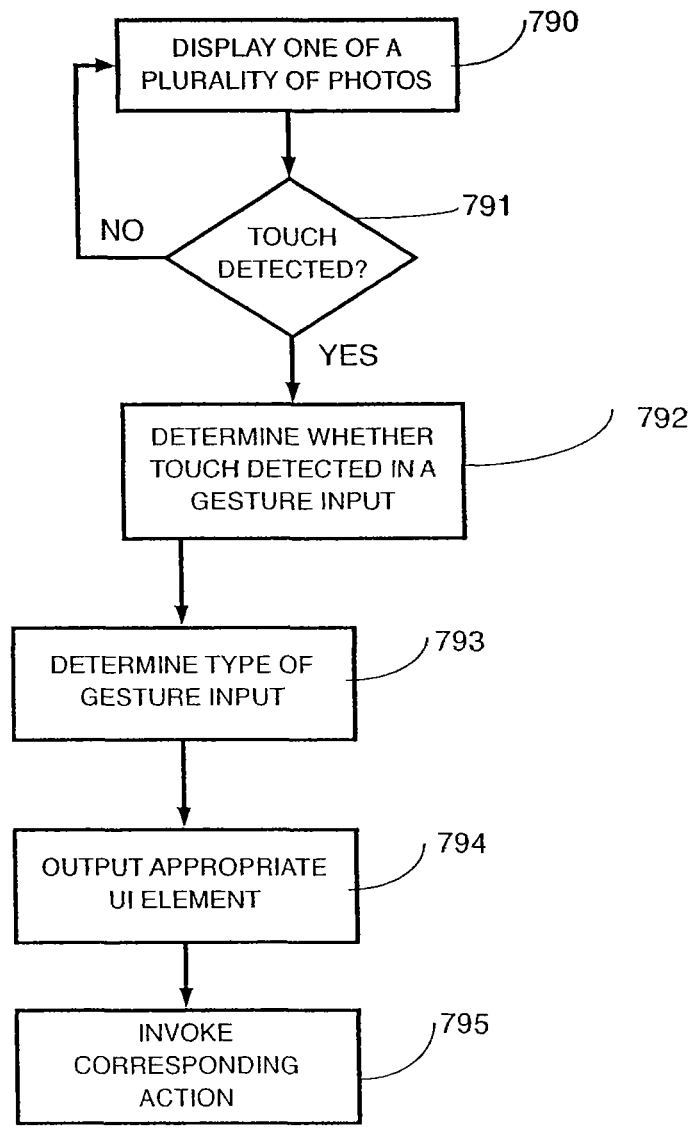
FIG. 20 is an overview diagram showing a method for implementing the methods of FIGS. 18A-19F according to one embodiment of this application.

FIG. 20 illustrates one possible algorithm for implementing the methods shown in FIGS. 19A-19F. Specifically, at the first step, one of a plurality of photos are shown 790 on a touch-sensitive display. If a touch on the display screen is detected 791, then a determination can be made 792 as to whether the touch was a gestural input, and 793 the type of gestural input was received (e.g., a downward tracked sliding action, a circular tracked rotation action, etc.). In accordance with the gestural input detected, a UI element (e.g., a slide bar or a virtual scroll wheel) can be outputted 794 as necessary, after which action corresponding to the usage of the UI element or the gestural input can be invoked 795.

It should be noted that the methods described in FIGS. 18-20 can also be implemented within a video environment. Specifically, during the playback of a video file, a UI element such as a horizontal slide bar shown in FIG. 18A can also be invoked and displayed, whereby, depending on the number of touchdown points detected, a mode of operation can be activated for changing certain adjustable aspects of the video, such as brightness, contrast, etc. At the same time, the scrolling and zooming methods shown in FIGS. 19A-19F can also be effected in a similar manner, although instead of scrolling, it would be the rewind and fast forward actions that would be performed.

Figure 21A:
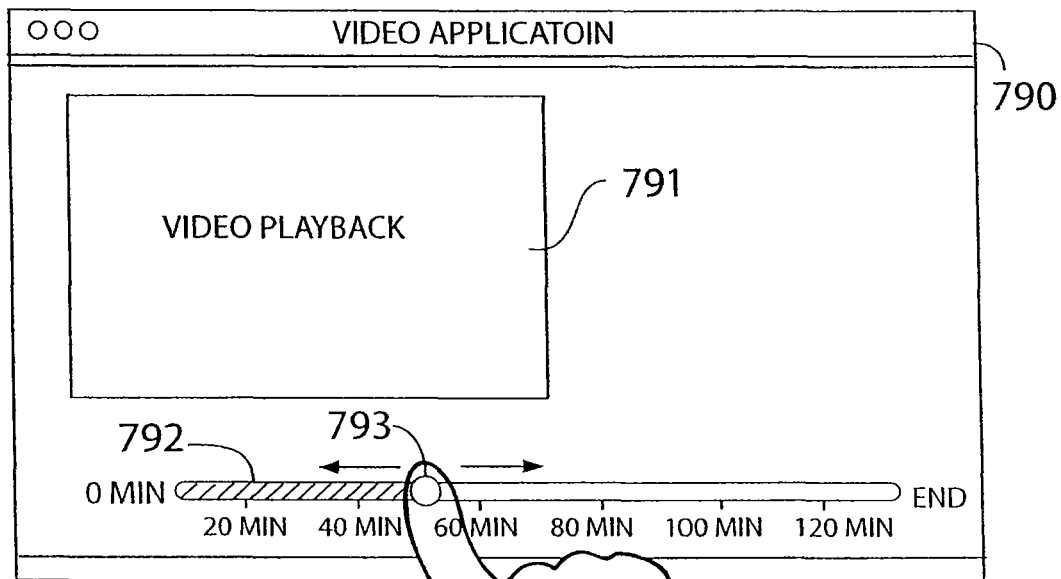
FIGS. 21A-21D illustrate gestural inputs for controlling and/or editing video using a video application according to one embodiment of this invention.

Additional editing/playback functions of video files can be implemented using gestural inputs over certain pre-existing control elements. In accordance with a preferred embodiment, a non-linear time playback of a video file can be effected by selectively contracting or expanding the playback timeline indicating bar. Specifically, FIG. 21A shows a video application 790 (such as a video playback application) displays video playback 791 along with a progress bar 792, on which a playback queue 793 indicates the time progress of the video playback.

According to a preferred embodiment, the playback queue 793 can be moved forward or backwards on the progress bar 792 to effect fast forward and rewind of the video. The queue can also be held at the same place or otherwise modulated in a non-linear speed to effect variable speed playback or pause of the video. According to a preferred embodiment, the video application 790 can be displayed on a touch sensitive display, and the position of the playback queue 793 can be manipulated via manual touch of the queue by a finger of hand 501 at a location where the queue can be displayed on the screen. That is, the playback queue 793 can serve both as a progress indicator as well as a UI element for controlling the speed and temporal location of the video playback.

Figure 21B:
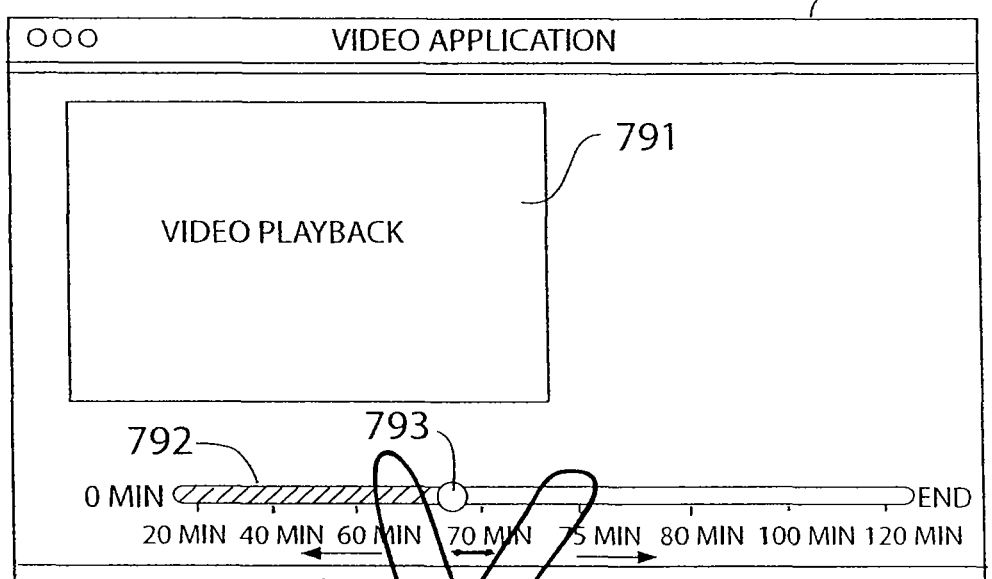

In accordance with a preferred embodiment, the entire progress bar 792 can serve as a UI element whereby a user can effect non-linear playback of the video by expanding or contracting one or more sections of the progress bar. Specifically, as shown in FIG. 21B, the UI element progress bar 792 can be manipulated via a two finger zoom in or zoom out gesture (as discussed above with respect to FIG. 12). In the example shown in FIG. 21B, a zoom in gesture invokes a expansion of the playback time between the 60 minute mark and the 80 minute mark. In the example shown in FIG. 21B, playback speed of the video becomes non-linear in that the playback speed of the video can be slowed during the time period between the 60 and 80 minute mark. Alternatively, the playback speed of the video can be accelerated between the 0 and 60 minute mark, and after the 80 minute mark, whereas the playback speed is normal between the 60 and the 80 minute mark.

Figure 21C:
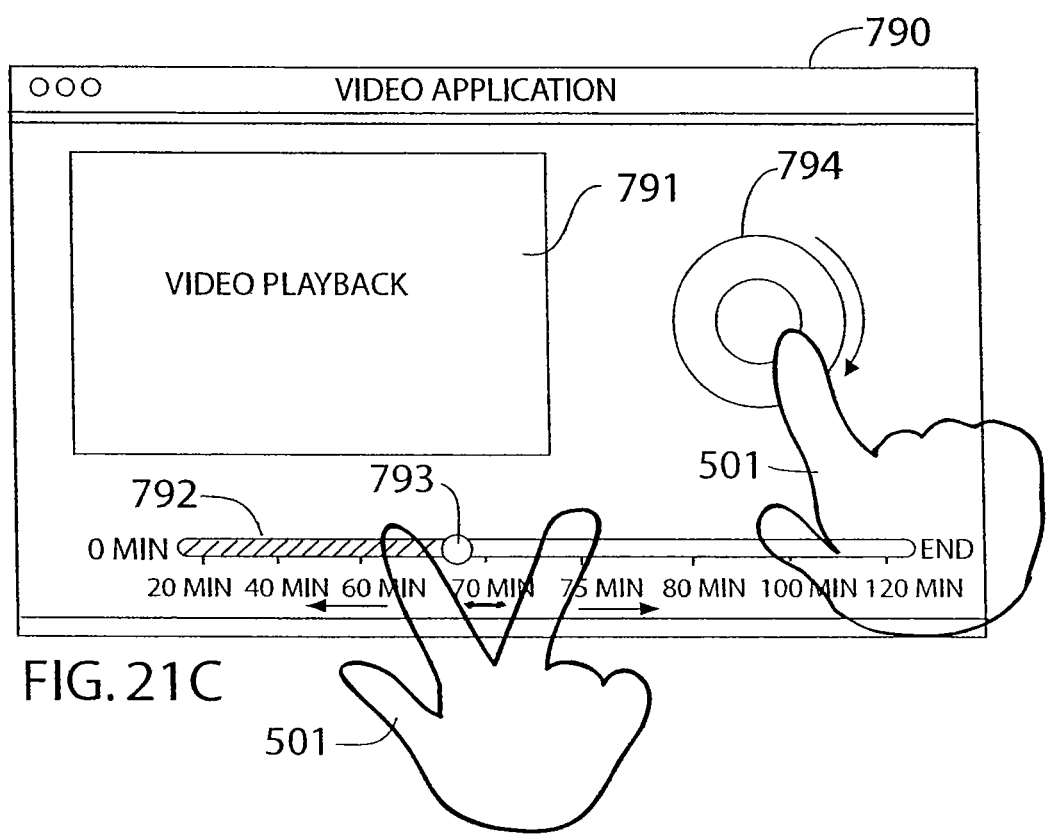

FIG. 21C shows an additional UI element 794 being displayed within the video application 790. In this embodiment, UI element 794 can be a virtual scroll wheel whereby a user can further control the playback speed of the video. In combination with the manipulation of the progress bar 792, a user can first designate a section of the video for which playback speed is slowed, and whereby the user can use the scroll wheel 794 to further modulate the playback queue 793 to control the playback direction and/or speed of the video.

Figure 21D:
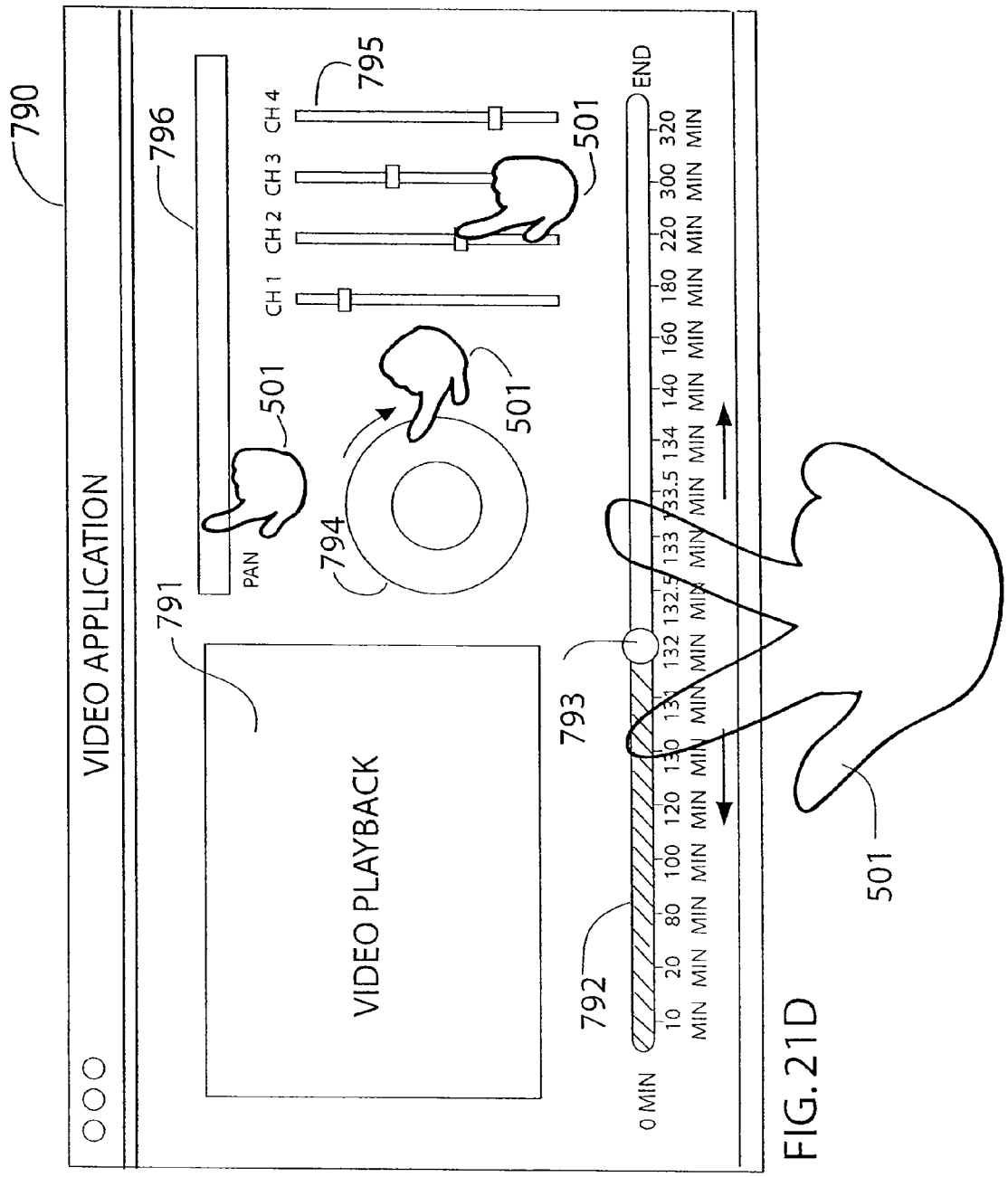

FIG. 21D shows other additional touch sensitive UI elements that can be added to the video application 790 for editing purposes. For instance, as shown in FIG. 21D, slide bar UI element 796 can be added to detect gestural inputs for invoking level adjustments, such as pan adjustment or brightness, contrast, hue, gamma, etc. types of adjustments. Similar to the UI element 751 as discussed with references to FIGS. 18A-18E, slide bar UI element 796 can be used to invoke different modes of operation by varying the number of touchdown points on the slide bar UI element 796.

UI element 795 can also be displayed within the video application 790 to effect sound editing of the video. Specifically, UI element 795 can include a plurality of level adjustments for recording or playback of different channels or sounds or music to be mixed with the video.

In accordance with a preferred embodiment, a user of video application 790 can customize which UI elements to display, and can additionally program the UI elements to performed a desired function.

Figure 22A:
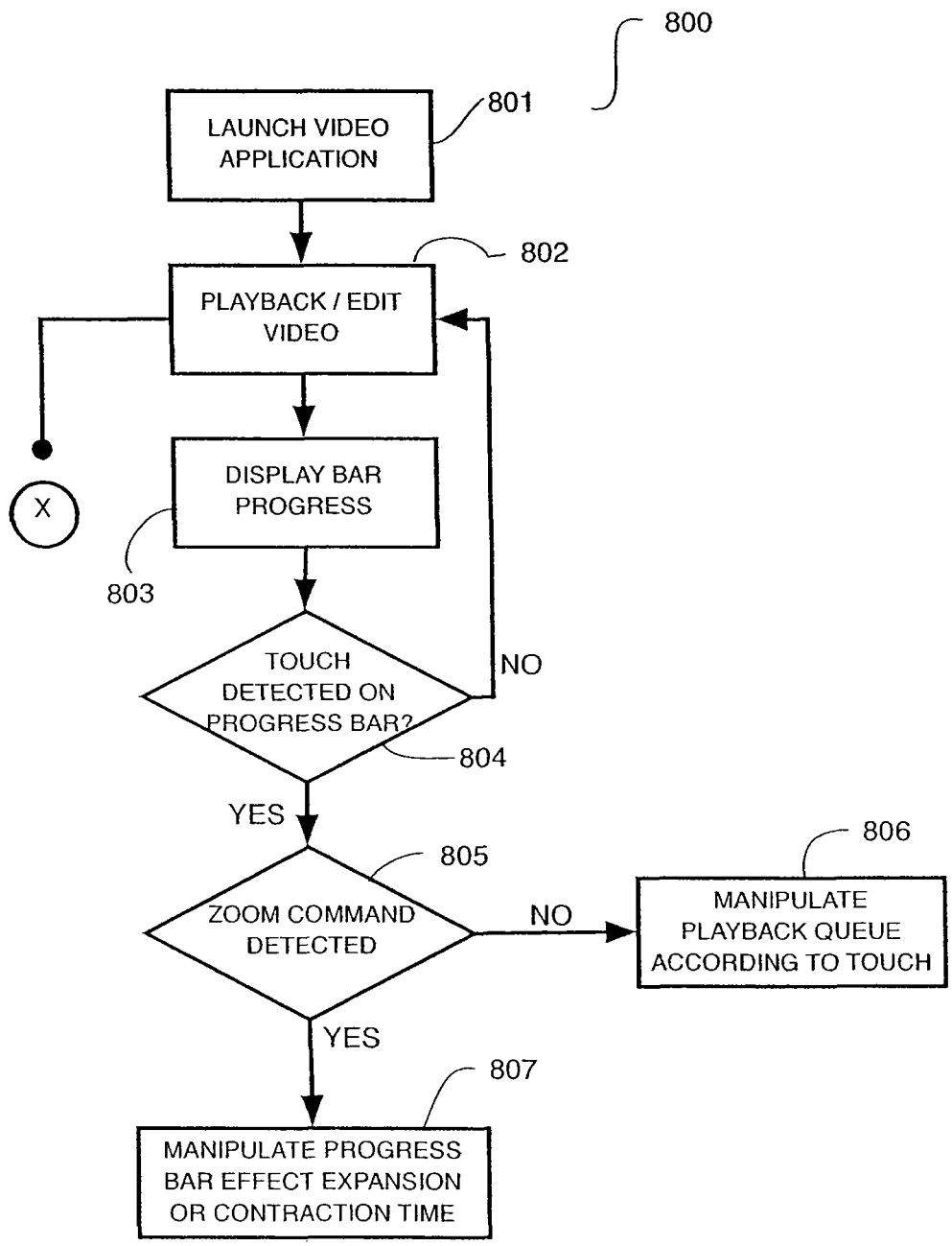
FIGS. 22A and 22B are diagrams of a method for implementing the gestural inputs of FIGS. 21A-21D.
Figure 22B:
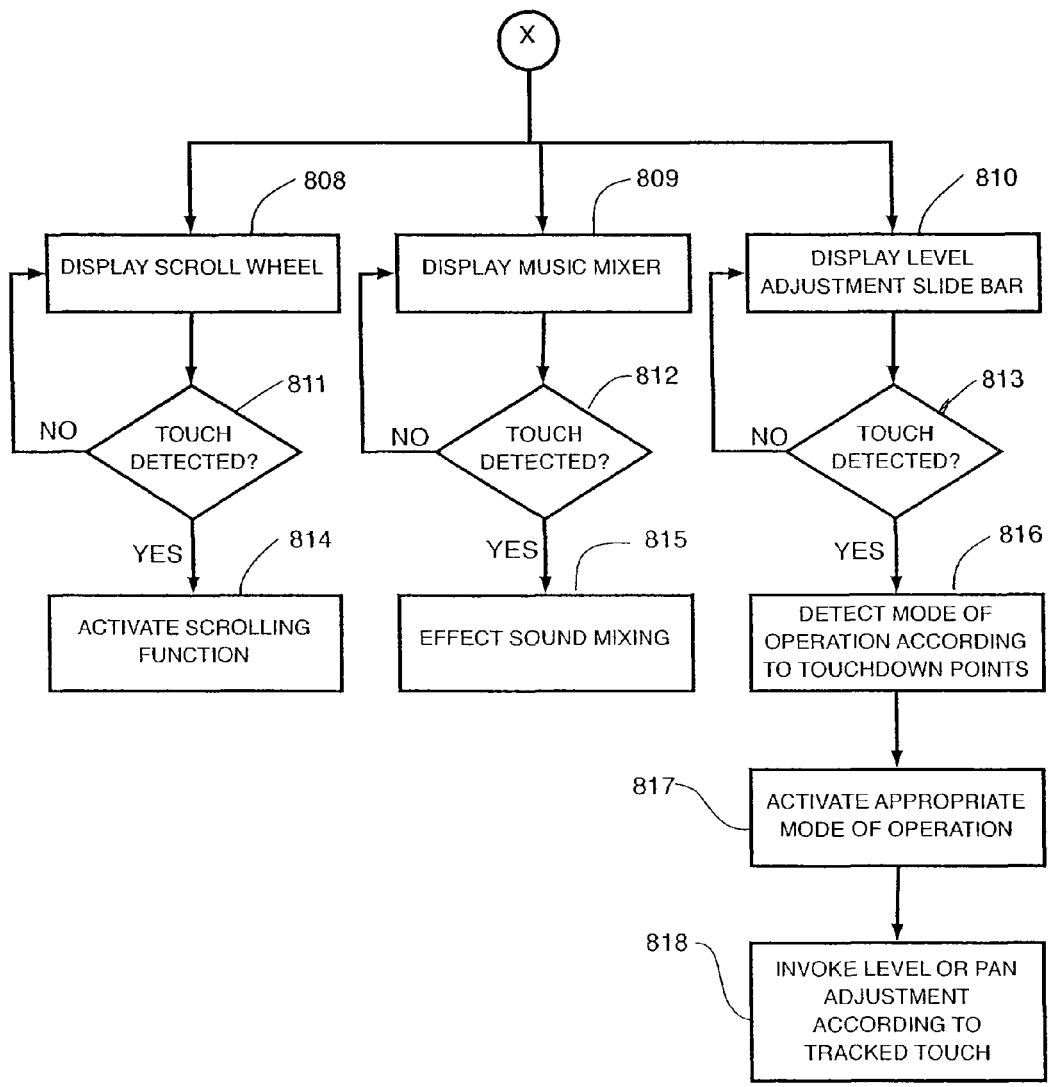

FIGS. 22A and 22B illustrate an example algorithm 800 for effecting the method described with respect to FIGS. 21A-21D. Specifically, as shown in FIG. 22A, video application 790 can be launched to provide video playback and/or editing 802. A progress bar 792 can be displayed 803. If a touch is detected 804 over the progress bar 792, then a determination 805 can be made as to whether the touch is a zoom in or zoom out command. If the touch is not detected to be a zoom in or a zoom out command, then the playback queue can be manipulated in accordance with a tracked touch input. If the touch is detected to be a zoom gesture, then the portion of the progress bar at which touch is detected can be manipulated to expand or contract according to the gestural input.

At FIG. 22B, steps 808-810 can be performed to optionally display additional UI elements such as the scroll wheel, sound mixer, and the slide bar level adjustment, respectively. Touch(es) can be detected at steps 811-813, after which the appropriate functions 814-818 can be invoked.

Figure 23:
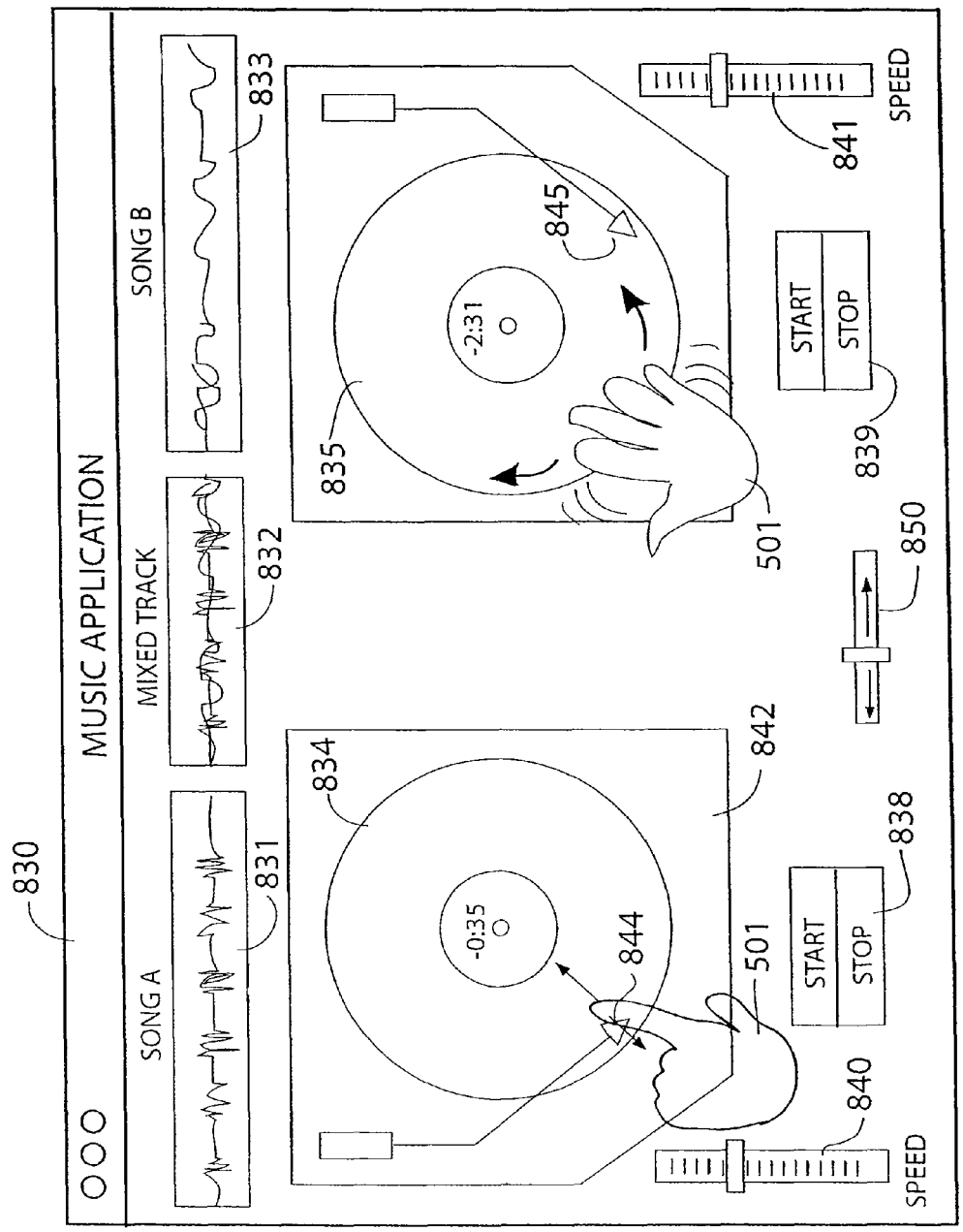
FIG. 23 illustrate gestural inputs for controlling and/or editing audio using an audio application according to one embodiment of this invention.

FIG. 23 illustrates another embodiment of the invention for manipulating the replay and recording of audio or musical files. As shown in FIG. 23, a music application 830 can display a pair of virtual turntables 842 and 843, on which two musical records 834 and 835 are playing, the records being one of a single or a LP record. The records 834 and 835 can be graphical representations of a digital musical file (e.g., song A and song B) that are being replayed via the music application 830. In other words, the records can be graphical imprints of the musical files as if the musical files were imprinted on physical records.

Like a pair of physical turntables, stylus 844 and stylus 855 can be graphical icon indications of a playback queue, the position of which can be varied by touching the queue on a touch sensitive display screen and dragging the icon to the desired position on the graphical record. The moving of the stylus would cause a jump in the playback point of the corresponding song, as on a physical turntable.

Also like a pair of physical turn tables start/stop buttons 838 and 839 can be touched by one or more fingers to toggle the start or stop/pause of the song reproduction. Speed variants bars 840 and 841 can be linearly adjusted to control the playback speed of the songs. Windows 831 and 833 can graphically reproduce the frequency representation of the reproduced songs, while window 832 can display the frequency representation of the actual output of the music application 832, which can be simply one of the songs being reproduced, or a mixed/combination of the songs. Mixing/pan bar 850 can be manipulated to modulate or demodulate the two songs being reproduced.

During song reproduction, the records 834 and 835 can be manipulated similar to a physical record. For instance, rapid back and forth movement of a record can cause the sound effect of a record "scratching," as disc jockeys often do on physical turn tables.

It should be noted that the methods described above can be implemented simultaneously during the same gestural stroke. That is, selecting, tracking, zooming, rotating and panning can all be performed during a gestural stroke, which can include spreading, rotating and sliding fingers. For example, upon set down with at least two fingers, the displayed object (map) can be associated or locked to the two fingers. In order to zoom, the user can spread or close their fingers. In order to rotate, the user can rotate their fingers. In order to pan, the user can slide their fingers. Each of these actions can occur simultaneously in a continuous motion. For example, the user can spread and close their fingers while rotating and sliding them across the touch screen. Alternatively, the user can segment each of these motions without having to reset the gestural stroke. For example, the user can first spread their fingers, then rotate their fingers, then close their fingers, then slide their fingers and so on.

It should also be noted that it is not necessary to always use a human finger to effect gestural input. Where possible, it is also sufficient to use a pointing device, such as a stylus, to effect gestural input.

Additional examples of gestural strokes that can be used as inputs for effecting interface commands, including interactions with UI elements (e.g., a virtual scroll wheel), are shown and described in commonly assigned co-pending application Ser. No. 10/903,964, published as U.S. patent publication no. US2006/0026521, and application Ser. No. 11/038,590, published as U.S. patent publication no. US2006/0026535, the entirety of both of which are hereby incorporated by reference.

Many alterations and modifications can be made by those having ordinary skill in the art without departing from the spirit and scope of this invention. Therefore, it must be understood that the illustrated embodiments have been set forth only for the purposes of example and that they should not be taken as limiting this invention as defined by the following claims. For instance, although many of the embodiments of the invention are described herein with respect to personal computing devices, it should be understood that the invention is not limited to desktop or laptop computers, but can be generally applicable to other computing applications such as mobile communication devices, standalone multimedia reproduction devices, etc.

The words used in this specification to describe this invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements can be made for any one of the elements in the claims below or that a single element may be substituted for two or more elements in a claim.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined claim elements.

The claims are thus to be understood to include what is specifically illustrated and described above, what can be conceptionally equivalent, and what can be obviously substituted. For instance, the term "computer" or "computer system" as recited in the claims shall be inclusive of at least a desktop computer, a laptop computer, or any mobile computing device such as a mobile communication device (e.g., a cellular or Wi-Fi/Skype phone, e-mail communication devices, personal digital assistant devices), and multimedia reproduction devices (e.g., iPod, MP3 players, or any digital graphics/photo reproducing devices).

What is claimed is:

1. A method for processing touch inputs using a touch sensitive display, comprising:
at a computer system with a touch sensitive display:
displaying a plurality of selectable objects on the touch sensitive display;
detecting a touch input on the touch sensitive display, the touch input including at least a first touchdown point and movement of the first touchdown point on the touch sensitive display; and in response to detecting the touch input:
when the touch input includes a single touchdown point, identifying the touch input to be a scroll gesture and scrolling the plurality of selectable objects in accordance with the movement of the first touchdown point; and
when the touch input includes the first touchdown point and a second touchdown point and movement of the first touchdown point and the second touchdown point in a same direction, identifying the touch input to be a selection gesture and selecting two or more of the plurality of selectable objects in accordance with the movement of the first touchdown point and the second touchdown point.

2. The method of claim 1, including, while scrolling the plurality of selectable objects in accordance with the movement of the first touchdown point, displaying a scroll action icon on the display device.

3. A computer system, comprising:
a touch sensitive display device;
one or more processors;
memory; and
one or more programs, wherein the one or more programs are stored in the memory and configured to be executed by the one or more processors, the one or more programs including instructions for:
displaying a plurality of selectable objects on the touch sensitive display;
detecting a touch input on the touch sensitive display, the touch input including at least a first touchdown point and movement of the first touchdown point on the touch sensitive display; and
in response to detecting the touch input:
when the touch input includes a single touchdown point, identifying the touch input to be a scroll gesture and scrolling the plurality of selectable objects in accordance with the movement of the first touchdown point; and
when the touch input includes the first touchdown point and a second touchdown point and movement of the first touchdown point and the second touchdown point in a same direction, identifying the touch input to be a selection gesture and selecting two or more of the plurality of selectable objects in accordance with the movement of the first touchdown point and the second touchdown point.

4. The computer system of claim 3, including instructions for, while scrolling the plurality of selectable objects in accordance with the movement of the first touchdown point, causing the display of a scroll action icon on the display device.

5. The computer system of claim 3, wherein the computer system is one of a mobile telephone and a digital audio player.

6. A non-transitory computer-readable storage medium storing one or more programs, the one or more program comprising instructions, which when executed by a computer system with a touch sensitive display, cause the computer system to:
display a plurality of selectable objects on the touch sensitive display;
detect a touch input on the touch sensitive display, the touch input including at least a first touchdown point and movement of the first touchdown point on the touch sensitive display; and
in response to detecting the touch input:
when the touch input includes a single touchdown point, identify the touch input to be a scroll gesture and scroll the plurality of selectable objects in accordance with the movement of the first touchdown point; and
when the touch input includes the first touchdown point and a second touchdown point and movement of the first touchdown point and the second touchdown point in a same direction, identify the touch input to be a selection gesture and select two or more of the plurality of selectable objects in accordance with the movement of the first touchdown point and the second touchdown point.

7. The non-transitory computer readable storage medium of claim 6, including instructions to, while scrolling the plurality of selectable objects in accordance with the movement of the first touchdown point, display a scroll action icon on the display device.

8. The method of claim 1, wherein the touch input is identified as a selection gesture based at least in part on a distance between the first touchdown point and the second touchdown point.

9. The method of claim 1, wherein the touch input is identified as a selection gesture rather than a rotating gesture based at least in part on a distance between the first touchdown point and the second touchdown point.

10. The method of claim 1, wherein the touch input is detected without detecting activation of a button on a keyboard.

11. The computer system of claim 3, wherein the touch input is identified as a selection gesture based at least in part on a distance between the first touchdown point and the second touchdown point.

12. The computer system of claim 3, wherein the touch input is identified as a selection gesture rather than a rotating gesture based at least in part on a distance between the first touchdown point and the second touchdown point.

13. The computer system of claim 3, wherein the touch input is detected without detecting activation of a button on a keyboard.

14. The non-transitory computer readable storage medium of claim 6, wherein the touch input is identified as a selection gesture based at least in part on a distance between the first touchdown point and the second touchdown point.

15. The non-transitory computer readable storage medium of claim 6, wherein the touch input is identified as a selection gesture rather than a rotating gesture based at least in part on a distance between the first touchdown point and the second touchdown point.

16. The non-transitory computer readable storage medium of claim 6, wherein the touch input is detected without detecting activation of a button on a keyboard.

* * * * *